(12) United States Patent
Knotts

(10) Patent No.: US 7,430,425 B2
(45) Date of Patent: *Sep. 30, 2008

(54) INTER-CARRIER DIGITAL MESSAGE WITH USER DATA PAYLOAD SERVICE PROVIDING PHONE NUMBER ONLY EXPERIENCE

(75) Inventor: Chris Knotts, Annapolis, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/516,593

(22) Filed: Sep. 7, 2006

(65) Prior Publication Data

US 2007/0054656 A1    Mar. 8, 2007

Related U.S. Application Data

(63) Continuation of application No. 11/130,256, filed on May 17, 2005, now abandoned.

(51) Int. Cl.
*H04Q 7/20* (2006.01)

(52) U.S. Cl. .................. 455/466; 455/412.1; 455/552.1

(58) Field of Classification Search ............. 455/412.1, 455/412.2, 432.3, 414.1, 432.1, 432.2, 417, 455/466, 553, 562.1; 379/100.13, 100.15, 379/93.15; 358/402, 403; 370/352, 355, 370/356, 395.5, 401; 709/206, 208
See application file for complete search history.

(56) References Cited

U.S. PATENT DOCUMENTS

| | | | |
|---|---|---|---|
| 1,103,073 A | 7/1914 | O'Connel | |
| 3,920,908 A | 11/1975 | Krauss | |
| 4,310,726 A | 1/1982 | Asmuth | |
| 4,399,330 A | 8/1983 | Kuenzel | |
| 4,494,119 A | 1/1985 | Wimbush | |

(Continued)

FOREIGN PATENT DOCUMENTS

DE    295 11 856    9/1995

(Continued)

OTHER PUBLICATIONS

Civil Action No. 3:06CV485, Order, Dec. 21, 2006, pp. 1-7.

(Continued)

*Primary Examiner*—Jean A Gelin
(74) *Attorney, Agent, or Firm*—William H. Bollman

(57) ABSTRACT

A phone number only messaging experience is provided in an Inter-Carrier Messaging System service. Subscriber to subscriber digital messages containing user data are routed between carrier's networks using an Inter-Carrier messaging module with appropriate MIN/carrier/carrier routing look-up capabilities. Digital messages containing user data (e.g., short messages, email, digital messages in general, etc.) may be sent to a subscriber in another carrier's network addressed only with a phone number. If the recipient is outside of the sender's carrier network, the Inter-Carrier messaging module of the Inter-Carrier service provider (ICSP) determines the appropriate carrier for the recipient, appends the appropriate syntax to the digital message containing user data to allow internet protocol (IP) or other standardized communication techniques between message service centers of the two carriers, and routes the digital message containing user data to the destination carrier. The recipient in the other carrier's network may reply back to the ICSP's sender using only the subscriber's directory number.

22 Claims, 9 Drawing Sheets

U.S. PATENT DOCUMENTS

| | | |
|---|---|---|
| 4,577,060 A | 3/1986 | Webb et al. |
| 4,651,156 A | 3/1987 | Martinez |
| 4,680,785 A | 7/1987 | Akiyama |
| 4,706,275 A | 11/1987 | Kamil |
| 4,725,719 A | 2/1988 | Oncken |
| 4,756,020 A | 7/1988 | Fodale |
| 4,776,000 A | 10/1988 | Parienti |
| 4,776,003 A | 10/1988 | Harris |
| 4,776,037 A | 10/1988 | Rozanski, Jr. |
| 4,831,647 A | 5/1989 | D'Avelo |
| 4,852,149 A | 7/1989 | Zwick |
| 4,852,155 A | 7/1989 | Barraud |
| 4,860,341 A | 8/1989 | D'Avelo |
| 4,891,638 A | 1/1990 | Davis |
| 4,891,650 A | 1/1990 | Sheffer |
| 4,901,340 A | 2/1990 | Parker |
| 4,935,956 A | 6/1990 | Hellwarth |
| 4,952,928 A | 8/1990 | Carroll et al. |
| 4,994,926 A | 2/1991 | Gordon et al. |
| 5,003,585 A | 3/1991 | Richer |
| 5,014,206 A | 5/1991 | Scribner et al. |
| 5,043,736 A | 8/1991 | Darnell et al. |
| 5,046,088 A | 9/1991 | Marguiles |
| 5,055,851 A | 10/1991 | Sheffer |
| 5,063,588 A | 11/1991 | Patsiokas |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,103,449 A | 4/1992 | Jolissaint |
| 5,119,104 A | 6/1992 | Heller |
| 5,127,040 A | 6/1992 | D'Avello |
| 5,128,938 A | 7/1992 | Borras |
| 5,138,648 A | 8/1992 | Palomegue |
| 5,138,650 A | 8/1992 | Stahl |
| 5,144,283 A | 9/1992 | Arens et al. |
| 5,144,649 A | 9/1992 | Zicker |
| 5,150,113 A | 9/1992 | Bluthgen |
| 5,159,625 A | 10/1992 | Zicker |
| 5,161,180 A | 11/1992 | Chavous |
| 5,177,478 A | 1/1993 | Wagai et al. |
| 5,187,710 A | 2/1993 | Chau |
| 5,193,110 A | 3/1993 | Jones et al. |
| 5,193,215 A | 3/1993 | Olmer |
| 5,208,756 A | 5/1993 | Song |
| 5,214,789 A | 5/1993 | George |
| 5,216,703 A | 6/1993 | Roy |
| 5,218,367 A | 6/1993 | Sheffer et al. |
| 5,220,593 A | 6/1993 | Zicker |
| 5,223,844 A | 6/1993 | Mansell et al. |
| 5,233,642 A | 8/1993 | Renton |
| 5,235,630 A | 8/1993 | Moodey et al. |
| 5,239,570 A | 8/1993 | Koster et al. |
| 5,243,645 A | 9/1993 | Bissel et al. |
| 5,265,155 A | 11/1993 | Castro |
| 5,265,630 A | 11/1993 | Hartman |
| 5,266,944 A | 11/1993 | Carroll et al. |
| 5,274,802 A | 12/1993 | Altine |
| 5,276,444 A | 1/1994 | McNair |
| 5,289,527 A | 2/1994 | Tiedemann et al. |
| 5,291,543 A | 3/1994 | Freese |
| 5,293,642 A | 3/1994 | Lo |
| 5,297,189 A | 3/1994 | Chabernaud |
| 5,299,132 A | 3/1994 | Wothman |
| 5,301,223 A | 4/1994 | Amadon |
| 5,301,234 A | 4/1994 | Mazziotto |
| 5,307,399 A | 4/1994 | Dai et al. |
| 5,309,501 A | 5/1994 | Kozik |
| 5,311,572 A | 5/1994 | Friedes |
| 5,319,774 A | 6/1994 | Ainsworth |
| 5,321,735 A | 6/1994 | Breeden |
| 5,325,302 A | 6/1994 | Izidon et al. |
| 5,325,418 A | 6/1994 | McGregor |
| 5,327,144 A | 7/1994 | Stilp |
| 5,329,578 A | 7/1994 | Brennan |
| 5,334,974 A | 8/1994 | Simms et al. |
| 5,339,352 A | 8/1994 | Armstrong |
| 5,341,410 A | 8/1994 | Aron |
| 5,341,414 A | 8/1994 | Popke |
| 5,343,493 A | 8/1994 | Karimullah |
| 5,345,227 A | 9/1994 | Fascenda et al. |
| 5,347,568 A | 9/1994 | Moody et al. |
| 5,349,696 A | 9/1994 | Matai |
| 5,351,235 A | 9/1994 | Lahtinen |
| 5,353,328 A | 10/1994 | Jokimies et al. |
| 5,353,335 A | 10/1994 | D'Urso |
| 5,359,182 A | 10/1994 | Schilling |
| 5,359,642 A | 10/1994 | Castro |
| 5,359,643 A | 10/1994 | Gammino |
| 5,361,212 A | 11/1994 | Class et al. |
| 5,363,425 A | 11/1994 | Mufti et al. |
| 5,369,699 A | 11/1994 | Page |
| 5,374,936 A | 12/1994 | Feng |
| 5,375,161 A | 12/1994 | Fuller et al. |
| 5,379,031 A | 1/1995 | Mondrosch et al. |
| 5,379,451 A | 1/1995 | Nakagoshi et al. |
| 5,381,338 A | 1/1995 | Wysocki et al. |
| 5,384,825 A | 1/1995 | Dillard |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,396,545 A | 3/1995 | Nair |
| 5,396,558 A | 3/1995 | Ishiguro |
| 5,398,190 A | 3/1995 | Wortham |
| 5,402,472 A | 3/1995 | MeLampy et al. |
| 5,404,580 A | 4/1995 | Simpson |
| 5,406,614 A | 4/1995 | Hara |
| 5,408,513 A | 4/1995 | Buschi, Jr. |
| 5,408,682 A | 4/1995 | Ranner |
| 5,412,726 A | 5/1995 | Neroux |
| 5,418,537 A | 5/1995 | Bird |
| 5,423,076 A | 6/1995 | Westergreen et al. |
| 5,430,759 A | 7/1995 | Yokev |
| 5,432,841 A | 7/1995 | Rimer |
| 5,434,789 A | 7/1995 | Fraker et al. |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,459,773 A | 10/1995 | Hwang |
| 5,461,390 A | 10/1995 | Hoshen |
| 5,465,289 A | 11/1995 | Kennedy, Jr. |
| 5,465,401 A | 11/1995 | Thompson |
| 5,469,283 A | 11/1995 | Vinel et al. |
| 5,469,497 A | 11/1995 | Pierce |
| 5,470,233 A | 11/1995 | Fruchterman et al. |
| 5,475,743 A | 12/1995 | Nixon et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,485,505 A | 1/1996 | Norman et al. |
| 5,488,563 A | 1/1996 | Chazelle et al. |
| 5,494,091 A | 2/1996 | Freeman |
| 5,497,149 A | 3/1996 | Fast |
| 5,502,761 A | 3/1996 | Duncan |
| 5,506,893 A | 4/1996 | Buscher |
| 5,508,931 A | 4/1996 | Snider |
| 5,509,056 A | 4/1996 | Ericsson |
| 5,513,243 A | 4/1996 | Kage |
| 5,515,287 A | 5/1996 | Hakoyama et al. |
| 5,515,422 A | 5/1996 | MeLampy et al. |

| | | | | | |
|---|---|---|---|---|---|
| 5,517,555 A | 5/1996 | Amadon | 5,806,000 A | 9/1998 | Vo et al. |
| 5,517,559 A | 5/1996 | Hayashi | 5,815,816 A | 9/1998 | Isumi |
| 5,519,403 A | 5/1996 | Bickley et al. | 5,822,700 A | 10/1998 | Hult et al. |
| 5,524,010 A | 6/1996 | Boltjes | 5,825,862 A | 10/1998 | Voit et al. |
| 5,532,690 A | 7/1996 | Hertel | 5,826,185 A | 10/1998 | Wise |
| 5,533,108 A | 7/1996 | Harris et al. | 5,828,740 A | 10/1998 | Khuc et al. |
| 5,535,260 A | 7/1996 | Zicker et al. | 5,832,061 A | 11/1998 | Rubin |
| 5,535,434 A | 7/1996 | Siddoway et al. | 5,841,837 A | 11/1998 | Fuller et al. |
| 5,539,398 A | 7/1996 | Hall et al. | 5,845,293 A | 12/1998 | Veghte |
| 5,543,776 A | 8/1996 | L'esperance et al. | 5,848,134 A | 12/1998 | Sekiguchi et al. |
| 5,550,897 A | 8/1996 | Seiderman | 5,850,519 A | 12/1998 | Vazana |
| 5,552,772 A | 9/1996 | Janky et al. | 5,850,599 A | 12/1998 | Seiderman |
| 5,555,286 A | 9/1996 | Tendler | 5,854,975 A | 12/1998 | Fougnies |
| 5,555,446 A | 9/1996 | Jasinski | 5,857,201 A | 1/1999 | Wright, Jr. |
| 5,559,859 A | 9/1996 | Dai et al. | 5,864,612 A | 1/1999 | Strauss et al. |
| 5,568,119 A | 10/1996 | Schipper et al. | 5,867,495 A | 2/1999 | Elliott et al. |
| 5,570,416 A | 10/1996 | Kroll | 5,867,688 A | 2/1999 | Simmon |
| 5,574,648 A | 11/1996 | Pilley | 5,884,323 A | 3/1999 | Hawkins |
| 5,577,100 A | 11/1996 | McGregor | 5,887,249 A | 3/1999 | Schmid |
| 5,579,372 A | 11/1996 | Astrom | 5,903,636 A | 5/1999 | Malik |
| 5,579,376 A | 11/1996 | Kennedy et al. | 5,905,447 A | 5/1999 | Eaton et al. |
| 5,583,918 A | 12/1996 | Nakagawa | 5,905,736 A | 5/1999 | Rohen et al. |
| 5,586,175 A | 12/1996 | Hogan | 5,910,980 A | 6/1999 | Ogasawara et al. |
| 5,588,009 A | 12/1996 | Will | 5,915,222 A | 6/1999 | Olsson et al. |
| 5,592,533 A | 1/1997 | McHenry et al. | 5,915,225 A | 6/1999 | Mills |
| 5,592,535 A | 1/1997 | Klotz | 5,920,821 A | 7/1999 | Seaholtz et al. |
| 5,596,734 A | 1/1997 | Ferra | 5,920,822 A | 7/1999 | Houde et al. |
| 5,604,486 A | 2/1997 | Lauro et al. | 5,924,016 A | 7/1999 | Fuller et al. |
| 5,606,313 A | 2/1997 | Allen et al. | 5,930,701 A | 7/1999 | Skog |
| 5,606,595 A | 2/1997 | Ejzak | 5,940,756 A | 8/1999 | Sibecas et al. |
| 5,606,850 A | 3/1997 | Nakamura | 5,943,399 A | 8/1999 | Bannister et al. |
| 5,608,786 A | 3/1997 | Gordon | 5,946,629 A | 8/1999 | Sawyer et al. |
| 5,610,815 A | 3/1997 | Gudat | 5,946,630 A | 8/1999 | Willars et al. |
| 5,610,969 A | 3/1997 | McHenry et al. | 5,949,326 A | 9/1999 | Wicks et al. |
| 5,610,972 A | 3/1997 | Emery | 5,950,130 A | 9/1999 | Coursey |
| 5,614,890 A | 3/1997 | Fox | 5,953,398 A | 9/1999 | Hill |
| 5,615,116 A | 3/1997 | Gudat et al. | 5,959,543 A | 9/1999 | LaPorta et al. |
| 5,621,727 A | 4/1997 | Vaudreuil | 5,960,074 A | 9/1999 | Clark |
| 5,621,793 A | 4/1997 | Bednarak et al. | 5,966,663 A | 10/1999 | Gleason |
| 5,625,669 A | 4/1997 | McGregor | 5,970,404 A | 10/1999 | Foti |
| 5,628,051 A | 5/1997 | Salin | 5,974,054 A | 10/1999 | Couts et al. |
| 5,628,600 A | 5/1997 | Pasquini | 5,974,238 A | 10/1999 | Chase, Jr. |
| 5,633,912 A | 5/1997 | Tsoi | 5,978,358 A | 11/1999 | Wang et al. |
| 5,640,447 A | 6/1997 | Fonseca | 5,978,685 A | 11/1999 | Laiho |
| 5,652,888 A | 7/1997 | Burgess | 5,983,095 A * | 11/1999 | Cameron .................... 455/417 |
| 5,666,364 A | 9/1997 | Pierce et al. | 5,987,323 A | 11/1999 | Huotari |
| 5,673,306 A | 9/1997 | Amadon et al. | 5,999,811 A | 12/1999 | Molne |
| 5,682,600 A | 10/1997 | Salin | 6,000,000 A | 12/1999 | Hawkins |
| 5,687,216 A | 11/1997 | Svensson | 6,003,040 A | 12/1999 | Mital |
| 5,692,037 A | 11/1997 | Friend | 6,006,087 A | 12/1999 | Amin |
| 5,694,546 A | 12/1997 | Reisman | 6,011,976 A | 1/2000 | Michaels et al. |
| 5,722,067 A | 2/1998 | Fougnies | 6,014,429 A | 1/2000 | LaPorta et al. |
| 5,732,346 A | 3/1998 | Lazarides | 6,014,559 A | 1/2000 | Amin |
| 5,740,534 A | 4/1998 | Ayesrt et al. | 6,018,657 A | 1/2000 | Kennedy, III et al. |
| 5,742,668 A | 4/1998 | Pepe et al. | 6,020,980 A | 2/2000 | Freeman |
| 5,752,191 A | 5/1998 | Fuller et al. | 6,021,333 A | 2/2000 | Anderson |
| 5,758,088 A | 5/1998 | Bezaire | 6,021,335 A | 2/2000 | Zicker et al. |
| 5,758,279 A | 5/1998 | Foti | 6,034,621 A | 3/2000 | Kaufman |
| 5,761,618 A | 6/1998 | Lynch et al. | 6,035,025 A | 3/2000 | Hanson |
| 5,767,795 A | 6/1998 | Schaphorst | 6,040,784 A | 3/2000 | Miller |
| 5,768,509 A | 6/1998 | Gunluk | 6,041,045 A | 3/2000 | Alterman et al. |
| 5,774,533 A | 6/1998 | Patel | 6,044,275 A | 3/2000 | Boltz et al. |
| 5,778,313 A | 7/1998 | Fougnies | 6,044,381 A | 3/2000 | Boothby |
| 5,787,357 A | 7/1998 | Salin | 6,049,710 A | 4/2000 | Nilsson |
| 5,790,636 A | 8/1998 | Marshall | 6,055,442 A | 4/2000 | Dietrich |
| 5,793,859 A | 8/1998 | Matthews | 6,058,300 A | 5/2000 | Hanson |
| 5,794,142 A | 8/1998 | Vanttila et al. | 6,064,875 A | 5/2000 | Morgan |
| 5,796,734 A | 8/1998 | Izawa et al. | 6,070,067 A | 5/2000 | Nguyen et al. |
| 5,797,091 A | 8/1998 | Clise et al. | 6,075,982 A | 6/2000 | Donovan et al. |
| 5,797,094 A | 8/1998 | Houde | 6,078,583 A | 6/2000 | Takahara |
| 5,797,096 A | 8/1998 | Lupien et al. | 6,081,508 A | 6/2000 | West et al. |
| 5,799,060 A | 8/1998 | Kennedy et al. | 6,085,099 A | 7/2000 | Ritter et al. |
| 5,802,492 A | 9/1998 | DeLorme et al. | 6,085,100 A | 7/2000 | Tarnanen |

| Patent | Kind | Date | Name |
|---|---|---|---|
| 6,087,956 | A | 7/2000 | Helferich |
| 6,094,574 | A | 7/2000 | Vance et al. |
| 6,101,378 | A | 8/2000 | Barabash et al. |
| 6,118,448 | A | 9/2000 | McMillan et al. |
| 6,119,014 | A | 9/2000 | Alperivich et al. |
| 6,122,503 | A | 9/2000 | Daly |
| 6,122,520 | A | 9/2000 | Want et al. |
| 6,125,281 | A | 9/2000 | Wells et al. |
| 6,128,482 | A | 10/2000 | Nixon et al. |
| 6,128,653 | A | 10/2000 | Del Val et al. |
| 6,134,432 | A | 10/2000 | Holmes et al. |
| 6,138,158 | A | 10/2000 | Boyle et al. |
| 6,139,177 | A | 10/2000 | Venkatraman |
| 6,144,653 | A | 11/2000 | Persson et al. |
| 6,148,197 | A | 11/2000 | Bridges et al. |
| 6,148,198 | A | 11/2000 | Anderson et al. |
| 6,149,353 | A | 11/2000 | Nilsson |
| 6,157,831 | A | 12/2000 | Lamb |
| 6,157,832 | A | 12/2000 | Lahtinen |
| 6,157,846 | A * | 12/2000 | Manning et al. ............ 455/557 |
| 6,169,891 | B1 | 1/2001 | Gorham et al. |
| 6,173,181 | B1 | 1/2001 | Losh |
| 6,173,438 | B1 | 1/2001 | Kodosky et al. |
| 6,175,743 | B1 * | 1/2001 | Alperovich et al. ......... 455/466 |
| 6,178,331 | B1 | 1/2001 | Holmes et al. |
| 6,181,935 | B1 | 1/2001 | Gossman |
| 6,185,602 | B1 | 2/2001 | Bayrakeri |
| 6,188,752 | B1 | 2/2001 | Lesley |
| 6,189,031 | B1 | 2/2001 | Badger et al. |
| 6,192,241 | B1 | 2/2001 | Yu |
| 6,195,543 | B1 | 2/2001 | Granberg |
| 6,195,651 | B1 | 2/2001 | Handel et al. |
| 6,198,431 | B1 | 3/2001 | Gibson |
| 6,199,045 | B1 | 3/2001 | Giniger et al. |
| 6,205,330 | B1 | 3/2001 | Winbladh |
| 6,205,448 | B1 | 3/2001 | Kruglikov |
| 6,208,854 | B1 | 3/2001 | Roberts et al. |
| 6,208,870 | B1 | 3/2001 | Lorello et al. |
| 6,212,548 | B1 | 4/2001 | DeSimone et al. |
| 6,216,008 | B1 | 4/2001 | Lee |
| 6,223,042 | B1 | 4/2001 | Raffel |
| 6,223,046 | B1 | 4/2001 | Hamill-Keays et al. |
| 6,226,529 | B1 | 5/2001 | Bruno et al. |
| 6,230,009 | B1 | 5/2001 | Holmes et al. |
| 6,233,331 | B1 | 5/2001 | Slutsman et al. |
| 6,240,293 | B1 | 5/2001 | Koster |
| 6,240,296 | B1 | 5/2001 | Yu et al. |
| 6,243,444 | B1 | 6/2001 | O'Neal |
| 6,243,832 | B1 | 6/2001 | Eckes et al. |
| 6,246,879 | B1 | 6/2001 | Segura |
| 6,247,135 | B1 | 6/2001 | Feague |
| 6,249,680 | B1 | 6/2001 | Wax et al. |
| 6,249,744 | B1 | 6/2001 | Morita |
| 6,253,061 | B1 | 6/2001 | Helferich |
| 6,263,212 | B1 | 7/2001 | Ross et al. |
| 6,263,372 | B1 | 7/2001 | Hogan et al. |
| 6,266,614 | B1 | 7/2001 | Alumbaugh et al. |
| 6,289,373 | B1 | 9/2001 | Dezonno |
| 6,292,669 | B1 | 9/2001 | Meuronen et al. |
| 6,301,338 | B1 | 10/2001 | Makela |
| 6,304,898 | B1 | 10/2001 | Shinigi |
| 6,311,055 | B1 | 10/2001 | Boltz |
| 6,314,108 | B1 | 11/2001 | Ramasubramani et al. |
| 6,317,594 | B1 | 11/2001 | Gossman |
| 6,317,831 | B1 | 11/2001 | King |
| 6,321,257 | B1 | 11/2001 | Kotola et al. |
| 6,324,544 | B1 | 11/2001 | Alam |
| 6,327,479 | B1 | 12/2001 | Mikkola |
| 6,330,079 | B1 * | 12/2001 | Dugan et al. ................ 358/403 |
| 6,330,600 | B1 | 12/2001 | Matchefts et al. |
| 6,330,618 | B1 | 12/2001 | Hawkins |
| 6,335,968 | B1 | 1/2002 | Malik |
| 6,353,614 | B1 | 3/2002 | Borella et al. |
| 6,356,630 | B1 | 3/2002 | Cai |
| 6,366,663 | B1 | 4/2002 | Bauer et al. |
| 6,366,961 | B1 | 4/2002 | Subbiah et al. |
| 6,370,373 | B1 | 4/2002 | Gerth et al. |
| 6,370,390 | B1 | 4/2002 | Salin et al. |
| 6,373,930 | B1 | 4/2002 | McConnell et al. |
| 6,377,669 | B1 | 4/2002 | Walker et al. |
| 6,389,421 | B1 | 5/2002 | Hawkins |
| 6,389,455 | B1 | 5/2002 | Fuisz |
| 6,393,014 | B1 | 5/2002 | Daly et al. |
| 6,393,269 | B1 | 5/2002 | Hartmaier |
| 6,393,434 | B1 | 5/2002 | Huang |
| 6,393,461 | B1 | 5/2002 | Okada |
| 6,396,913 | B1 | 5/2002 | Perkins, III |
| 6,397,054 | B1 | 5/2002 | Hoirup et al. |
| 6,397,055 | B1 | 5/2002 | McHenry |
| 6,400,942 | B1 | 6/2002 | Hansson et al. |
| 6,408,177 | B1 | 6/2002 | Parikh |
| 6,421,707 | B1 | 7/2002 | Miller et al. |
| 6,424,706 | B1 | 7/2002 | Katz et al. |
| 6,424,841 | B1 | 7/2002 | Gustafsson |
| 6,442,570 | B1 | 8/2002 | Wu |
| 6,442,589 | B1 | 8/2002 | Takahashi et al. |
| 6,446,112 | B1 | 9/2002 | Bunney |
| 6,456,852 | B2 | 9/2002 | Bar |
| 6,459,776 | B1 | 10/2002 | Aktas et al. |
| 6,459,892 | B2 | 10/2002 | Burgan |
| 6,463,145 | B1 | 10/2002 | O'Neal et al. |
| 6,483,907 | B1 | 11/2002 | Wong |
| 6,484,196 | B1 | 11/2002 | Maurille |
| 6,487,560 | B1 | 11/2002 | La Rue |
| 6,493,558 | B1 | 12/2002 | Bernhart et al. |
| 6,499,053 | B1 | 12/2002 | Marquette et al. |
| 6,502,086 | B2 | 12/2002 | Pratt |
| 6,505,046 | B1 | 1/2003 | Baker |
| 6,507,589 | B1 | 1/2003 | Ramasubramani et al. |
| 6,512,926 | B1 | 1/2003 | Henry-Labordere |
| 6,512,930 | B2 | 1/2003 | Sandegren |
| 6,529,593 | B2 | 3/2003 | Nelson |
| 6,529,732 | B1 | 3/2003 | Vainiomaki |
| 6,535,746 | B1 | 3/2003 | Yu et al. |
| 6,538,561 | B2 | 3/2003 | Angus |
| 6,549,937 | B1 | 4/2003 | Auerbach et al. |
| 6,553,375 | B1 | 4/2003 | Huang |
| 6,560,456 | B1 | 5/2003 | Lohtia et al. |
| 6,560,655 | B1 | 5/2003 | Grambihler |
| 6,564,249 | B2 | 5/2003 | Shiigi |
| 6,564,261 | B1 | 5/2003 | Gudjonsson et al. |
| 6,587,688 | B1 | 7/2003 | Chambers |
| 6,587,691 | B1 | 7/2003 | Granstam et al. |
| 6,590,970 | B1 | 7/2003 | Cai et al. |
| 6,591,304 | B1 | 7/2003 | Sitaraman et al. |
| 6,594,693 | B1 | 7/2003 | Borwankar |
| 6,633,910 | B1 | 10/2003 | Rajan |
| 6,636,733 | B1 | 10/2003 | Helferich |
| 6,654,786 | B1 | 11/2003 | Fox et al. |
| 6,658,260 | B2 | 12/2003 | Knotts |
| 6,662,015 | B2 | 12/2003 | Furlong |
| 6,667,688 | B1 | 12/2003 | Menard et al. |
| 6,671,356 | B2 | 12/2003 | Lewis |
| 6,678,720 | B1 | 1/2004 | Matsumoto et al. |
| 6,701,521 | B1 | 3/2004 | McLlroy |
| 6,711,154 | B1 | 3/2004 | O'Neal |
| 6,711,411 | B1 | 3/2004 | Ruffini |
| 6,718,178 | B1 | 4/2004 | Sladek et al. |
| 6,718,425 | B1 | 4/2004 | Pajakowski |
| 6,725,268 | B1 | 4/2004 | Jackel et al. |
| 6,728,353 | B1 | 4/2004 | Espejo et al. |
| 6,744,858 | B1 | 6/2004 | Ryan et al. |
| 6,744,859 | B1 | 6/2004 | Koepke et al. |
| 6,748,555 | B1 | 6/2004 | Teegan et al. |
| 6,751,211 | B1 | 6/2004 | Chack |
| 6,757,708 | B1 | 6/2004 | Craig et al. |

| | | |
|---|---|---|
| 6,763,373 B2 | 7/2004 | Shiigi |
| 6,771,742 B2 | 8/2004 | McCalmont et al. |
| 6,771,971 B2 | 8/2004 | Smith |
| 6,775,356 B2 | 8/2004 | Salvucci et al. |
| 6,779,022 B1 | 8/2004 | Horstmann et al. |
| 6,785,659 B1 | 8/2004 | Landsman et al. |
| 6,801,603 B1 | 10/2004 | Arev |
| 6,839,562 B2 | 1/2005 | Smith |
| 6,856,804 B1 | 2/2005 | Ciotta |
| 6,856,808 B1 | 2/2005 | Comer et al. |
| 6,856,809 B2 * | 2/2005 | Fostick ............... 455/466 |
| 6,870,909 B2 * | 3/2005 | Gross et al. ............ 379/88.22 |
| 6,886,017 B1 | 4/2005 | Jackson et al. |
| 6,922,565 B2 | 7/2005 | Rhodes et al. |
| 6,956,832 B1 | 10/2005 | Muhonen et al. |
| 6,961,330 B1 | 11/2005 | Cattan et al. |
| 6,970,869 B1 | 11/2005 | Slaughter et al. |
| 6,980,670 B1 | 12/2005 | Hoffman et al. |
| 6,985,748 B2 | 1/2006 | Knotts |
| 6,993,325 B1 | 1/2006 | Waesterlid |
| 7,003,560 B1 | 2/2006 | Mullen et al. |
| 7,010,603 B2 | 3/2006 | Martin |
| 7,013,156 B2 | 3/2006 | Smith et al. |
| 7,058,036 B1 | 6/2006 | Yu et al. |
| 7,072,984 B1 | 7/2006 | Polonsky et al. |
| 7,100,195 B1 | 8/2006 | Underwood |
| 7,116,972 B1 | 10/2006 | Zhang et al. |
| 7,154,901 B2 | 12/2006 | Chava et al. |
| 7,171,190 B2 | 1/2007 | Ye |
| 7,181,538 B2 | 2/2007 | Tam et al. |
| 7,203,507 B2 | 4/2007 | Smith et al. |
| 7,209,950 B2 | 4/2007 | Bennett et al. |
| 7,228,333 B1 | 6/2007 | Smith |
| 2001/0003202 A1 | 6/2001 | Mache et al. |
| 2001/0006897 A1 | 7/2001 | Kang et al. |
| 2001/0029455 A1 | 10/2001 | Chin et al. |
| 2001/0031641 A1 | 10/2001 | Ung |
| 2001/0032267 A1 | 10/2001 | Collison |
| 2001/0034224 A1 | 10/2001 | McDowell et al. |
| 2001/0040949 A1 | 11/2001 | Blonder |
| 2001/0041579 A1 | 11/2001 | Smith et al. |
| 2001/0042107 A1 | 11/2001 | Palm |
| 2002/0007398 A1 | 1/2002 | Mendiola et al. |
| 2002/0007421 A1 | 1/2002 | Dixon |
| 2002/0026513 A1 | 2/2002 | Hoglund et al. |
| 2002/0029189 A1 | 3/2002 | Titus et al. |
| 2002/0052968 A1 | 5/2002 | Bonefas et al. |
| 2002/0069069 A1 | 6/2002 | Kanevsky et al. |
| 2002/0091775 A1 | 7/2002 | Morehead et al. |
| 2002/0103762 A1 | 8/2002 | Lopez |
| 2002/0108091 A1 | 8/2002 | Flanagin et al. |
| 2002/0112007 A1 | 8/2002 | Wood et al. |
| 2002/0112014 A1 | 8/2002 | Bennet et al. |
| 2002/0116263 A1 | 8/2002 | Gouge et al. |
| 2002/0118800 A1 | 8/2002 | Martinez et al. |
| 2002/0119793 A1 | 8/2002 | Hronek et al. |
| 2002/0133568 A1 | 9/2002 | Smith |
| 2002/0165000 A1 | 11/2002 | Fok |
| 2002/0168986 A1 | 11/2002 | Lou |
| 2002/0173308 A1 | 11/2002 | Dorenbosch et al. |
| 2002/0174194 A1 | 11/2002 | Mooney et al. |
| 2002/0178222 A1 | 11/2002 | O'Hara |
| 2002/0198999 A1 | 12/2002 | Smith |
| 2003/0037288 A1 | 2/2003 | Helgren |
| 2003/0055912 A1 | 3/2003 | Martin et al. |
| 2003/0069874 A1 | 4/2003 | Hertzog |
| 2003/0172121 A1 | 9/2003 | Evans |
| 2003/0204791 A1 | 10/2003 | Helgren et al. |
| 2003/0217291 A1 | 11/2003 | Schramm-Apple et al. |
| 2004/0103431 A1 | 5/2004 | Davenport |
| 2004/0156495 A1 | 8/2004 | Chava et al. |
| 2004/0171396 A1 | 9/2004 | Carey et al. |
| 2004/0180678 A1 | 9/2004 | Smith et al. |
| 2004/0185883 A1 | 9/2004 | Rukman |
| 2004/0196858 A1 | 10/2004 | Tsai et al. |
| 2004/0199614 A1 | 10/2004 | Shenfield |
| 2004/0203900 A1 | 10/2004 | Cedarvall et al. |
| 2004/0236710 A1 | 11/2004 | Clary |
| 2004/0242202 A1 | 12/2004 | Torvinen |
| 2004/0259531 A1 | 12/2004 | Wood et al. |
| 2005/0020287 A1 | 1/2005 | Pohutsky |
| 2005/0044535 A1 | 2/2005 | Coppert |
| 2005/0048948 A1 | 3/2005 | Holland |
| 2005/0076084 A1 | 4/2005 | Loughmiller |
| 2005/0078660 A1 | 4/2005 | Wood |
| 2005/0108334 A1 | 5/2005 | Tam et al. |
| 2005/0135569 A1 | 6/2005 | Dickinson |
| 2005/0141522 A1 | 6/2005 | Kadar et al. |
| 2005/0176406 A1 | 8/2005 | Carpenter |
| 2005/0186974 A1 | 8/2005 | Cai |
| 2005/0277432 A1 | 12/2005 | Viana et al. |
| 2006/0053197 A1 | 3/2006 | Yoshimura |
| 2006/0116138 A1 | 6/2006 | Simsek et al. |

FOREIGN PATENT DOCUMENTS

| | | |
|---|---|---|
| DE | 295 11 856 U1 | 11/1995 |
| EP | 0 936 825 | 2/1999 |
| EP | 0 936 825 A2 | 2/1999 |
| EP | 0936825 | 2/1999 |
| EP | 0 936 825 A2 | 8/1999 |
| GB | 2308528 | 12/1995 |
| WO | WO 96/21999 | 7/1996 |
| WO | WO 96/21999 A2 | 7/1996 |
| WO | WO 96/26616 | 8/1996 |
| WO | WO 96/26616 A1 | 8/1996 |
| WO | WO 97/26765 | 7/1997 |
| WO | WO 97/26765 A1 | 7/1997 |
| WO | WO97/36450 | 10/1997 |
| WO | WO 97/36450 A1 | 10/1997 |
| WO | WO98/28920 | 7/1998 |
| WO | WO 98/35481 A2 | 8/1998 |
| WO | WO 98/56195 | 12/1998 |
| WO | WO 98/56195 A2 | 12/1998 |
| WO | WO9856160 | 12/1998 |
| WO | WO9960801 | 5/1999 |
| WO | WO 99/63772 | 9/1999 |
| WO | WO 99/63772 A1 | 10/1999 |
| WO | WO00/54488 | 3/2000 |
| WO | WO 00/79813 | 6/2000 |
| WO | WO 00/54488 A1 | 9/2000 |
| WO | WO 00/79813 A1 | 12/2000 |
| WO | WO 01/50787 | 7/2001 |
| WO | WO 01/54434 | 7/2001 |
| WO | WO 01/54434 A1 | 7/2001 |
| WO | WO01/507587 | 7/2001 |
| WO | WO 01/78422 | 10/2001 |
| WO | WO 01/78422 A1 | 10/2001 |

OTHER PUBLICATIONS

Civil Action No. 3:06CV485, Mobile 365, Inc.'s Opening Claim Construction Brief, Nov. 28, 2006, pp. 1-30.
Buckingham, What is SMS?, LibanPhone, Nov. 2006, pp. 1-27.
O'Leary, SMS Messaging: How is Your Text Life?, Group Mail Article, Jan. 2006, pp. 1.
Short Message Service, Wikipedia, Nov. 2006, pp. 1-9.
SMS Text Messaging a Brief History of UK Text, foolswisdom.com, Nov. 2006, pp. 1-4.
Singapore takes first step towards seamless data architecture, Infocom Hub, Feb. 1999, pp. 1.
Zimmerman, Mobile Messaging & Internet Applications, Jul. 2000, pp. 1-38.
EMI Protocol, Wikipedia, Nov. 2000, pp. 1-2.
Short Message Peer to Peer Protocol Specification v3.4, SMPP Developers Forum, Oct. 1999, pp. 1-169.
Newton's Telecom Dictionary, CMP Books, Mar. 2004, pp. 610.

Wi-Fi Alliance, Glossary, Nov. 2006, pp. 1-2.
Packet, Wikipedia, Nov. 2006, pp. 1-4.
Cohan, June E., TCS v. Mobile 365 E-Mail Correspondence, Nov. 22, 2006, pp. 1-2.
Fulton, Brady, Response to Nov. 22, 2006 From June Cohan, Nov. 29, 2006, pp. 1-2.
Civil Action No. 3:06-CV-485 (JRS), Plaintiff's Initial Disclosure of Asserted Claims and Preliminary Infringement Contentions, Oct. 16, 2006 pp. 1-8.
Gelin, Jean, USPTO Office Action, Jan. 6, 2006, pp. 1-8.
Bollman, William H., Amendment to USPTO, Jan. 17, 2006, pp. 1-8.
Civil Action No. 3:06cv485 (JRS), Answer and Counterclaims of Defendant Widerthan Americas, Inc., Aug. 8, 2006, pp. 1-15.
Civil Action No. 3:06cv485 (JRS), Answer and Counterclaims of Defendant Mobile 365, Inc., Aug. 8, 2006, pp. 1-16.
Civil Action No. 3:06cv485 (JRS), Defendant Mobile 365, Inc's Response to Plaintiff's First Set of Interrogatories (Nos. 1-13), Sep. 25, 2006, PP. 1-17.
Civil Action No. 3:06cv485 (JRS), Widerthan's Responses and Objections to TCS's First Set of Interrogatories, Oct. 10, 2006, pp. 1-12.
Civil Action No. 3:06cv485 (JRS), Plaintiff's Initial Disclosure of Asserted Claims and Preliminary Infringement Contentions, Oct. 16, 2006, pp. 1-8.
Civil Action No. 3:06-CV-485 (JRS), Defendant Mobile 365, Inc.'s Preliminary Invalidity Contentions, Nov. 21, 2006, pp. 1-48.
Civil Action No. 3:06cv485 (JRS), Plaintiff's Supplemental Proposed Claim Constructions, Nov. 29, 2006, pp. 1-19.
Civil Action No. 3:06cv485 (JRS), Plaintiff's Response to Mobile 365's Opening Claim Construction Brief, Dec. 8, 2006, pp. 1-20.
Civil Action No. 3:06cv485 (JRS), Plaintiff's Response to Mobile 365's Preliminary Invalidity Contentions, Dec. 18, 2006, pp. 1-18.
U.S. Appl. No. 60/225,603, Cellular Network Independent Short Message Delivery System, Aug. 15, 2000, pp. 1-2, pp. 1-24.
Logica Aldiscon—Products, Added Value for Mobile Data Communication, Nov. 17, 2006, pp. 1-4.
Kathman, Brian F., Cross-Carrier Interoperability for VoiceStream SMS Messaging, Oct. 2000, pp. 1-8.
Attorneys for Plaintiff, TeleCommunication System, Inc., Reply to Defendant Mobile 365's Answer and Counterclaims, Civil Action No. 3:06-CV-485, Aug. 28, 2006.
Attorneys for Plaintiff, TeleCommunication Systems, Inc., Reply to Defendant Widerthan Americas, Inc. Answers and Counterclaims, Civil Action No. 3:06-CV-485, Aug. 28, 2006.
Attorneys for Defendant, Mobile 365, Inc., Answer and Counterclaims of Defendant Widerthan Americas, Inc., Civil Action No. 3:06-CV-485, Aug. 8, 2006.
Attorneys for Defendant, Mobile 365, Inc., Answer and Counterclaims of Defendant Mobile 365, Inc., Civil Action No. 3:06-CV-485, Aug. 8, 2006.
Bellcore, SR-INS-002662: Message Transport and Routing Service Technical Service and Architecture Description, Issue 1, May 1993.
ANSI, TIA/EIA-41-D: Cellular Radiotelecommunications Intersystem Operations, Dec. 1997.
Simon Buckingham, Data on SMS, Issue 1, Sep. 1998.
Simon Buckingham, Success 4 SMS, Nov. 2000.
TSI Launches International SMS Interoperability Trial with Movinet, South American Telecom, Sep. 2001, Nov. 9, vol. 6, pp. 10.
Lin et al., Wireless and Mobile network Architecture, Oct. 2000.
Yankee Group, SMS: Why Can't North American Carriers Get Along? vol. 1, No. 16, Nov. 2000.
SBC Wireless Selects Logica Messaging Products to Expand its Wireless Data Services, Business Wire, Sep. 2000.
Michael Cohn, Short Sweet Talk: Taking the Gabfest of Short Text Messaging Global Requires Carriers to Cooperate, Internet World, Jun. 15, 2001.
CMG Wireless Data Solutions Announces the Inter-SMC Router (ISR) for Interconnecting Multiple Wireless Technologies, Canada NewsWire, Jul. 12, 2001.
SMPP Developers Forum, Short Message Peer to Peer Protocol Specification v3.4, Oct. 12, 1999.
Simon Buckingham, SMS Tech, Jul. 2001.

Elizabeth M. Hannah, Roaming Complexities: The Clearinghouse's Role Remains a Necessity, America's Network, Mar. 15, 1997, pp. 10.
U.S. Appl. No. 09/593,681, filed Feb. 17, 2006, Hsaio et al, RE-EX001697-RE-EX001849.
U.S. Appl. No. 09/593,681,filed Feb. 17, 2006, Hsaio et al, Information Disclosure Statements-Sep. 30, 2003; RE-EX001850-RE-EX001882.
U.S. Appl. No. 60/225,603, filed Aug. 15, 2000, Bennett et al, RE-EX001883-RE-EX001918.
U.S. Appl. No. 09/593,681, filed Feb. 17, 2006, Hsaio et al, RE-EX001987-RE-EX002139.
U.S. Appl. No. 60/225,603, filed Aug. 15, 2000, Bennett et al, RE-EX002157-RE-EX002192.
U.S. Appl. No. 60/225,603, filed Aug. 15, 2000, Bennett et al, RE-EX002193-RE-EX002225.
U.S. Appl. No. 09/593,681, filed Feb. 17, 2006, Hsaio et al, Specification dated Jun. 14, 2000; RE-EX002413-RE-EX002443.
U.S. Appl. No. 60/445,444, filed Feb. 7, 2003, Chava et al, RE-EX002502-RE-EX002685.
*Telecommunication Systems, Inc. v. Mobile 365, Inc.*—Civil Action No. 3:06CV485: Defendant Mobile 365 Inc.'s Initial Disclosures Pursuant to Fed.R.Civ.P. 26(a)(1)—Sep. 18, 2006; RE-EX003543-RE-EX003547.
*Telecommunication Systems, Inc. v. Mobile 365, Inc.*—Civil Action No. 3:06CV485: TCS' Initial Disclosures Pursuant to Fed.R.Civ.P. 26(a)(1)—Sep. 18, 2006; RE-EX003548-RE-EX003550.
*Telecommunication Systems, Inc. v. Mobile 365, Inc.*—Civil Action No. 3:06CV485: WiderThan Americas, Inc.'s Rule 26 (a)(1)(A) Disclosures—Sep. 18, 2006; RE-EX003551-RE-EX003550.
*Telecommunication Systems, Inc. v. Mobile 365, Inc.*—Civil Action No. 3:06CV485: WiderThan Americas Inc.'s First Amended Rule 26(a)(1)(A) Disclosures—Sep. 19, 2006; RE-EX003555-RE-EX003558.
*Telecommunication Systems, Inc. v. Mobile 365, Inc.*—Civil Action No. 3:06CV485: TCS' Objections and Responses to WiderThan America's Second Set of Interrogatories (Nos. 3-8)—Oct. 10, 2006; RE-EX003559-RE-EX003565.
*Telecommunication Systems, Inc. v. Mobile 365, Inc.*—Civil Action No. 3:06CV485: TCS' Responses to Mobile 365's First Set of Interrogatories (Nos. 1-8)—Oct. 10, 2006; RE-EX003566-RE-EX003576.
*Telecommunication Systems, Inc. v. Mobile 365, Inc.*—Civil Action No. 3:06CV485: TCS' Responses to WiderThan America's First Set of Interrogatories (Nos. 1-2)—Oct. 10, 2006; RE-EX003577-RE-EX003581.
*Telecommunication Systems, Inc. v. Mobile 365, Inc.*—Civil Action No. 3:06CV485: Defendant Mobile 365 Inc.'s Objections and Responses to Plaintiff's First Set of Interrogatories (Nos. 1-13) to Mobile 365 Inc.—Oct. 10, 2006; RE-EX003582-RE-EX003603.
*Telecommunication Systems, Inc. v. Mobile 365, Inc.*—Civil Action No. 3:06CV485: WiderThan's Responses and Objections to TCS's First Set of Interrogatories—Oct. 10, 2006; RE-EX003604-RE-EX003619.
*Telecommunication Systems, Inc. v. Mobile 365, Inc.*—Civil Action No. 3:06CV485: TCS' Supplemental Responses to Mobile 365's Interrogatory No. 1—Oct. 13, 2006; RE-EX003620-RE-EX003624.
*Telecommunication Systems, Inc. v. Mobile 365, Inc.*—Civil Action No. 3:06CV485: Plaintiff's Initial Disclosures of Asserted Claims and Preliminary Infringement Contentions—Oct. 16, 2006; RE-EX003625-RE-EX003637.
*Telecommunication Systems, Inc. v. Mobile 365, Inc.*—Civil Action No. 3:06CV485: Defendant Mobile 365, Inc.'s Proposed Claim Constructions—Nov. 16, 2006; RE-EX003638-RE-EX003642.
*Telecommunication Systems, Inc. v. Mobile 365, Inc.*—Civil Action No. 3:06CV485: Plaintiff's Proposed Claim Constructions—Nov. 17, 2006; RE-EX003643-RE-EX003645.
*Telecommunication Systems, Inc. v. Mobile 365, Inc.*—Civil Action No. 3:06CV485: Defendant Mobile 365, Inc.'s Preliminary Invalidity Contentions—Nov. 21, 2006; RE-EX003646-RE-EX003694.

*Telecommunication Systems, Inc.* v. *Mobile 365, Inc.*—Civil Action No. 3:06CV485: Defendant Mobile 365, Inc.'s Amended Proposed Claim Constructions—Nov. 27, 2006; RE-EX003695-RE-EX003699.

*Telecommunication Systems, Inc.* v. *Mobile 365, Inc.*—Civil Action No. 3:06CV485: Mobile 365, Inc.'s Opening Claim Constructure Brief, and Declaration of Jack W. Burtch, Jr. with Exhibit A—Nov. 29, 2006; RE-EX003700-RE-EX003742.

*Telecommunication Systems, Inc.* v. *Mobile 365, Inc.*—Civil Action No. 3:06CV485: Declaration of June Cohan in Support of Mobile 365, Inc.'s Opening Claim Construction Brief—Nov. 28, 2006; RE-EX003743-Re-EX004072.

*Telecommunication Systems, Inc.* v. *Mobile 365, Inc.*—Civil Action No. 3:06CV485: Plaintiff's Supplemental Proposed Claim Constructions—Nov. 29, 2006; RE-EX004073-RE-EX004076.

*Telecommunication Systems, Inc.* v. *Mobile 365, Inc.*—Civil Action No. 3:06CV485:Plaintiff's Opening Brief on Claim Construction—Nov. 29, 2006; RE-EX004077-RE-EX004125.

*Telecommunication Systems, Inc.* v. *Mobile 365, Inc.*—Civil Action No. 3:06CV485: Plaintiff's Response to Mobile 365's Opening Claim Construction Brief—Dec. 8, 2006; RE-EX004126-RE-EX004163.

*Telecommunication Systems, Inc.* v. *Mobile 365, Inc.*—Civil Action No. 3:06CV485: Mobile 365, Inc.'s Responsive Claim Construction Brief, & Declaration of Lawrence Eisen—Dec. 8, 2006; RE-EX004164-RE-EX004230.

*Telecommunication Systems, Inc.* v. *Mobile 365, Inc.*—Civil Action No. 3:06CV485: Plaintiff's Response to Mobile 365's Preliminary Invalidity Contentions—Dec. 18, 2006; RE-EX004231-RE-EX004248.

*Telecommunication Systems, Inc.* v. *Mobile 365, Inc.*—Civil Action No. 3:06CV485: Order—Dec. 21, 2006; RE-EX004249-RE-EX004255.

*Telecommunication Systems, Inc.* v. *Mobile 365, Inc.*—Civil Action No. 3:06CV485: Mobile 365, Inc.'s Second Set of Requests for Production of Documents and Things to Telecommunication Systems Inc.—Feb. 6, 2007; RE-EX004256-RE-EX004275.

*Telecommunication Systems, Inc.* v. *Mobile 365, Inc.*—Civil Action No. 3:06CV485: Expert Report of Regis J. Bates—Feb. 13, 2007; RE-EX004276-RE-EX004307.

*Telecommunication Systems, Inc.* v. *Mobile 365, Inc.*—Civil Action No. 3:06CV485: Expert Report of Randall A. Snyder—Feb. 13, 2007; RE-EX004308-RE-EX004397.

*Telecommunication Systems, Inc.* v. *Mobile 365, Inc.*—Civil Action No. 3:06CV485: Telecommunication Systems, Inc.'s Second Set of Interrogatories to Mobile 365, Inc.—Feb. 13, 2007; RE-EX0043998-RE-EX004407.

*Telecommunication Systems, Inc.* v. *Mobile 365, Inc.*—Civil Action No. 3:06CV485: Subpoena in a Civil Case to Manelli Denison & Selter PLLC—Feb. 15, 2007; RE-EX004408-RE-EX004425.

*Telecommunication Systems, Inc.* v. *Mobile 365, Inc.*—Civil Action No. 3:06CV485: Subpoena in a Civil Case to William H. Bollman—Feb. 15, 2007; RE-EX004426-RE-EX004443.

*Telecommunication Systems, Inc.* v. *Mobile 365, Inc.*—Civil Action No. 3:06CV485: Notice of Rule 30(B)(6) Deposition—Feb. 19, 2007; RE-EX004444-RE-EX004451.

*Telecommunication Systems, Inc.* v. *Mobile 365, Inc.*—Civil Action No. 3:06CV485: TCS's Responses to Mobile 365's Second Set of Requests for Production of Documents and Things—Feb. 20, 2007; RE-EX004452-RE-EX004491.

*Telecommunication Systems, Inc.* v. *Mobile 365, Inc.*—Civil Action No. 3:06CV485: Objections of William H. Bollman and Manelli Denison & Selter PLLC to the Feb. 15, 2007 Subpoenas from Mobile 365—Feb. 26, 2007; RE-EX004492-RE-EX004510.

*Telecommunication Systems, Inc.* v. *Mobile 365, Inc.*—Civil Action No. 3:06CV485: Notice of Rule 30(B)(6) Deposition for Mar. 13, 2007-Feb. 27, 2007; RE-EX004511-RE-EX004517.

*Telecommunication Systems, Inc.* v. *Mobile 365, Inc.*—Civil Action No. 3:06CV485: Defendant Mobile 365, Inc.'s Objections to Plaintiff's Second Set of Interrogatories (Nos. 14-15) to Mobile 365, Inc.—Feb. 28, 2007; RE-EX004518-RE-EX004526.

*Telecommunication Systems, Inc.* v. *Mobile 365, Inc.*—Civil Action No. 3:06CV485: Mobile 365, Inc.'s Third Set of Requests for Production of Documents and Things to Telecommunication Systems, Inc.—Mar. 2, 2007; RE-EX004527-RE-EX004538.

*Telecommunication Systems, Inc.* v. *Mobile 365, Inc.*—Civil Action No. 3:06CV485: Telecommunication Systems, Inc.'s Requests for Admissions to Mobile 365, Inc.—Mar. 2, 2007; RE-EX004539-RE-EX004546.

*Telecommunication Systems, Inc.* v. *Mobile 365, Inc.*—Civil Action No. 3:06CV485: TCS's Second Set of Document Requests (Nos. 44-55) to Mobile 365, Inc.—Mar. 2, 2007; RE-EX004547-RE-EX004553.

*Telecommunication Systems, Inc.* v. *Mobile 365, Inc.*—Civil Action No. 3:06CV485: Defendant Mobile 365, Inc.'s Objections to Plaintiff's Notice of Rule 30(B)(6) Deposition—Mar. 5, 2007; RE-EX004554-RE-EX004571.

*Telecommunication Systems, Inc.* v. *Mobile 365, Inc.*—Civil Action No. 3:06CV485: Defendant Mobile 365, Inc.'s Supplemental Initial Disclosures Pursuant to Fed.R.Civ.P. 26(A)(1)—Mar. 8, 2007; RE-EX004572-RE-EX004576.

*Telecommunication Systems, Inc.* v. *Mobile 365, Inc.*—Civil Action No. 3:06CV485: Defendant Mobile 365, Inc.'s Responses and Objections to Plaintiff's Second Set of Interrogatories (Nos. 14-15) to Mobile 365, Inc.—Mar. 15, 2007; RE-EX004577-RE-EX004592.

*Telecommunication Systems, Inc.* v. *Mobile 365, Inc.*—Civil Action No. 3:06CV485: Expert Rebuttal Report of Regis J. Bates—Mar. 15, 2007; RE-EX004593-RE-EX004650.

*Telecommunication Systems, Inc.* v. *Mobile 365, Inc.*—Civil Action No. 3:06CV485: Second Expert Report of Randall A. Snyder—Mar. 15, 2007; RE-EX004651-RE-EX004682.

*Telecommunication Systems, Inc.* v. *Mobile 365, Inc.*—Civil Action No. 3:06CV485: TCS' Responses to Mobile 365's Third Set of Requests for Production of Documents and Things—Mar. 16, 2007; RE-EX004683-RE-EX004692.

*Telecommunication Systems, Inc.* v. *Mobile 365, Inc.*—Civil Action No. 3:06CV485: Defendant Mobile 365, Inc.'s Supplemental Responses to Plaintiff's Interrogatories Nos. 4, 5 and 15 to Mobile 365, Inc.—Mar. 19, 2007; RE-EX004693-RE-EX004698.

*Telecommunication Systems, Inc.* v. *Mobile 365, Inc.*—Civil Action No. 3:06CV485: Defendant Mobile 365, Inc.'s Objections to Plaintiff's Third Set of Interrogatories (Nos. 16-24) to Mobile 365, Inc. —Mar. 19, 2007; RE-EX004699-RE-EX004711.

*Telecommunication Systems, Inc.* v. *Mobile 365, Inc.*—Civil Action No. 3:06CV485: Defendant Mobile 365, Inc.'s Objections to Plaintiff's Second Set of Document Requests (Nos. 44-55) to Mobile 365, Inc.—Mar. 19, 2007; RE-EX004712-RE-EX004725.

*Telecommunication Systems, Inc.* v. *Mobile 365, Inc.*—Civil Action No. 3:06CV485: Defendant Mobile 365, Inc.'s Objections to Plaintiff's Requests for Admission to Mobile 365, Inc.—Mar. 19, 2007; RE-EX004726-RE-EX004746.

*Telecommunication Systems, Inc.* v. *Mobile 365, Inc.*—Civil Action No. 3:06CV485:Defendant Mobile 365, Inc.'s Amended Supplemental Response to Plaintiff's Interrogatory No. 15 to Mobile 365, Inc.—Mar. 20, 2007; RE-EX004747-RE-EX004750.

*Telecommunication Systems, Inc.* v. *Mobile 365, Inc.*—Civil Action No. 3:06CV485: Markman Hearing Transcript—Dec. 19, 2006; RE-EX004751-RE-EX004886.

*Telecommunication Systems, Inc.* v. *Mobile 365, Inc.*—Civil Action No. 3:06CV485: Third Expert Report of Regis J. Bates—Mar. 30, 2007; RE-EX004887-RE-EX004902.

*Telecommunication Systems, Inc.* v. *Mobile 365, Inc.*—Civil Action No. 3:06CV485: Third Expert Report of Randall A. Snyder—Mar. 30, 2007; RE-EX004903-RE-EX004919.

*Telecommunication Systems, Inc.* v. *Mobile 365, Inc.*—Civil Action No. 3:06CV485: Defendant Mobile 365, Inc.'s Responses and Objections to Plaintiff's Requests for Admission to Mobile 365, Inc.—Apr. 2, 2007; RE-EX004920-RE-EX004945.

*Telecommunication Systems, Inc.* v. *Mobile 365, Inc.*—Civil Action No. 3:06CV485: Defendant Mobile 365, Inc.'s Responses and Objections to Plaintiff's Third Set of Interrogatories (Nos. 16-24) to Mobile 365, Inc.—Apr. 2, 2007; RE-EX004946-RE-EX004959.

*Telecommunication Systems, Inc.* v. *Mobile 365, Inc.*—Civil Action No. 3:06CV485: Defendant Mobile 365, Inc.'s Objections and Responses to Plaintiff's Second Set of Document Requests (Nos. 44-55) to Mobile 365, Inc.—Apr. 2, 2007; RE-EX004960-RE-EX004973.

*Telecommunication Systems, Inc.* v. *Mobile 365, Inc.*—Civil Action No. 3:06CV485: Declaration of Robert Lovell—Apr. 3, 2007; RE-EX004974-RE-EX004987.

*Telecommunication Systems, Inc.* v. *Mobile 365, Inc.*—Civil Action No. 3:06CV485: Declaration of Thilo Rusche—Apr. 3, 2007; RE-EX004988-RE-EX005032.

*Telecommunication Systems, Inc.* v. *Mobile 365, Inc.*—Civil Action No. 3:06CV485: Declaration of Christian Zimmern—Apr. 3, 2007; RE-EX005033-RE-EX005296.

*Telecommunication Systems, Inc.* v. *Mobile 365, Inc.*—Civil Action No. 3:06CV485: Declaration of Terry Hsiao—Apr. 3, 2007; RE-EX005297-RE-EX005586.

*Telecommunication Systems, Inc.* v. *Mobile 365, Inc.*—Civil Action No. 3:06CV485: Memorandum of Law in Support of Plaintiff Telecommunication Systems, Inc.'s Motion for Summary Judgement on Defendant Mobile 365, Inc.'s Affirmative Defense and Counterclaim Based on 35 U.S.C. § 102(g)(2)—Apr. 4, 2007; RE-EX005587-RE-EX005620.

*Telecommunication Systems, Inc.* v. *Mobile 365, Inc.*—Civil Action No. 3:06CV485: Mobile 365, Inc.'s Brief in Support of Summary Judgment—Apr. 4, 2007; RE-EX005621-RE-EX005656.

*Telecommunication Systems, Inc.* v. *Mobile 365, Inc.*—Civil Action No. 3:06CV485: Mobile 365, Inc.'s Motion for Summary Judgment—Apr. 4, 2007; RE-EX005657-RE-EX005660.

*Telecommunication Systems, Inc.* v. *Mobile 365, Inc.*—Civil Action No. 3:06CV485: Declaration of Elizabeth Miller Roesel, Esq. in Support of Mobile 365, Inc.'s Motion for Summary Judgment—Apr. 4, 2007; RE-EX005661-RE-EX005757.

*Telecommunication Systems, Inc.* v. *Mobile 365, Inc.*—Civil Action No. 3:06CV485: Memorandum of Law in Support of Plaintiff Telecommunication Systems, Inc.'s Motion for Summary Judgment on Defendant Mobile 365, Inc.'s Affirmative Defense and Counterclaim Based on 35 U.S.C. § 108(g)(2)—Apr. 4, 2007; RE-EX005758-RE-EX006410.

*Telecommunication Systems, Inc.* v. *Mobile 365, Inc.*—Civil Action No. 3:06CV485: Replacement Copy of Declaration of Robert Lovell Served on Apr. 4, 2007-Apr. 9, 2007; RE-EX006411-RE-EX006425.

*Telecommunication Systems, Inc.* v. *Mobile 365, Inc.*—Civil Action No. 3:06CV485: Mobile 365, Inc.'s Brief in Opposition to TCS' Motion for Summary Judgment—Apr. 13, 2007; RE-EX006426-RE-EX006470.

*Telecommunication Systems, Inc.* v. *Mobile 365, Inc.*—Civil Action No. 3:06CV485: Declaration of June Elizabeth Cohan, Esq. in Support of Mobile 365, Inc.'s Opposition to TCS' Motion for Summary Judgment—Apr. 13, 2007; RE-EX006471-RE-EX006771.

*Telecommunication Systems, Inc.* v. *Mobile 365, Inc.*—Civil Action No. 3:06CV485: Telecommunication Systems, Inc.'s Opposition to Mobile 365, Inc.'s Motion for Summary Judgment—Apr. 13, 2007; RE-EX006772-RE-EX007013.

*Telecommunication Systems, Inc.* v. *Mobile 365, Inc.*—Civil Action No. 3:06CV485: Telecommunication Systems, Inc.'s Reply in Support of its Motion for Summary Judgment on Defendant Mobile 365, Inc.'s Affirmative Defense and Counterclaim Based on 35 U.S.C. § 102(g)(2)—Apr. 20, 2007; RE-EX007014-RE-EX007036.

*Telecommunication Systems, Inc.* v. *Mobile 365, Inc.*—Civil Action No. 3:06CV485: Mobile 365, Inc.'s Reply Brief in Support of its Motion for Summary Judgment—Apr. 20, 2007; RE-EX007037-RE-EX007061.

*Telecommunication Systems, Inc.* v. *Mobile 365, Inc.*—Civil Action No. 3:06CV485: Declaration of June Elizabeth Cohan Esq. in Support of Mobile 365, Inc.'s Reply Brief in Support of its Motion or Summary Judgment—Apr. 20, 2007; RE-EX007062-RE-EX007129.

*Telecommunication Systems, Inc.* v. *Mobile 365, Inc.*—Civil Action No. 3:06CV485: Declaration of Christian Zimmern—Apr. 19, 2007; RE-EX007130-RE-EX007131.

*Telecommunication Systems, Inc.* v. *Mobile 365, Inc.*—Civil Action No. 3:06CV485: Declaration of Michael Lencioni—Apr. 19, 2007; RE-EX007132-RE-EX007137.

*Telecommunication Systems, Inc.* v. *Mobile 365, Inc.*—Civil Action No. 3:06CV485: TCS's Supplemental Disclosures Pursuant to Fed.R.Civ.P. 26(a)(1)—Apr. 26, 2007; RE-EX007138-RE-EX007141.

*Telecommunication Systems, Inc.* v. *Mobile 365, Inc.*—Civil Action No. 3:06CV485: TCS's Second Supplemental Response to Mobile 365, Inc.'s Interrogatory No. 1—Apr. 27, 2007; RE-EX007142-RE-EX007145.

*Telecommunication Systems, Inc.* v. *Mobile 365, Inc.*—Civil Action No. 3:06CV485: Defendant Mobile 365, Inc.'s Second Supplemental Initial Disclosures Pursuant to Fed.R.Civ.P. 26(A)(1)—Apr. 27, 2007; RE-EX007146-RE-EX007151.

*Telecommunication Systems, Inc.* v. *Mobile 365, Inc.*—Civil Action No. 3:06CV485: Order—May 1, 2007; RE-EX007152-RE-EX007152.

*Telecommunication Systems, Inc.* v. *Mobile 365, Inc.*—Civil Action No. 3:06CV485: Transcript for Argument on Motions to Dismiss (Rush Transcript—Not Proofed)—May 1, 2007; RE-EX007153-RE-EX007236.

*Telecommunication Systems, Inc.* v. *Mobile 365, Inc.*—Civil Action No. 3:06CV485: [Draft Proposed] Parties' Stipulation of Uncontroverted Facts—May 1, 2007; RE-EX007237-RE-EX007245.

*Telecommunication Systems, Inc.* v. *Mobile 365, Inc.*—Civil Action No. 3:06CV485: Defendant Mobile 365, Inc.'s Third Supplemental Initial Disclosures Pursuant to Fed.R.Civ.P. 26(A)(1)—May 2, 2007; RE-EX007246-RE-EX007251.

*Telecommunication Systems, Inc.* v. *Mobile 365, Inc.*—Civil Action No. 3:06CV485: Declaration of Tina Griffee—May 3, 2007; RE-EX007252-RE-EX007253.

*Telecommunication Systems, Inc.* v. *Mobile 365, Inc.*—Civil Action No. 3:06CV485: Parties' Stipulation of Uncontroverted Facts—May 4, 2007; RE-EX007254-RE-EX007255.

*Telecommunication Systems, Inc.* v. *Mobile 365, Inc.*—Civil Action No. 3:06CV485: Plaintiff Telecommunication Systems, Inc.'s Trial Exhibit List—May 4, 2007; RE-EX007256-RE-EX007274.

*Telecommunication Systems, Inc.* v. *Mobile 365, Inc.*—Civil Action No. 3:06CV485: Defendant Mobile 365, Inc.'s Trial Exhibit List—May 7, 2007; RE-EX007275-RE-EX007284.

*Telecommunication Systems, Inc.* v. *Mobile 365, Inc.*—Civil Action No. 3:06CV485: Telecommunication Systems, Inc.'s Motion to Set the Equitable Issue of Inequitable Conduct for Trial by the Court After the Jury Trial on Liability and Damages—May 7, 2007; RE-EX007285-RE-EX007292.

*Telecommunication Systems, Inc.* v. *Mobile 365, Inc.*—Civil Action No. 3:06CV485: Defendant Mobile 365, Inc.'s Fourth Supplemental Initial Disclosures Pursuant to Fed.R.Civ.P. 26(A)(1)—May 7, 2007; RE-EX007293-RE-EX007296.

*Telecommunication Systems, Inc.* v. *Mobile 365, Inc.*—Civil Action No. 3:06CV485: Defendant Mobile 365, Inc.'s Supplemental Responses to Plaintiff's Interrogatory Nos. 4 and 5 to Mobile 365, Inc.—May 7, 2007; RE-EX007297-RE-EX007301.

*Telecommunication Systems, Inc.* v. *Mobile 365, Inc.*—Civil Action No. 3:06CV485: Telecommunication Systems, Inc.'s Motion in Limine to Exclude Defendant's Surprise Third-Party Trial Witnesses Named "Allen Strauss," "Uwe Mayer" and "Joerg Zender"—May 8, 2007; RE-EX007302-RE-EX007345.

*Telecommunication Systems, Inc.* v. *Mobile 365, Inc.*—Civil Action No. 3:06CV485: Telecommunication Systems, Inc.'s Motion in Limine to Preclude Defendant from Presenting Evidence at Trial Based on German "Gucky" Documents, Translations and Related Emails (Defendant Trial Exhibits 20-21, 34-37) Which Were Untimely Produced, Which are Inadmissibile Hearsay, and Which are in Violation of 35 U.S.C. §282—May 8, 2007; RE-EX007346-RE-EX007374.

*Telecommunication Systems, Inc.* v. *Mobile 365, Inc.*—Civil Action No. 3:06CV485: Mobile 365's Brief in Opposition to Motion to Set the Equitable Issue of Inequitable Conduct for Separate Trial by the Court After the Jury Trial on Liability and Damages—May 8, 2007; RE-EX007375-RE-EX007382.

*Telecommunication Systems, Inc.* v. *Mobile 365, Inc.*—Civil Action No. 3:06CV485: Telecommunication Systems, Inc.'s First Supplemental Trial Exhibit List—May 9, 2007; RE-EX007383-RE-EX007402.

*Telecommunication Systems, Inc.* v. *Mobile 365, Inc.*—Civil Action No. 3:06CV485: Mobile 365, Inc.'s Opposition to TCS' Motion in Limine Regarding German "Gucky" Documents—May 9, 2007; RE-EX007403-RE-EX007495.

*Telecommunication Systems, Inc.* v. *Mobile 365, Inc.*—Civil Action No. 3:06CV485: Mobile 365, Inc.'s Motion in Limine to Exclude Plaintiff's Untimely Disclosed Trial Witnesses—May 9, 2007; RE-EX007496-RE-EX007521.

*Telecommunication Systems, Inc.* v. *Mobile 365, Inc.*—Civil Action No. 3:06CV485: Mobile 365, Inc.'s Motion in Limine to Preclude Plaintiff from Introducing Evidence at Trial Relating to Late-Produced Document Authored by the Alleged Inventor Chris Knotts—May 9, 2007; RE-EX007522-RE-EX007523.

*Telecommunication Systems, Inc.* v. *Mobile 365, Inc.*—Civil Action No. 3:06CV485: Mobile 365, Inc.'s Brief in Support of Motion in Limine to Preclude Plaintiff from Introducing Evidence as Trial Realating to Late-Produced Document Authored by the Alleged Inventor Chris Knots—May 9, 2007; RE-EX007524-RE-EX007550.

*Telecommunication Systems, Inc.* v. *Mobile 365, Inc.*—Civil Action No. 3:06CV485: Mobile 365, Inc.'s Motion in Limine to Preclude Plaintiff from Introducing Evidence or Argument at Trial in Support of a Conception Date Before Sep. 2000—May 10, 2007; RE-EX007551-RE-EX007616.

*Telecommunication Systems, Inc.* v. *Mobile 365, Inc.*—Civil Action No. 3:06CV485: Mobile 365, Inc.'s Supplemental Brief in Support of Motion in Limine to Preclude Plaintiff from Introducing Evidence at Trial Relating to Late-Produced Document Authored by the Alleged Inventor Chris Knotts and Motion in Limine to Preclude Plaintiff from Introducing Evidence or Argument at Trial in Support of a Conception Date Before Sep. 2000—May 10, 2007; RE-EX007617-RE-EX007667.

*Telecommunication Systems, Inc.* v. *Mobile 365, Inc.*—Civil Action No. 3:06CV485: Plaintiff's Response to Mobile 365, Inc.'s Motion in Limine to Exclude Plaintiff's Untimely Disclosed Trial Witnesses—May 10, 2007; RE-EX007668-RE-EX007688.

*Telecommunication Systems, Inc.* v. *Mobile 365, Inc.*—Civil Action No. 3:06CV485: Telecommunication Systems, Inc.'s Second Supplemental Trial Exhibit List—May 10, 2007; RE-EX007689-RE-EX007709.

*Telecommunication Systems, Inc.* v. *Mobile 365, Inc.*—Civil Action No. 3:06CV485: Mobile 365, Inc.'s Reply in Further Support of its Motion in Limine to Exclude Untimely Diclosed Trial Witnesses—May 11, 2007; RE-EX007710-RE-EX007712.

*Telecommunication Systems, Inc.* v. *Mobile 365, Inc.*—Civil Action No. 3:06CV485: Order—May 11, 2007; RE-EX007713-RE-EX007714.

*Telecommunication Systems, Inc.* v. *Mobile 365, Inc.*—Civil Action No. 3:06CV485: Opposition to Mobile 365, Inc.'s Untimely Motion in Limine to Preclude Plaintiff from Introducing Evidence or Argument at Trial in Support of a Conception Date Before Sep. 2000—May 11, 2007; RE-EX007715-RE-EX007721.

*Telecommunication Systems, Inc.* v. *Mobile 365, Inc.*—Civil Action No. 3:06CV485: Plaintiff's Opposition to Mobile 365, Inc.'s Motion in Limine to Preclude Plaintiff from Introducing Evidence at Trial Relating to Late-Produced Document Authored by the Alleged Inventor Chris Knotts—May 11, 2007; RE-EX007722-RE-EX007740.

*Telecommunication Systems, Inc.* v. *Mobile 365, Inc.*—Civil Action No. 3:06CV485: Declaration of Christian Zimmern—May 9, 2007; RE-EX007741-RE-EX007742.

*Telecommunication Systems, Inc.* v. *Mobile 365, Inc.*—Civil Action No. 3:06CV485: Mobile 365, Inc.'s Reply in Support of Mobile 365, Inc.'s Motion in Limine to Preclude Plaintiff from Introducing Evidence at Trial Related to Late Produced Document Authored by the Alleged Inventor Chris Knotts—May 11, 2007; RE-EX007743-RE-EX007746.

*Telecommunication Systems, Inc.* v. *Mobile 365, Inc.*—Civil Action No. 3:06CV485: Mobile 365, Inc.'s Reply in Support of Mobile 365, Inc.'s Motion in Limine to Preclude Plaintiff from Introducing Evidence or Argument at Trial in Support of a Conception Date Before Sep. 2000—May 11, 2007; RE-EX007747-RE-EX007760.

*Telecommunication Systems, Inc.* v. *Mobile 365, Inc.*—Civil Action No. 3:06CV485: Plaintiff's Supplemental Response to Mobile 365's Motion in Limine to Exclude Witnesses—May 11, 2007; RE-EX007761-RE-EX007763.

*Telecommunication Systems, Inc.* v. *Mobile 365, Inc.*—Civil Action No. 3:06CV485: Defendant Mobile 365, Inc.'s Supplemental Trial Exhibit List (p. 8 of Supplemental Trial Exhibit List Was Initially Omitted from Service Copy)—May 11, 2007; RE-EX007764-RE-EX007775.

*Telecommunication Systems, Inc.* v. *Mobile 365, Inc.*—Civil Action No. 3:06CV485: Defendant Mobile 365, Inc.'s Second Supplemental Trial Exhibit List—May 14, 2007; RE-EX007776-RE-EX0007786.

*Telecommunication Systems, Inc.* v. *Mobile 365, Inc.*—Civil Action No. 3:06CV485: Telecommunication Systems, Inc.'s Third Supplemental Trial Exhibit List—May 14, 2007; RE-EX007787-RE-EX007809.

*Telecommunication Systems, Inc.* v. *Mobile 365, Inc.*—Civil Action No. 3:06CV485: Mobile 365's Motion to Strike Plaintiff's Demonstratives and for Clarification and/or Reconsideration of Motion in Limine to Preclude TCS from Presenting Testimony and Argument Inconsistent with the Court's Claim Construction and Memorandum in Support—May 14, 2007; RE-EX007810-RE-EX007831.

*Telecommunication Systems, Inc.* v. *Mobile 365, Inc.*—Civil Action No. 3:06CV485: Mobile 365 Inc.'s Motion to Withdraw its Motion in Limine to Exclude Plaintiff's Untimely Disclosed Trial Witnesses with Respect to Plaintiff Witness Maurice Tosé and Memorandum in Support—May 14, 2007; RE-EX007832-RE-EX007834.

*Telecommunication Systems, Inc.* v. *Mobile 365, Inc.*—Civil Action No. 3:06CV485: Telecommunication Systems, Inc.'s Fourth Supplemental Trial Exhibit List—May 14, 2007; RE-EX007835-RE-EX007857.

*Telecommunication Systems, Inc.* v. *Mobile 365, Inc.*—Civil Action No. 3:06CV485: TCS's Opposition to Mobile 365's Motion to Strike Demonstratives and to Reconsider—May 14, 2007; RE-EX007858-RE-EX007866.

*Telecommunication Systems, Inc.* v. *Mobile 365, Inc.*—Civil Action No. 3:06CV485: Order Granting Mobile 365 Inc.'s Motion to Withdraw its Motion in Limine to Exclude Plaintiff's Untimely Disclosed Trial Witnesses with Respect to Plaintiff Witness Maurice Tosé and Memorandum in Support—May 15, 2007; RE-EX007867-RE-EX007869.

*Telecommunication Systems, Inc.* v. *Mobile 365, Inc.*—Civil Action No. 3:06CV485: Telecommunication Systems, Inc.'s Fifth Supplemental Trial Exhibit List—May 16, 2007; RE-EX007870-RE-EX007892.

*Telecommunication Systems, Inc.* v. *Mobile 365, Inc.*—Civil Action No. 3:06CV485: Telecommunication Systems, Inc.'s Sixth Supplemental Trial Exhibit List—May 17, 2007; RE-EX007893-RE-EX007915.

*Telecommunication Systems, Inc.* v. *Mobile 365, Inc.*—Civil Action No. 3:06CV485: Defendant Mobile 365, Inc.'s Third Supplemental Trial Exhibit List—May 18, 2007; RE-EX007916-RE-EX007926.

*Telecommunication Systems, Inc.* v. *Mobile 365, Inc.*—Civil Action No. 3:06CV485: TCS's Trial Memorandum Concerning the Inadmissibility of Mobile 365's "Secret Prior Art"—May 18, 2007; RE-EX007927-RE-EX007983.

*Telecommunication Systems, Inc.* v. *Mobile 365, Inc.*—Civil Action No. 3:06CV485: Telecommunication Systems, Inc.'s Seventh Supplemental Trial Exhibit List—May 18, 2007; RE-EX007984-RE-EX008008.

*Telecommunication Systems, Inc.* v. *Mobile 365, Inc.*—Civil Action No. 3:06CV485: Motion to Bar Re-Opening of Lovell Testimony—May 21, 2007; RE-EX008009-RE-EX008014.

*Telecommunication Systems, Inc.* v. *Mobile 365, Inc.*—Civil Action No. 3:06CV485: Mobile 365, Inc.'s Response to Plaintiff's Trial Memorandum Regarding "Secret Prior Art" and Request for Jury Instruction—May 21, 2007; RE-EX008015-RE-EX008024.

*Telecommunication Systems, Inc.* v. *Mobile 365, Inc.*—Civil Action No. 3:06CV485: Defendant Mobile 365, Inc.'s Fourth Supplemental Trial Exhibit List—May 21, 2007; RE-EX008025-RE-EX008035.

*Telecommunication Systems, Inc.* v. *Mobile 365, Inc.*—Civil Action No. 3:06CV485: TCS's Reply Memorandum Concerning "Secret Prior Art"—May 21, 2007; RE-EX008036-RE-EX008040.
*Telecommunication Systems, Inc.* v. *Mobile 365, Inc.*—Civil Action No. 3:06CV485: Telecommunication Systems, Inc.'s Eighth Supplemental Trial Exhibit List—May 22, 2007; RE-EX008041-RE-EX008063.
*Telecommunication Systems, Inc.* v. *Mobile 365, Inc.*—Civil Action No. 3:06CV485: Plaintiff TCS's Motion for Judgment as a Matter of Law on Mobile 365's Affirmative Defense and Counterclaims of Invalidity and Inequitable Conduct—May 23, 2007; RE-EX008064-RE-EX008087.
*Telecommunication Systems, Inc.* v. *Mobile 365, Inc.*—Civil Action No. 3:06CV485: TCS's Motion for Enhanced Damages—Jun. 5, 2007; RE-EX008088-RE-EX008089.
*Telecommunication Systems, Inc.* v. *Mobile 365, Inc.*—Civil Action No. 3:06CV485: TCS' Memorandum in Support of its Motion for Enhanced Damages—Jun. 5, 2007; RE-EX008090-RE-EX008300.
*Telecommunication Systems, Inc.* v. *Mobile 365, Inc.*—Civil Action No. 3:06CV485: Mobile 365's Post Trial Memorandum in Support of Affirmative Defense of Inequitable Conduct—Jun. 22, 2007; RE-EX008301-RE-EX008367.
*Telecommunication Systems, Inc.* v. *Mobile 365, Inc.*—Civil Action No. 3:06CV485: Mobile 365, Inc.'s Renewed Motion for Judgment as a Matter of Law or, in the Alternative, a New Trial and Supporting Brief—Jun. 22, 2007; RE-EX008368-RE-EX008451.
*Telecommunication Systems, Inc.* v. *Mobile 365, Inc.*—Civil Action No. 3:06CV485: Mobile 365, Inc.'s Opposition to TCS's Motion for Enhanced Damages—Jul. 2, 2007; RE-EX008452-RE-EX008628.
*Telecommunication Systems, Inc.* v. *Mobile 365, Inc.*—Civil Action No. 3:06CV485: TCS's Reply Memorandum in Support of its Motion for Enhanced Damages—Jul. 12, 2007; RE-EX008629-RE-EX008790.
*Telecommunication Systems, Inc.* v. *Mobile 365, Inc.*—Civil Action No. 3:06CV485: TCS's Response to Mobile 365's Motion for Judgment as a Matter of Law—Jul. 13, 2007; RE-EX008791-RE-EX009249.
*Telecommunication Systems, Inc.* v. *Mobile 365, Inc.*—Civil Action No. 3:06CV485: TCS's Post-Trial Brief and Closing Argument Concerning Mobile 365's New Inequitable Conduct Theory—Jul. 13, 2007; RE-EX009250-RE-EX009548.
*Telecommunication Systems, Inc.* v. *Mobile 365, Inc.*—Civil Action No. 3:06CV485: Mobile 365's Combined Reply in Support of Motion for Judgment as a Matter of Law or, in the Alternative, a New Trial on Pre-Issuance Damages and Double-Patenting, and Reply in Support of Remittitur—Jul. 18, 2007; RE-EX009549-RE-EX009696.
*Telecommunication Systems, Inc.* v. *Mobile 365, Inc.*—Civil Action No. 3:06CV485: Mobile 365, Inc.'s Post Trial Reply in Support of Affirmative Defense of Inequitable Conduct—Jul. 18, 2007; RE-EX009697-RE-EX009735.
*Telecommunication Systems, Inc.* v. *Mobile 365, Inc.*—Civil Action No. 3:06CV485: Mobile 365, Inc.'s Reply in Support of Renewed Motion for Judgment as a Matter of Law or, in the Alternative, a New Trial—Jul. 18, 2007; RE-EX009736-RE-EX009936.
*Telecommunication Systems, Inc.* v. *Mobile 365, Inc.*—Civil Action No. 3:06CV485: Letter to Fernando Galindo from Jack W. Burtch, Jr. Enclosing a Copy of Exhibit 18 to Mobile 365's Opposition to TCS' Motion for Attorney Fees Under 35 U.S.C. 285—Jul. 30, 2007; RE-EX009937-RE-EX009987.
*Telecommunication Systems, Inc.* v. *Mobile 365, Inc.*—Civil Action No. 3:06CV485: Memorandum Opinion—Aug. 21, 2007; RE-EX009988-RE-EX009998.
*Telecommunication Systems, Inc.* v. *Mobile 365, Inc.*—Civil Action No. 3:06CV485: Trial Transcript Corrections—Oct. 2, 2007; RE-EX009999-RE-EX010001.
*Telecommunication Systems, Inc.* v. *Mobile 365, Inc.*—Civil Action No. 3:06CV485: TCS's Response to Request for Trial Transcript Corrections—Oct. 4, 2007; RE-EX010002-RE-EX010010.
*Telecommunication Systems, Inc.* v. *Mobile 365, Inc.*—Civil Action No. 3:06CV485: Jury Trial Transcript May 15, 2007 vol. I—pp. 1-192; RE-EX010011-RE-EX010059.

*Telecommunication Systems, Inc.* v. *Mobile 365, Inc.*—Civil Action No. 3:06CV485: Jury Trial Transcript May 16, 2007 vol. II—pp. 193-455; RE-EX010060-RE-EX010126.
*Telecommunication Systems, Inc.* v. *Mobile 365, Inc.*—Civil Action No. 3:06CV485: Jury Trial Transcript May 17, 2007 vol. III—pp. 456-721 and 750 (excludes testimony of Joseph Gemini); RE-EX010127-RE-EX010195.
*Telecommunication Systems, Inc.* v. *Mobile 365, Inc.*—Civil Action No. 3:06CV485: Jury Trial Transcript May 18, 2007 vol. IV—pp. 751-754 and 829-996 (excludes testimony of Joseph Gemini); RE-EX010196-RE-EX010240.
*Telecommunication Systems, Inc.* v. *Mobile 365, Inc.*—Civil Action No. 3:06CV485: Jury Trial Transcript May 21, 2007 vol. V—pp. 997-1215; RE-EX010241-RE-EX010296.
*Telecommunication Systems, Inc.* v. *Mobile 365, Inc.*—Civil Action No. 3:06CV485: Jury Trial Transcript May 22, 2007 vol. VI—pp. 1216-1409 and 1491-1518 (excludes testimony of John Bone); RE-EX010297-RE-EX010354.
*Telecommunication Systems, Inc.* v. *Mobile 365, Inc.*—Civil Action No. 3:06CV485: Jury Trial Transcript May 23, 2007 vol. VII—pp. 1519-1754; RE-EX010355-RE-EX010415.
*Telecommunication Systems, Inc.* v. *Mobile 365, Inc.*—Civil Action No. 3:06CV485: Jury Trial Transcript May 24, 2007 vol. VIII—pp. 1755-1831; RE-EX010416-RE-EX010435.
*Telecommunication Systems, Inc.* v. *Mobile 365, Inc.*—Civil Action No. 3:06CV485: Jury Trial Transcript May 25, 2007 vol. IX—pp. 1832-1841; RE-EX010436-RE-EX010438.
*Telecommunication Systems, Inc.* v. *Mobile 365, Inc.*—Civil Action No. 3:06CV485: Deposition of Regis J. Bates, Confidential—Attorneys' Eyes Only—Mar. 23, 2007; RE-EX010439-RE-EX010500.
*Telecommunication Systems, Inc.* v. *Mobile 365, Inc.*—Civil Action No. 3:06CV485: Deposition of William Bollman, Confidential—Non-Prosecuting Attorneys' Eyes Only—Mar. 22, 2007; RE-EX010501-RE-EX010558.
*Telecommunication Systems, Inc.* v. *Mobile 365, Inc.*—Civil Action No. 3:06CV485: Deposition of Elliott Hamilton, Subject to Protective Order—Non-Prosecuting Attorneys' Eyes Only—Mar. 16, 2007; RE-EX010559-RE-EX010638.
*Telecommunication Systems, Inc.* v. *Mobile 365, Inc.*—Civil Action No. 3:06CV485: Deposition of Mark D. Johnson, Subject to Protective Order—Non-Prosecuting Attorneys' Eyes Only—Mar. 15, 2007; RE-EX010639-RE-EX010719.
*Telecommunication Systems, Inc.* v. *Mobile 365, Inc.*—Civil Action No. 3:06CV485: Deposition of Chris Knotts, Confidential—Attorneys' Eyes Only—Nov. 15, 2006; RE-EX010720-RE-EX010779.
*Telecommunication Systems, Inc.* v. *Mobile 365, Inc.*—Civil Action No. 3:06CV485: Deposition of Robert Lovell, Confidential—Attorneys' Eyes Only—Mar. 21, 2007 and 4 Completed Errata Sheets; RE-EX010780-RE-EX010817.
*Telecommunication Systems, Inc.* v. *Mobile 365, Inc.*—Civil Action No. 3:06CV485: Deposition of Randall Snyder, Highly Confidential—Apr. 3, 2007; RE-EX010818-RE-EX010866.
Snyder Dep. Exh. 2: Second Expert Report of Randall A. Snyder—Mar. 15, 2007; RE-EX010867-RE-EX010898.
Snyder Dep. Exh. 3: Third Expert Report of Randall A. Snyder—Mar. 30, 2007; RE-EX010899-RE-EX010915.
Snyder Dep. Exh. 6: Cross-Carrier Interoperability for VoiceStream SMS Messaging—InphoXchange for SMS: Universal, Global Messaging ("IM Proposal")—InphoMatch, Inc. Proposal by Brian Kathman to Mitch Lustig of VoiceStream—Oct. 5, 2000; MOB 002136-MOB 002144; RE-EX010916-RE-EX010924.
Snyder Dep. Exh. 7: InphoMatch Final Report: Process, System and Technical Evaluation—Jan. 25, 2002; MOB-E0073321-MOB-E0073387; RE-EX010925-RE-EX010991.
Snyder Dep. Exh. 8: SMPP Gateway Logical Diagram—Feb. 6, 2001; MOB 002491; RE-EX010992-RE-EX010992.
Snyder Dep. Exh. 9: "Mobile Messaging & Internet Applications: Why SMS is a Success in Europe . . . "—IC3S Presentation on Gucky ("Gucky") by Christian Zimmern, CEO—Jul. 17, 2000; MOB 002109-MOB 002127; RE-EX010993-RE-EX011011.

Bates Dep. Exh. 3: Expert Rebuttal Report of Regis J. Bates—Mar. 15, 2007; RE-EX011012-RE-EX011069.
Bates Dep. Exh. 4: Third Expert Report of Regis J. Bates—Mar. 30, 2007; RE-EX011070-RE-EX011083.
Bates Dep. Exh. 6: InphoMatch Final Report: Process, System and Technical Evaluation—Jan. 25, 2002; MOB-E0073321-MOB-E0073387; RE-EX011087-RE-EX011153.
Bates Dep. Exh. 8: Order—Dec. 21, 2006; RE-EX011242-RE-EX011248.
Bates Dep. Exh. 9: File from Robert to Ven re Miscellaneous (Current and Upcoming Activities)—Sep. 9, 2002; MOB-E0072543-MOB-E0072546; RE-EX011249-RE-EX011252.
Bates Dep. Exh. 10: "Mobile Messaging & Internet Applications: Why SMS is a Success in Europe . . . " IC3S Presentation on Gucky ("Gucky") by Christian Zimmern, CEO—Jul. 17, 2000; MOB 002109-MOB 002127; RE-EX011253-RE-EX011271.
Bates Dep. Exh. 11: Cross-Carrier Interoperability for VoiceStream SMS Messaging—InphoXchange for SMS: Universal, Global Messaging ("IM Proposal")—InphoMatch, Inc. Proposal by Brian Kathman to Mitch Lusting of VoiceStream—Oct. 5, 2000; MOB 002136-MOB 002144; RE-EX011272-RE-EX011280.
Bollman Dep. Exh. 4, Hamilton Dep. Exh. 30, Johnson Dep. Exh. 17, Knotts Dep. Exh. 8: TeleCommunication Systems, Inc. Invention Disclosure Form (listing Aug. 20, 2001—Sprint PCS White Paper)—Dec. 8, 2000; TCS 000011-TCS 000015; RE-EX011281-RE-EX011285.
Bollman Dep. Exh. 5: Handwritten Notes—Dec. 7, 2000 and Nov. 9, 2000; TCS115682-TCS115685; RE-EX011286-RE-EX011289.
Bollman Dep. Exh. 6: Email from Chris Knotts to Timothy Lorello, Drew Morin, Patrick Sweeney and Bruce White Cc Mark Johnson and Nancy Riess re: Patentable Inter-Carrier Messaging Process? attaching TCS Message Distribution Center: MDC Inter-Carrier Messaging—Apr. 6, 2001; TCS115617-TCS115623; RE-EX011290-RE-EX011296.
Bollman Dep. Exh. 7: "Proposal for Inter-Carrier SMS Services" Prepared by TeleCommunication Systems for Barbara Brown at AT&T Wireless Services—Aug. 31, 2001; TCS114624-TCS114642; RE-EX011297-RE-EX011315.
Lovell Dep. Exh. 1: Second Expert Report of Randall A. Snyder—Mar. 15, 2007; RE-EX011317-RE-EX011348.
Lovell Dep. Exh. 3: Memo from Robert to Ven re: SS7 Question—Nov. 29, 2002; MOB-E0072634-MOB-E072636; RE-EX011349-RE-EX011351.
Lovell Dep. Exh. 6: InphoXchange FAQ: The Proven SMS Interoperability Platform—Jun. 27, 2001; MOB-E1177728-MOB-E1177737; RE-EX011388-RE-EX011397.
Lovell Dep. Exh. 7: Teaming Relationship Memorandum of Understanding between InphoMatch IC3S and InphoMatch—Aug. 18, 2000 and IC3S Subcontract Agreement for United Technologies—Feb. 14, 2001; MOB-E1177570-MOB-E1177578; RE-EX011398-RE-EX011406.
Lovell Dep. Exh. 8: InphoMatch Executive Summary—Dec. 2000; MOB-E0078528-MOB-E0078532; RE-EX011407-RE-EX011411.
Lovell Dep. Exh. 9: SMPP Gateway Logical Diagram—Feb. 6, 2001; MOB 002491; RE-EX011412-RE-EX011412.
Lovell Dep. Exh. 10: InphoMatch Final Report: Process, System and Technical Evaluation—Jan. 25, 2002; MOB-E0073321-E0073387; RE-EX011413-RE-EX011479.
Lovell Dep. Exh. 12: Memo from Robert to File re: Mobile 365 Patent Summary—Nov. 1, 2006; MOB-E0072874-MOB-E0072902; RE-EX011480-RE-EX011508.
Lovell Dep. Exh. 14: InphoMatch: Engineering and Operations, Dave Neyland—Aug. 1, 2002; MOB-E0073735-MOB-E0073760; RE-EX011509-RE-EX011534.
Hamilton Dep. Exh. 5: ETSI TS 123 040 v.3.5.0 Technical Specification (3 GPP); Universal Mobile Telecommunication System (UMTS); Technical realization of the Short Message Service (SMS) (3G TS 23.040 version 3.5.0 Release 1999)—1999; MOB-E0128527-MOB-E0128652; RE-EX011543-RE-EX011668.
Hamilton Dep. Exh. 7: Short Message Peer to Peer Protocol Specification (SMPP) v3.4—Dec. 12, 1999 Issue 1.2; MOB 001087-MOB 001255; RE-EX011673-RE-EX0011841.
Hamilton Dep. Exh. 8: "Singapore Takes First Step Towards Seamless Data Architecture" Infocom Hub—Feb. 1999; MOB-E0128655; RE-EX011842-RE-EX011842.
Hamilton Dep. Exh. 17: RFC #822 Standard for the Format of ARPA Internet Text Messages, Dept. of Electrical Engineering, University of Delaware—Aug. 13, 1982; MOB-E0128469-MOB-E0128518; RE-EX011843-RE-EX011892.
Hamilton Dep. Exh. 18, Johnson Dep. Exh. 6: "Mobile Messaging & Internet Applications: Why SMS is a Sucess in Europe . . . " IC3S Presentation on Gucky ("Gucky") by Christian Zimmern, CEO—Jul. 17, 2000; MOB 002109-MOB 002127; RE-EX011893-RE-EX011911.
Hamilton Dep. Exh. 19: Telecommunication Systems Inc. Collection of Emails and Attachments re: Christian Zimmern—Jun. 8, 2000; Sep. 6, 2000; Sep. 7, 2000; Sep. 25, 2000; TCS112226-TCS112240; RE-EX011912-RE-EX011926.
Hamilton Dep. Exh. 20: Collection of Emails and Attachments re: ACT Mobile Messaging Conference—Jun. 6, 2000; Jun. 8, 2000; Jun. 12, 2000; Jun. 29, 2000; Jul. 14, 2000; Jul. 17, 2000; TCS11241-TCS112263; RE-EX011927-RE-EX011949.
Hamilton Dep. Exh. 21, Knotts Dep. Exh. 13: Mobile Messaging & Internet Applications ACT Conference Documents—Jul. 2000; RE-EX011950-RE-EX011963.
Hamilton Dep. Exh. 22: Cross-Carrier Interoperability for VoiceStream SMS Messaging—InphoXchange for SMS: Universal, Global Messaging ("IM Proposal")—InphoMatch, Inc. Proposal by Brian Kathman to Mitch Lustig of VoiceStream—Oct. 5, 2000; MOB 002136-MOB 002144; RE-EX011964-RE-EX011972.
Hamilton Dep. Exh. 23, Johnson Dep. Exh. 12: Inter-Carrier SMS Clearinghouse Business Case—Oct. 20, 2000 and Letter from Young to Knotts—Oct. 5, 1999; TCS111603-TCS111606; RE-EX011973-RE-EX011976.
Hamilton Dep. Exh. 24: United States Wireless Carrier Inter-Carrier Messaging Conference with handwritten notes—Oct. 25, 2001; Meeting Agenda; Meeting Crib Notes; Non-Disclosure Agreement—Oct. 19, 2001; IC3S Business Plan Draft v 1.3 Pages—Sep. 12, 2000; IC3S Detecon Business Opportunity Profile—Sep. 25, 2000; TCS111607-TCS111622; RE-EX011977-RE-EX011992.
Hamilton Dep. Exh. 25: TeleCommunication Systems: North American Inter-Carrier Messaging Symposium Draft Agenda; Inter Carrier Messaging Forum; Form Letter—Sep. 18, 2001; TCS78022-TCS78025; RE-EX011993-RE-EX011996.
Hamilton Dep. Exh. 27, Johnson Dep. Exh. 34: "InphoMatch Routes More Than 1 Million Text Messages a Day: SMs Leader Remains Sole Generator of Messaging Traffic in U.S"—Mar. 6, 2002; TCS111443-TCS111444; RE-EX011999-RE-EX012000.
Johnson Dep. Exh. 7: TeleCommunication Systems, Inc.—Business Case: SMS Service Bureau—Aug. 30, 2000; TCS112312-TCS112313; RE-EX012059-RE-EX012060.
Johnson Dep. Exh. 9: TeleCommunication Systems—Memo from Mark Johnson to Johanna cc Chris Knotts re: A Plan to Support Content Providers on the MDC—Sep. 7, 2000; TCS89606-TCS89609; RE-EX012061-RE-EX012064.
Johnson Dep. Exh. 10: TeleCommunication Systems—UPOC Update—Sep. 13, 2000; Background Information for Pricing Approval for Virtual Alert by Mark Johnson and Mike McCarthy—Mar. 27, 2003; TCS106813-TCS106815; RE-EX012065-RE-EX012067.
Johnson Dep. Exh. 11: Memorandum from Mark Johnson to Drew Morin cc Johanna Wilson and Chris Knotts re: MDC Required Resources—Oct. 9, 2000; Status Report for Mark Johnson—Sep. 25, 2000; TCS89777-TCS89780; RE-EX012068-RE-EX012071.
Johnson Dep. Exh. 13: Memo from Mark Johnson to Bill Todd re: MDC Issues and Status—Oct. 26, 2000; TCS89563-TCS89564; RE-EX012072-RE-EX012073.
Johnson Dep. Exh. 14: Verizon MDC Meeting Attendees and Outline—Nov. 9, 2000; TCS47753-TCS47755; RE-EX012074-RE-EX012076.
Johnson Dep. Exh. 16: TeleCommunication Systems Sales Call Report—Nov. 11, 2000; TCS112653-TCS112655; RE-EX012077-RE-EX012079.

Johnson Dep. Exh. 18: Memo from Mark Johnson to Bill Todd re: The Case for Development Assistance—Dec. 12, 2000; TCS89582-TCS89584; RE-EX012080-RE-EX012082.

Johnson Dep. Exh. 19, Knotts Dep. Exh. 7: TCS' Supplemental Response to Mobile 365's Interrogatory No. 1—Oct. 13, 2006; RE-EX012083-RE-EX012087.

Johnson Dep. Exh. 20: Proposal for Messaging Product and Service Partnership Prepared for John Provinsal of Verizon Wireless by TeleCommunication Systems—Dec. 19, 2000; TCS112627-TCS112652; RE-EX012088-RE-EX012113.

Johnson Dep. Exh. 21: MDC Media Launch Timeline and Plan—Feb. 28, 2001; TCS000412-TCS000414; RE-EX012114-RE-EX012116.

Johnson Dep. Exh. 27: TeleCommunication System—Message Distribution Center: Press Release and Media Coverage—Mar. 28, 2001; TCS79102-TCS79123; RE-EX012193-RE-EX012214.

Johnson Dep. Exh. 29: Verizon Wireless and TCS Partnership Summit—Apr. 4, 2001; TCS82203-TCS82292; RE-EX012251-RE-EX012340.

Johnson Dep. Exh. 30: Email from Chris Knotts to Mark Johnson re: AT&T Inter-Carrier Messaging RFP—Questions I need help with . . . —Aug. 17, 2007; TCS44684-TCS44685; RE-EX012341-RE-EX012342.

Johnson Dep. Exh. 32: TCS Simple Test Plan—MDC Release 1.3 (Sep. 17, 2001), by Mark Johnson—Sep. 28, 2001; TCS000935-TCS000941; RE-EX012343-RE-EX012349.

Knotts Dep. Exh. 9: TCS Business Opportunity Profile—aspiro—Mar. 23, 2001; TCS000046-TCS000048; RE-EX012354-RE-EX012356.

Knotts Dep. Exh. 9: TCS Business Opportunity Profile—MobileSys—Mar. 23, 2001; TCS000064-TCS000067; RE-EX012357-RE-EX012360.

Knotts Dep. Exh. 9: TCS Business Opportunity Profile—mobileway—Mar. 23, 2001; TCS000068-TCS000071; RE-EX012361-RE-EX012364.

Knotts Dep. Exh. 12: TCS presents to . . . Yahoo!—Mar. 16, 2001; TCS000329-TCS000379; RE-EX012365-RE-EX012415.

Defendant's Trial Exhibit 3: IC3S Invoice to Quios, Inc. San Francisco, CA—Feb. 29, 2000; MOB-E1185323; RE-EX012416-RE-EX012416.

Defendant's Trial Exhibit 5: M-Commerce—IC3S AG, DeTeCon Inc. Zimmern Consulting Presentation—Jun. 8, 2000; MOB-E1185306-MOB-E1185322; RE-EX012417-RE-EX012433.

Defendant's Trial Exhibit 8: "Mobile Messaging & Internet Applications: Why SMS is a Success in Europe . . . " IC3S Presentation on Gucky ("Gucky") by Christian Zimmern, CEO—Jul. 17, 2000; MOB 002109-MOB 002127; RE-EX012434-RE-EX012452.

Defendant's Trial Exhibit 9: MMIA Conference Documents—Jul. 26, 2000; MOB 001954-MOB 001973; RE-EX012453-RE-EX012472.

Defendant's Trial Exhibit 12: Email string between Terry Hsiao and Christian Zimmern—Aug. 7, 2000; Aug. 3, 2000; Jul. 28, 2000; MOB-E1177586-MOB-E1177588; RE-EX012473-RE-EX012475.

Defendant's Trial Exhibit 13: Agreement between IC3S and InphoMatch—Sep. 7, 2000; MOB-E1177604-MOB-E1177608: RE-EX012476-RE-EX012480.

Defendant's Trial Exhibit 14: Email string between Terry Hsiao and Nextel—Sep. 15, 2000; Sep. 12, 2000; Sep. 6, 2000; Aug. 31, 2000; Aug. 18, 2000; MOB-E1177589-MOB-E1177592; RE-EX012481-RE-EX012484.

Defendant's Trial Exhibit 15: Teaming Relationship Memorandum of Understanding between InphoMatch and IC3S—Aug. 18, 2000; MOB-E1177570-MOB-E1177572; RE-EX012485-RE-EX012487.

Defendant's Trial Exhibit 16: Inphomatch Press Release "Inphomatch Launches Cross-Carrier Messaging Mobile Gateway"—Oct. 3, 2000; MOB-E1178052-MOB-E1178053; RE-EX012488-RE-EX012489.

Defendant's Trial Exhibit 17: Email string between Terry Hsiao and Rod Nelson—Oct. 9, 2000; Oct. 4, 2000; MOB-E1177567; RE-EX012490-RE-EX012490.

Defendant's Trial Exhibit 18: Email string between Terry Hsiao and Nextel—Oct. 11, 2000; Oct. 10, 2000; Oct. 9, 2000; MOB-E1177579-MOB-E1177582; RE-EX012491-RE-EX012494.

Defendant's Trial Exhibit 19: Cross-Carrier Interoperability for VoiceStream SMS Messaging—InphoXchange for SMS: Universal, Global Messaging ("IM Proposal")—InphoMatch, Inc. Proposal by Brian Kathman to Mitch Lustig of VoiceStream—Oct. 5, 2000; MOB 002136-MOB 002144; RE-EX012495-RE-EX012503.

Defendant's Trial Exhibit 20: Email from Christian Zimmern to Jorg Zender re: Use Of Gucky In The United states (In German)—Oct. 25, 2000; MOB-E1185304-MOB-E1185305; RE-EX012504-RE-EX012505.

Defendant's Trial Exhibit 21: Translation of Email from Christian Zimmern to Jorg Zender re Use Of Gucky In The United States—Oct. 25, 2000; MOB-E1185949-MOB-E1185950; RE-EX012506-RE-EX012507.

Defendant's Trial Exhibit 22: VoiceStream "Set For Life" Presentation—Nov. 2, 2000; MOB-E1184625-MOB-E1184638; RE-EX012508-RE-EX012521.

Defendant's Trial Exhibit 23: VoiceStream SMS Interoperability Service—Request for Proposal v 1.0—Dec. 4, 2000; MOB 002207-MOB 002228; RE-EX012522-RE-EX012543.

Defendant's Trial Exhibit 24: Inphomatch/IC3S Proposal to VoiceStream—SMS Interoperability Service by Brian Kathman—Dec. 14, 2000; MOB 002492-MOB 002533; RE-EX012544-RE-EX012585.

Defendant's Trial Exhibit 25: Letter form VoiceStream to Inphomatch/IC3S re: Inphomatch/IC3S's Response To VoiceStream Wireless Corporation—Jan. 23, 2001; MOB-E1185293-MOB-E1185295; RE-EX012586-RE-EX012588.

Defendant's Trial Exhibit 26: SMPP Gateway Logical Diagram—Feb. 6, 2001; MOB 002491; RE-EX012589-RE-EX012589.

Defendant's Trial Exhibit 27: Trial Proposal—Cross Carrier Messaging for Verizon Wireless—InphoXchange: Universal, Global Messaging—presented by Inphomatch/IC3S—Mar. 15, 2001; MOB-E1177796-MOB-E1177803; RE-EX012590-RE-EX012597.

Defendant's Trial Exhibit 28: Inphomatch Short Message Services (SMS) Distribution Agreement—May 7, 2001; MOB-E1177688-MOB-E1177703; RE-EX012598-RE-EX012613.

Defendant's Trial Exhibit 29: Proposed Trial of InphoXchange for AT&T Wireless presented by InphoMatch/IC3S—May 21, 2001; MOB-E1177748-MOB-E1177755; RE-EX012614-RE-EX012621.

Defendant's Trial Exhibit 30: Letter from VoiceStream to InphoMatch re: Acknowledging Contract—Jun. 28, 2001; MOB-E1185296; RE-EX012622-RE-EX012622.

Defendant's Trial Exhibit 31: Cross-Carrier Proof-of Concept / Trial ICSP Questions—Responses by InphoMatch to AT&T Wireless—Jul. 2, 2001; MOB-E1177704-MOB-E1177726; RE-EX012623-RE-EX012645.

Defendant's Trial Exhibit 32: Letter from AT&T Wireless Services (AWS) to InphoMatch re: AT&T Wireless Cross-Carrier SMS Request For Proposal—Oct. 15, 2001; MOB-E1185297; RE-EX012646-RE-EX012646.

Defendant's Trial Exhibit 33: "InphoMatech Interoperability Platform Expands AT&T Wireless Messaging Portfolio"—Nov. 21, 2001; MOB-E1177727; RE-EX012647-RE-EX012647.

Defendant's Trial Exhibit 34: SMSC-System "Gucky" Systemubersicht Version 2.3 (In German)—Mar. 16, 2000; MOB-E1184995-MOB-E1185009; RE-EX012648-RE-EX012662.

Defendant's Trial Exhibit 35: Translation of SMSC-System "Gucky" Systemubersicht (System Overview) Version 2.3—Mar. 16, 2000; MOB-E1185910-MOB-E1185925; RE-EX012663-RE-EX012678.

Defendant's Trial Exhibit 36: SMSC-System "Gucky" System Kern: Router Version 1.9 (In German)—Feb. 5, 1999; MOB-E1184688-MOB-E1184705; RE-EX012679-RE-EX012696.

Defendant's Trial Exhibit 37: Translation of SMSC-System "Gucky" System Kern: Router (System Core: Router) Version 1.9—Feb. 5, 1999; MOB-E1185926-MOB-E1185944; RE-EX012697-RE-EX012715.

Defendant's Trial Exhibit 41: Non-Disclosure Agreement between InphoMatch and Christian Zimmern (unexecuted)—Aug. 1, 2000; MOB-E0076857-MOB-E0076858; RE-EX012716-RE-EX012717.

Defendant's Trial Exhibit 42: Mutual Non-Disclosure Agreement between InphoMatch and Christian Zimmern, and IC3S (unexecuted)—Aug. 1, 2000; MOB-E0081231-MOB-E0081233; RE-EX012718-RE-EX012720.

Defendant's Trial Exhibit 44: InphoMatch Presentation—Nov. 2000; MOB-E0080604-MOB-E0080614; RE-EX012722-RE-EX012732.

Defendant's Trial Exhibit 45: Deal Summaries and Sales Status Reports—Oct. 10, 2000; MOB-E0081501-MOB-E0081514; RE-EX012733-RE-EX012746.

Defendant's Trial Exhibit 46: VoiceStream SMS Interoperability Service Request for Proposal Version 1.0—Dec. 4, 2000; MOB 002207-MOB 002269; RE-EX012747-RE-EX012809.

Defendant's Trial Exhibit 49: Email from Chris Knotts to Gary Higgins, Timothy Lorello, Drew Morin and Patrick Sweeney re: IC3S—German "MDC" Operator—Jun. 8, 2000; TCS112226; RE-EX012810-RE-EX012810.

Defendant's Trial Exhibit 50: Emails between Patrick Sweeny and Chris Knotts re IC3S—German "MDC" Operator—Jun. 8, 2000; TCS112227; RE-EX012811-RE-EX012811.

Defendant's Trial Exhibit 51: Telecommunication Systems Inc. Collection of Emails and Attachments re: Christian Zimmern—Jun. 8, 2000; Sep. 6, 2000; Sep. 7, 2000; Sep. 25, 2000; TCS112226-TCS112240; RE-EX012812-RE-EX012826.

Defendant's Trial Exhibit 52: Collection of Emails and Attachments re: ACT Mobile Messaging Conference—Jun. 6, 2000; Jun. 8, 2000; Jun. 12, 2000; Jun. 29, 2000; Jul. 14, 2000; Jul. 17, 2000; TCS112241-TCS112263; RE-EX012827-RE-EX012849.

Defendant's Trial Exhibit 54: MMIA Conference Documents—Jul. 26, 2000; MOB 001954-MOB 001973; RE-EX012850-RE-EX012869.

Defendant's Trial Exhibit 55: MMIA Conference Documents—Jul. 26, 2000; MOB 001954-MOB 001973; RE-EX012870-RE-EX012889.

Defendant's Trial Exhibit 56: MMIA Conference Documents—Jul. 26, 2000; MOB 001954-MOB 001973; RE-EX012890-RE-EX012909.

Defendant's Trial Exhibit 57: Email from Damian Bonvouloir (TCS) to Christian Zimmern (IC3S) re: Follow Up and page of TCS Contacts with notes—Aug. 1, 2000; MOB-E1185301-MOB-E1185303; RE-EX012910-RE-EX012912.

Defendant's Trial Exhibit 59: TeleCommunications, Inc.—Business Case: SMS Service Bureau—Aug. 30, 2000; TCS112312-TCS112313; RE-EX012914-RE-EX012915.

Defendant's Trial Exhibit 60: Email from Damian Bonvouloir to Timothy Lorello re: Availability for Friday—Sep. 6, 2000; TCS112228; RE-EX012916-RE-EX012916.

Defendant's Trial Exhibit 61: Email from Damian Bonvouloir to Timothy Lorello re: Meeting with IC3S—Sep. 6, 2000; TCS112229; RE-EX012917-RE-EX012917.

Defendant's Trial Exhibit 62: Email from Susannah Bridgett to Damian Bonvouloir re: Meeting with IC3S—Sep. 7, 2000; TCS112230; RE-EX012918-RE-EX012918.

Defendant's Trial Exhibit 63: IC3S Business Plan—Draft Version 1.3—Sep. 12, 2000; TCS111611-TCS111619; RE-EX012919-RE-EX012927.

Defendant's Trial Exhibit 65: TCS Business Opportunity Profile—IC3S/Detecon—Sep. 25, 2000; TCS111620-TCS111622; RE-EX012928-RE-EX012930.

Defendant's Trial Exhibit 66: Email from Christian Zimmern to Damian Bonvouloir re: Meeting Last Week (with attachments)—Sep. 25, 2000; TCS112231-TCS112239; RE-EX012931-RE-EX012939.

Defendant's Trial Exhibit 67: Email from Damian Bonvouloir to Timothy Lorello re: Additional Information from Christian @IC3S—Sep. 25, 2000; TCS112240; RE-EX012940-RE-EX012940.

Defendant's Trial Exhibit 69: Inter-Carrier SMS Clearinghouse Business Case—Oct. 20, 2000; TCS111603-TCS111605; RE-EX012941-RE-EX012943.

Defendant's Trial Exhibit 70: Inter-Carrier SMS Clearinghouse Business Case—Oct. 20, 2000 and Letter from Young to Knotts—Oct. 5, 1999; RE-EX012944-RE-EX012947.

Defendant's Trial Exhibit 71: Handwritten Notes—Nov. 9, 2000; TCS111603-TCS111606; RE-EX012948-RE-EX012951.

Defendant's Trial Exhibit 72: Handwritten Notes—Dec. 7, 2000; RE-EX012952-RE-EX012953.

Defendant's Trial Exhibit 74: Email from Chris Knotts to Timothy Lorello, Drew Morin, Patrick Sweeny and Bruce White Cc Mark Johnson and Nancy Riess re: Patentable Inter-Carrier Messaging Process? attaching TCS Message Distribution Center: MDC Inter-Carrier Messaging—Apr. 6, 2001; MOB 000161-MOB 000167; RE-EX012955-RE-EX012961.

Defendant's Trial Exhibit 75: Proposal for Message Distribution Center Inter-Carrier Messaging Services—prepared for Skytel—May 7, 2001; MOB 000170-MOB 000192; RE-EX012962-RE-EX012984.

Defendant's Trial Exhibit 76: TeleCommunication Systems, Inc. Invention Disclosure Form (listing Aug. 20, 2001—Sprint PCS White Paper)—Dec. 8, 2000; TCS 000011-TCS 000015; RE-EX012985-RE-EX012989.

Defendant's Trial Exhibit 77: TCS' Responses to Mobile 365's First Set of Interrogatories (Nos. 1-8)—Oct. 10, 2006; RE-EX012990-RE-EX013000.

Defendant's Trial Exhibit 78: TCS' Supplemental Response to Mobile 365's Interrogatory No. 1—Oct. 13, 2006; RE-EX013001-RE-EX013005.

Defendant's Trial Exhibit 79: TCS' Second Supplemental Response to Mobile 365 Inc.'s Interrogatory No. 1—Apr. 27, 2007; RE-EX013006-RE-EX013009.

Defendant's Trial Exhibit 80: TCS' Responses to WiderThan Americas' First Set of Interrogatories (Nos. 1-2—Oct. 10, 2006; RE-EX013010-RE-EX013014.

Defendant's Trial Exhibit 83: RFC #822 Standard for the Format of ARPA Internet Text Messages, Dept. of Electrical Engineering, University of Delaware—Aug. 13, 1982; MOB-E0128469-MOB-E0128518; RE-EX013015-RE-EX013064.

Defendant's Trial Exhibit 88: "Singapore Takes First Step Towards Seamless Data Architecture" Infocom Hub—Feb. 1999; MOB-E0128655; RE-EX013077-RE-EX013077.

Defendant's Trial Exhibit 90: Short Message Peer to Peer Specification (SMPP) v3.4—Oct. 12, 1999 Issue 1.2; MOB 001087-MOB 001255; RE-EX013078-RE-EX013246.

Defendant's Trial Exhibit 102, Knotts Dep. Exh. 6: Handwritten Notes—Mar. 30, 2000; Nov. 9, 2000; Dec. 7, 2000; RE-EX013375-RE-EX013381.

Defendant's Trial Exhibit 103: The GSM-Infrastructure and Short-Message-Entity "Gucky"—Jul. 17, 2000; MOB 002124; RE-EX013382-RE-EX013382.

Defendant's Trial Exhibit 104: Email string between Terry Hsiao and Nextel—Aug. 31, 2000; Aug. 18, 2000; MOB-E1177584; RE-EX013383-RE-EX013383.

Defendant's Trial Exhibit 106: InphoMatch Final Report: Process, System and Technical Evaluation—Jan. 25, 2002; MOB-E0073321-MOB-E0073387; RE-EX013387-RE-EX013453.

Defendant's Trial Exhibit 108: Memo from Robert to File re: Address Structure—Jul. 27, 2006; MOB-E0073206-MOB-E0073222; RE-EX013457-RE-EX013473.

Defendant's Trial Exhibit 109: Order—Dec. 21, 2006; RE-EX013474-RE-EX013480.

Defendant's Trial Exhibit 111: Memo from Robert re: Batch Data from Data Capture on Mar. 28, 2007; MOB-E1185276-MOB-E1185281; RE-EX013569-RE-EX013574.

Defendant's Trial Exhibit 112: Declaration of Robert Lovell—Apr. 3, 2007; MOB-E1185262-MOB-E1185275; RE-EX013575-RE-EX013588.

Defendant's Trial Exhibit 115: Expert Report of Randall A. Snyder—Feb. 13, 2007; RE-EX013589-RE-EX013621.

Defendant's Trial Exhibit 119: Exhibit D (Claim Charts) to Expert Report of Randall A. Snyder—Feb. 13, 2007; RE-EX013622-RE-EX013662.

Defendant's Trial Exhibit 120: Second Expert Report of Randall A. Snyder—Mar. 15, 2007; RE-EX013663-RE-EX013694.

Defendant's Trial Exhibit 122: Exhibit B (§102(g) Anticipation based on Prior Invention of InphoXchange) to Second Expert Report of Randall A. Snyder—Mar. 15, 2007; RE-EX013695-RE-EX013702.

Defendant's Trial Exhibit 123: Third Expert Report of Randall A. Snyder—Mar. 30, 2007; RE-EX013703-RE-EX013719.

Defendant's Trial Exhibit 127: Defendant Mobile 365, Inc.'s Preliminary Invalidity Contentions—Nov. 21, 2006; RE-EX013720-RE-EX013768.

Defendant's Trial Exhibit 128: Plaintiff's Response to Mobile 365's Preliminary Invalidity Contentions—Dec. 18, 2006; RE-EX013769-RE-EX013786.

Defendant's Trial Exhibit 213: MMIA Conference Workshop SMS: Applications and Opportunities, including IC3S C. Zimmern Presentation "Why SMS is a Success in Europe . . . "—Jul. 26, 2000; MOB-E1185951-MOB-E1185981; RE-EX013787-RE-EX013817.

Defendant's Trial Exhibit 214: IC3S Information, Computer und Solartechnik AG—Apr. 2000; MOB-E1185982-MOB-E1185997; RE-EX013818-RE-EX013833.

Defendant's Trial Exhibit 217: T-D1 SMS Preistabelle (Price Table) (In German)—Jan. 3, 2000; MOB-E1186000-MOB-E1186001; RE-EX013834-RE-EX013835.

Defendant's Trial Exhibit 218: Translation of T-D1 SMS Preistabelle (Price Table)—Jan. 3, 2000; MOB-E1186006-MOB-E1186007; RE-EX013836-RE-EX013837.

Defendant's Trial Exhibit 219: International Roaming Price Table (In German)—Jan. 3, 2000; MOB-E1186002-MOB-E118005; RE-EX013838-RE-EX013841.

Defendant's Trial Exhibit 220: Translation of International Roaming Price Table—Jan. 3, 2000; MOB-E1186008-MOB-E1186011; RE-EX013842-RE-EX013845.

Defendant's Trial Exhibit 228: Excerpt from SMSC-System "Gucky" SMPP Linehandler (In German)—Feb. 5, 1999; MOB-E1184710; RE-EX013846-RE-EX013846.

Defendant's Trial Exhibit 229: Excerpt from "Gucky" Handbook for the Administrator: System Core: Router Feb. 5, 1999; RE-EX013847-RE-EX013847.

Plaintiff's Trial Exhibit 10, Knotts. Dep. Exh. 7: TCS' Supplemental Response to Mobile 365's Interrogatory No. 1—Oct. 13, 2006; RE-EX013871-RE-EX013875.

Plaintiff's Trial Exhibit 11, Knotts. Dep. Exh. 8: TeleCommunication Systems, Inc. Invention Disclosure Form (listing Aug. 20, 2001—Sprint PCS White Paper)—Dec. 8, 2000; TCS 000011-TCS 000015; RE-EX013876-RE-EX013880.

Plaintiff's Trial Exhibit 12, Knotts Dep. Exh. 9: TCS Business Opportunity Profile—aspiro—Mar. 23, 2001; TCS000046-TCS000048; RE-EX013881-RE-EX013883.

Plaintiff's Trial Exhibit 13, Knotts Dep. Exh. 10: TCS Business Opportunity Profile—MobileSys—Mar. 23, 2001; TCS000064-TCS000067; RE-EX013884-RE-EX013887.

Plaintiff's Trial Exhibit 14, Knotts Dep. Exh. 11: TCS Business Opportunity Profile—mobileway—Mar. 23, 2001; TCS000068-TCS000071; RE-EX013888-RE-EX013891.

Plaintiff's Trial Exhibit 15, Knotts Dep. Exh. 12: TCS presents to . . . Yahoo!—Mar. 16, 2001; TCS000329-TCS000379; RE-EX013892-RE-EX013942.

Plaintiff's Trial Exhibit 16, Knotts Dep. Exh. 13: Mobile Messaging & Internet Applications ACT Conference Documents—Jul. 2000; RE-EX013943-RE-EX013956.

Plaintiff's Trial Exhibit 18, Knotts Dep. Exh. 15: Mobile Messaging & Internet Applications ACT Conference Documents—Jul. 2000; RE-EX013957-RE-EX013976.

Plaintiff's Trial Exhibit 22, Lovell Dep. Exh. 3: Memo from Robert to Ven re: SS7 Question—Nov. 29, 2002; MOB-E0072634-MOB-E0072636; RE-EX013977-RE-EX013979.

Plaintiff's Trial Exhibit 25, Lovell Dep. Exh. 6: InphoXchange FAQ: The Proven SMS Interoperability Platform—Jun. 27, 2001; MOB-E1177728-MOB-E1177737; RE-EX014016-RE-EX014025.

Plaintiff's Trial Exhibit 26, Lovell Dep. Exh. 7: Teaming Relationship Memorandum of Understanding between InphoMatch IC3S and InphoMatch—Aug. 18, 2000 and IC3S Subcontract Agreement for United Technologies—Feb. 14, 2001; MOB-E1177570-MOB-E1177578; RE-EX014026-RE-EX014034.

Plaintiff's Trial Exhibit 27, Lovell Dep. Exh. 8: InphoMatch Executive Summary—Dec. 2000; MOB-E0078528-MOB-E0078532; RE-EX014035-RE-EX014039.

Plaintiff's Trial Exhibit 28, Lovell Dep. Exh. 9: SMPP Gateway Logical Diagram—Feb. 6, 2001; MOB 002491; RE-EX014040-RE-EX014040.

Plaintiff's Trial Exhibit 29, Lovell Dep. Exh. 10: InphoMatch Final Report: Process, System and Technical Evaluation—Jan. 25, 2002; MOB-E0073321-MOB-E0073387; RE-EX014041-RE-EX014107.

Plaintiff's Trial Exhibit 38, Snyder Dep. Exh. 5: Order—Dec. 21, 2006; RE-EX014112-RE-EX014118.

Plaintiff's Trial Exhibit 39, Snyder Dep. Exh. 6: Cross-Carrier Interoperability for VoiceStream SMS Messaging—InphoXchange for SMS: Universal, Global Messaging ("IM Proposal")—InphoMatch, Inc. Proposal by Brian Kathman to Mitch Lustig of VoiceStream—Oct. 5, 2000; MOB 002136-MOB 002144; RE-EX014119-RE-EX014127.

Plaintiff's Trial Exhibit 40, Snyder Dep. Exh. 8: SMPP Gateway Logical Diagram—Feb. 6, 2001; MOB 002491; RE-EX014128-RE-EX014128.

Plaintiff's Trial Exhibit 41, Snyder Dep. Exh. 9: "Mobile Messaging & Internet Applications: Why SMS is a Success in Europe . . . "—IC3S Presentation on Gucky ("Gucky") by Christian Zimmern, CEO—Jul. 17, 2000; MOB 002109-MOB 002127; RE-EX014129-RE-EX014147.

Plaintiff's Trial Exhibit 44, Bollman Dep. Exh. 6: Email from Chris Knotts to Timothy Lorello, Drew Morin, Patrick Sweeney and Bruce White Cc Mark Johnson and Nancy Riess re: Patentable Inter-Carrier Messaging Process? attaching TCS Message Distribution Center: MDC Inter-Carrier Messaging—Apr. 6, 2001; TCS115617-TCS115623; RE-EX014148-RE-EX014154.

Plaintiff's Trial Exhibit 45, Bollman Dep. Exh. 7: "Proposal for Inter-Carrier SMS Services" Prepared by TeleCommunication Systems for Barbara Brown at AT&T Wireless Services—Aug. 31, 2001; TCS114624-TCS114642; RE-EX014155-RE-EX014173.

Plaintiff's Trial Exhibit 55, Bates Dep. Exh. 2: Expert Report of Regis Bates—Feb. 13, 2007; RE-EX014174-RE-EX014205.

Plaintiff's Trial Exhibit 56, Bates Dep. Exh. 3: Expert Rebuttal Report of Regis J. Bates—Mar. 15, 2007; RE-EX014206-RE-EX014263.

Plaintiff's Trial Exhibit 57, Bates Dep. Exh. 4: Third Expert Report of Regis J. Bates—Mar. 30, 2007; RE-EX014264-RE-EX014277.

Plaintiff's Trial Exhibit 61, Knotts Dep. Exh. 6: Handwritten Notes—Mar. 30, 2000; Nov. 9, 2000; Dec. 7, 2000; RE-EX014369-RE-EX014375.

Plaintiff's Trial Exhibit 62, Hamilton Dep. Exh. 23, Johnson Dep. Exh. 12: Inter-Carrier SMS Clearinghouse Business Case—Oct. 20, 2000 and Letter from Young to Knotts—Oct. 5, 1999; TCS111603-TCS111606; RE-EX014376-RE-EX014379.

Plaintiff's Trial Exhibit 65, Hamilton Dep. Exh. 28, Johnson Dep. Exh. 35: Email from David Winks to Jeff Clark, Mark Johnson, Chriss Knotts, Timothy Lorello, Kevin Webb re: VZW ICM Oppty—Nov. 30, 2001; TCS47550-TCS47551; RE-EX014382-RE-EX014383.

Plaintiff's Trial Exhibit 84, Johnson Dep. Exh. 21: MDC Launch Timeline and Plan—Feb. 28, 2001; TCS000412-TCS000414; RE-EX014391-RE-EX014393.

Plaintiff's Trial Exhibit 85, Johnson Dep. Exh. 20: Proposal for Messaging Product and Service Partnership Prepared for John Provinsal of Verizon Wireless by TeleCommunication Systems—Dec. 19, 2000; TCS112627-TCS112652; RE-EX014394-RE-EX014419.

Plaintiff's Trial Exhibit 86, Johnson Dep. Exh. 18: Memo from Mark Johnson to Bill Todd re: The Case for Development Assistance—Dec. 12, 2000; TCS89582-TCS89584; RE-EX014420-RE-EX014422.

Plaintiff's Trial Exhibit 87, Johnson Dep. Exh. 16: TeleCommunication Systems Sales Call Report—Nov. 11, 2000; TCS112653-TCS112655; RE-EX014423-RE-EX014425.

Plaintiff's Trial Exhibit 88, Johnson Dep. Exh. 15, Knotts Dep. Exh. 6: Handwritten Notes—Mar. 30, 2000; Nov. 9, 2000; Dec. 7, 2000; RE-EX014426-RE-EX014432.

Plaintiff's Trial Exhibit 89, Johnson Dep. Exh. 14: Verizon MDC Meeting Attendees and Outline—Nov. 9, 2000; TCS47753-TCS47755; RE-EX014433-RE-EX014435.

Plaintiff's Trial Exhibit 90, Johnson Dep. Exh. 13: Memo from Mark Johnson to Bill Todd re: MDC Issues and Status—Oct. 26, 2000; TCS89563-TCS89564; RE-EX014436-RE-EX014437.

Plaintiff's Trial Exhibit 91, Johnson Dep. Exh. 12, Hamilton Dep. Exh. 23: Inter-Carrier SMS Clearinghouse Business Case—Oct. 20, 2000; TCS111603-TCS111605; RE-EX014438-RE-EX014440.

Plaintiff's Trial Exhibit 92, Johnson Dep. Exh. 11: Memorandum from Mark Johnson to Drew Morin cc Johanna Wilson and Chris Knotts re: MDC Required Resources—Oct. 9, 2000; Status Report for Mark Johnson—Sep. 25, 2000; TCS89777-TCS89780; RE-EX014441-RE-EX014444.

Plaintiff's Trial Exhibit 93, Johnson Dep. Exh. 10: TeleCommunication Systems—UPOC Update—Sep. 13, 2000; Background Information for Pricing Approval for Virtual Alert by Mark Johnson and Mike McCarthy—Mar. 27, 2003; TCS106813-TCS106815; RE-EX014445-RE-EX014447.

Plaintiff's Trial Exhibit 94, Johnson Dep. Exh. 9: TeleCommunication Systems—Memo from Mark Johnson to Johanna cc Chris Knotts re: A Plan to Support Conent Providers on the MDC—Sep. 7, 2000; TCS89606-TCS89609; RE-EX014448-RE-EX014451.

Plaintiff's Trial Exhibit 95, Johnson Dep. Exh. 7: TeleCommunication Systems, Inc.—Business Case: SMS Service Bureau—Aug. 30, 2000; TCS112312-TCS112313; RE-EX014452-RE-EX014453.

Plaintiff's Trial Exhibit 96, Hamilton Dep. Exh. 24: United States Wireless Carrier Inter-Carrier Messaging Conference with handwritten notes—Oct. 25, 2001; Meeting Agenda; Meeting Crib Notes; Non-Disclosure Agreement—Oct. 19, 2001; IC3S Business Plan Draft v 1.3 Pages—Sep. 12, 2000; IC3S Detecon Business Opportunity Profile—Sep. 25, 2000; TCS111607-TCS111622; RE-EX014454-RE-EX014469.

Plaintiff's Trial Exhibit 97, Hamilton Dep. Exh. 25: TeleCommunication Systems: North American Inter-Carrier Messaging Symposium Draft Agenda; Inter-Carrier Messaging Forum; Form Letter—Sep. 18, 2001; TCS78022-TCS78025; RE-EX014470-RE-EX014473.

Plaintiff's Trial Exhibit 98, Hamilton Dep. Exh. 20: Collection of Emails and Attachments re: ACT Mobile Messaging Conference—Jun. 6, 2000; Jun. 12, 2000; Jun. 29, 2000; Jul. 14, 2000; Jul. 17, 2000; TCS112241-TCS112263; RE-EX014474-RE-EX014496.

Plaintiff's Trial Exhibit 99, Hamilton Dep. Exh. 19: Telecommunication Systems Inc. Collection of Emails and Attachments re: Christian Zimmern—Jun. 8, 2000; Sep. 6, 2000; Sep. 7, 2000; Sep. 25, 2000; TCS112226-TCS112240; RE-EX014497-RE-EX014511.

Plaintiff's Trial Exhibit 114, Johnson Dep. Exh. 27: TeleCommunication Systems—Message Distribution Center: Press Release and Media Coverage—Mar. 28, 2001; TCS79102-TCS79123; RE-EX014567-RE-EX014588.

Plaintiff's Trial Exhibit 116, Johnson Dep. Exh. 25: Internet News Release: "Two-Way Text Messaging Subscribers Can Now Send Messages To Anyone Regardless of Wireless Carrier Network"—Mar. 12, 2001; RE-EX014639-RE-EX014641.

Plaintiff's Trial Exhibit 119, Johnson Dep. Exh. 30: Email from Chris Knotts to Mark Johnson re: AT&T Inter-Carrier Messaging RFP—Questions I need help with . . .—Aug. 17, 2007; TCS44684-TCS44685; RE-EX014658-RE-EX014659.

Plaintiff's Trial Exhibit 120, Johnson Dep. Exh. 29: Verizon Wireless and TCS Partnership Summit—Apr. 4, 2001; TCS82203-TCS82292; RE-EX014660-RE-EX014749.

Plaintiff's Trial Exhibit 122, Johnson Dep. Exh. 36: TCS Message Distribution Center (MDC) Release 1.0—Acceptance Test Plan (ATP)—Prepared for Verizon Wireless—Jan. 31, 2002; TCS001077-TCS001124; RE-EX014757-RE-EX014804.

Plaintiff's Trial Exhibit 123, Johnson Dep. Exh. 35, Hamilton Dep. Exh. 28: Email from David Winks to Jeff Clark, Mark Johnson, Chris Knotts, Timothy Lorello, Kevin Webb re: VZW ICM Oppty—Nov. 30, 2001; TCS47550-TCS47551; RE-EX014805-RE-EX014806.

Plaintiff's Trial Exhibit 136: Defendant Mobile 365, Inc.'s Responses and Objections to Plaintiff's Second Set of Interrogatories (Nos. 14-15) to Mobile 365, Inc.—Mar. 15, 2007; RE-EX014875-RE-EX014890.

Plaintiff's Trial Exhibit 137: Expert Rebuttal Report of Regis J. Bates—Mar. 15, 2007; RE-EX014891-RE-EX014948.

Plaintiff's Trial Exhibit 139: Expert Report of Regis J. Bates—Feb. 13, 2007; RE-EX014949-RE-EX014980.

Plaintiff's Trial Exhibit 140: TCS's Second Supplemental Response to Mobile 365, Inc.'s Interrogatory No. 1—Apr. 27, 2007; RE-EX014981-RE-EX014985.

Plaintiff's Trial Exhibit 145: Defendant Mobile 365 Inc.'s Objections and Responses to Plaintiff's First Set of Interrogatories (Nos. 1-13) to Mobile 365 Inc.—Oct. 10, 2006; RE-EX014986-RE-EX015007.

Plaintiff's Trial Exhibit 146: TCS' Supplemental Response to Mobile 365's Interrogatory No. 1—Oct. 13, 2006; RE-EX015008-RE-EX015012.

Plaintiff's Trial Exhibit 147: Defendant Mobile 365, Inc.'s Supplemental Responses to Plaintiff's Interrogatories Nos. 4, 5 and 15 to Mobile 365, Ins.—Mar. 19, 2007; RE-EX015013-RE-EX015018.

Plaintiff's Trial Exhibit 148: Third Expert Report of Regis J. Bates—Mar. 30, 2007 (Date Filed); RE-EX015019-RE-EX015033.

Plaintiff's Trial Exhibit 149: Defendant Mobile 365, Inc.'s Amended Supplemental Response to Plaintiff's Interrogatory No. 15 to Mobile 365, Inc.—Mar. 20, 2007; RE-EX015034-RE-EX015037.

Plaintiff's Trial Exhibit 151: Defendant Mobile 365, Inc.'s Responses and Objections to Plaintiff's Requests for Admission to Mobile 365, Inc.—Apr. 2, 2007; RE-EX015038-RE-EX015063.

Plaintiff's Trial Exhibit 152: Defendant Mobile 365, Inc.'s Responses and Objections to Plaintiff's Third Set of Interrogatories (Nos. 16-24) to Mobile 365, Inc.—Apr. 2, 2007; RE-EX015064-RE-EX015077.

Plaintiff's Trial Exhibit 155: InphoXchange Inter-Carrier Service Provider (ICSP)—Jun. 27, 2001; MOB-E1177738-MOB-E1177746; RE-EX015079-RE-EX015087.

Plaintiff's Trial Exhibit 156: "Inpho Match Interoperability Platform Expands AT&T Wireless Messaging Portfolio"—Nov. 21, 2001; MOB-E1177727; RE-EX015088-RE-EX015088.

Plaintiff's Trial Exhibit 157: Agreement between IC3S and InphoMatch—Sep. 7, 2000; MOB-E1177604-MOB-E1177608; RE-EX015089-RE-EX015093.

Plaintiff's Trial Exhibit 158: InphoMatch Presentation—Nov. 2000; MOB-E0080604-MOB-E0080614; RE-EX015094-RE-EX015104.

Plaintiff's Trial Exhibit 163: Cross-Carrier Interoperability for VoiceStream SMS Messaging—InphoMatch for SMS: Universal, Global Messaging ("IM Proposal")—InpoMatch, Inc. Proposal by Brian Kathman to Mitch Lustig of VoiceStream—Oct. 5, 2000; MOB 002136-MOB 002144; RE-EX015105-RE-EX015113.

Plaintiff's Trial Exhibit 164: InphoMatch—SMPP InphoXchange Implementation Guide—Jul. 10, 2001; MOB-E0074246-MOB-E0074250; RE-EX015114-RE-EX015118.

Plaintiff's Trial Exhibit 173: InphoMatch Presentation—Nov. 2000; MOB-E0080604-MOB-E0080614; RE-EX015121-RE-EX015131.

Plaintiff's Trial Exhibit 177: InphoMatch Presentation—Nov. 2000; MOB-E0080604-MOB-E0080614; RE-EX015132-RE-EX015142.

Plaintiff's Trial Exhibit 191: VoiceStream Wireless Round 2 Response Plan, Conference Call: Colin Matthews, Terry Hsaio, Brian Kathman, Dan Pagano—Dec. 27, 2000; MOB-E1184486-MOB-E1184487; RE-EX015148-RE-EX015149.

Plaintiff's Trial Exhibit 196: Trial Proposal—Cross Carrier Messaging for Verizon Wireless—InphoXchange: Universal, Global Messaging—presented by Inphomatch/IC3S with System Architecture—Mar. 15, 2001; MOB-E1177796-MOB-E1177804; RE-EX015150-RE-EX015158.

Plaintiff's Trial Exhibit 197: Cross-Carrier Proof-of Concept / Trial ICSP Questions—Responses by InphoMatch to AT&T Wireless—Jul. 2, 2001 and "InphoMatch Interoperability Platform Expands AT&T Wireless Messaging Portfolio"—Nov. 21, 2001; MOB-E1177704-MOB-E1177727; RE-EX015159-RE-EX015182.

Plaintiff's Trial Exhibit 203: Executive Summary to InphoMatch—Dec. 2000; MOB-E0078523-MOB-E0078527; RE-EX015183-RE-EX015187.

Plaintiff's Trial Exhibit 207: InphoMatch and IC3S—InphoAccess in response to VoiceStream—Request for Information (RFI) on an SMS-Gateway (SMS-GW) system for VoiceStream Wireless—May 23, 2001; MOB-E1184565-MOB-E1184586; RE-EX015188-RE-EX015209.

Plaintiff's Trial Exhibit 208: InphoMatch and IC3S—InphoSccess in response to VoiceStream—Request for Information (RFI) on an SMS-Gateway (SMS-GW) system for VoiceStream Wireless—May 23, 2001; MOB-E1184328-MOB-E1184349; RE-EX015210-RE-EX015231.

Plaintiff's Trial Exhibit 209: InphoMatch and IC3S—InphoXchange in response to CWTA ACTS Inter-Carrier Messaging Service (ICMS) Request for Proposal (RFP) v.10 released on May 18, 2001—Jun. 7, 2001; MOB-E1184207-MOB-E1184242; RE-EX015232-RE-EX015267.

Plaintiff's Trial Exhibit 234: Intercarrier Mobile Messaging Platform Agreement between Verizon Wireless and InphoMatch, Inc.—Mar. 28, 2002; MOB-E-114972-MOB-E0115083; RE-EX015308-RE-EX015419.

Plaintiff's Trial Exhibit 235: IXNG Functional Design Document—Version 1.1—Oct. 27, 2003; MOB-E0030582-MOB-E0030623; RE-EX015420-RE-EX015461.

Plaintiff's Trial Exhibit 236: InphoMatch—Operational Design Review—Jan. 18, 2002; MOB-E0073773-MOB-E0073786; RE-EX015462-RE-EX015475.

Plaintiff's Trial Exhibit 238: United States Wireless Carrier Inter-Carrier Messaging Conference with handwritten notes and Meeting Agenda—Oct. 25, 2001; TCS74414-TCS74415; RE-EX015486-RE-EX015487.

Plaintiff's Trial Exhibit 239: Meeting Crib Notes; Non-Disclosure Agreement—Oct. 19, 2001; IC3S Business Plan Draft v 1.3 Pages—Sep. 12, 2000; TCS74416-TCS74426; RE-EX015488-RE-EX015498.

Plaintiff's Trial Exhibit 240: TCS—IC3S Detecon Business Opportunity Profile—Sep. 25, 2000; TCS74427-TCS74429; RE-EX015499-RE-EX015501.

Plaintiff's Trial Exhibit 241: TeleCommunication Systems, Inc. Invention Disclosure Form (Listing Aug. 20, 2001—Sprint PCS White Paper)—Dec. 8, 2000; TCS78721-TCS78274; RE-EX015502-RE-EX015505.

Plaintiff's Trial Exhibit 241 A: TCS Carrier A / Carrier B—Inter-Carrier Messaging Call Flow—Jan. 31, 2002; TCS91824; RE-EX015506-RE-EX015506.

Plaintiff's Trial Exhibit 242: Verizon Wireless and TCS Executive Briefing—May 10, 2000; TCS82516-TCS82536; RE-EX015507-RE-EX015527.

Plaintiff's Trial Exhibit 243: Verizon Wireless and TeleCommunication Systems Executive Introduction—Apr. 14, 2000; TCS82479-TCS82490; RE-EX015528-RE-EX015539.

Plaintiff's Trial Exhibit 244: Email from Gary Higgins to Drew Morin re Trip Report to Verizon regarding the MDC—Nov. 13, 2000; TCS47743; RE-EX015540-RE-EX015540.

Plaintiff's Trial Exhibit 247: Email from David Winks to Gary Higgins, Mark Johnson, Chris Knotts, Patrick Sweeney, Erik Wallace, Johanna Wilson re: Trip Report to Verizon Regarding the MDC with attachment—Nov. 11, 2000; TCS47744-TCS47747; RE-EX015549-RE-EX015552.

Plaintiff's Trial Exhibit 248: TCS Message Distribution Center Speaking Points—No Date; TCs102863-TCS102867; RE-EX015553-RE-EX015557.

Plaintiff's Trial Exhibit 249: Proposal for Message Distribution Center Services Prepared for Verizon Wireless by TCS—Apr. 20, 2001; TCS95933-TCS95976; RE-EX015558-RE-EX015601.

Plaintiff's Trial Exhibit 250: Proposal for Messaging Product and Service Partnership Prepared for Verizon Wireless by TCS—Dec. 12, 2000; TCS74735-TCS74746; RE-EX015602-RE-EX015613.

Plaintiff's Trial Exhibit 251: Proposal for Consulting Services Prepared for Verizon Wireless by TCS—Feb. 1, 2001; TCS000806-TCS000812; RE-EX015614-RE-EX015620.

Plaintiff's Trial Exhibit 261: TCS Nextel Inter-Carrier Messaging Interoperability Proposal RFI (Jan. 17, 2002)—Jan. 31, 2002; TCS91810-TCS91870; RE-EX015671-RE-Ex015731.

Plaintiff's Trial Exhibit 262: Proposal for Inter-Carrier Messaging Services Prepared for Skytel by TCS—Dec. 17, 2001; TCS92905-TCS92941; RE-EX015732-RE-EX015768.

Plaintiff's Trial Exhibit 263: Proposal fo Inter-Carrier Messaging Services Prepared for Verizon Wireless by TCS—Dec. 10, 2001; TCS94468-TCS94504; RE-EX015769-RE-EX015805.

Plaintiff's Trial Exhibit 264: TCS Overview Presentation to Cingular Wireless—Dec. 7, 2001; TCS105515-TCS105558; RE-EX015806-RE-EX015849.

Plaintiff's Trial Exhibit 265: Service Description for Inter-Carrier Messaging Services prepared for US Cellular by TCS—Jan. 24, 2002; TCS109060-TCS109090; RE-EX015850-RE-EX015880.

Plaintiff's Trial Exhibit 266: Proposal for Inter-Carrier Messaging Services prepared for Bell South by TCS—Jun. 26, 2002; TCS110312-TCS110354; RE-EX015881-RE-EX015923.

Plaintiff's Trial Exhibit 270: Declaration of Christian Zimmern—Apr. 3, 2007; RE-EX015924-RE-EX015938.

Plaintiff's Trial Exhibit 275: Strategic Alliance Teaming Agreement between InphoMatch and IC3S—Feb. 2001; MOB-E1177593-MOB-E1177603; RE-EX015939-RE-EX015949.

Plaintiff's Trial Exhibit 276: Subtract Agreement between InphoMatch and IC3S for VoiceStream—Feb. 14, 2001; MOB-E1184434-MOB-E1184439; RE-EX015950-RE-EX015955.

Plaintiff's Trial Exhibit 277: Agreement between IC3S and InphoMatch—Sep. 7, 2000; MOB-E1177604-MOB-E1177608; RE-EX015956-RE-EX015960.

Plaintiff's Trial Exhibit 287: Declaration of Terry Hsiao—Apr. 3, 2007; RE-EX015961-RE-EX015978.

Defendant's Trial Exhibit 47: InphoXchange Builds Code—Nov. 7, 2001 (CD); MOB-E1177566; RE-EX015979; RE-EX015979-RE-EX015979.

Schedule for Week of Jul. 21, 2000 for Christian Zimmern (In German)—Jul. 21, 2000; MOB-E1177568; RE-EX015980-RE-EX015980.

Email string between Terry Hsaio and Nextel re: InphoMatch—Sep. 15, 2000; Sep. 12, 2000; Sep. 6, 2000; Aug. 31, 2000; Aug. 18, 2000; MOB-E1177583-MOB-E1177585; RE-EX015981-RE-EX015983.

VoiceStream SMS Interoperability Service Proposal by InphoMatch/IC3S—Dec. 14, 2000; MOB-E1177756-MOB-E1177795; RE-EX015985-RE-EX016024.

Buckingham, Simon David, "Success 4 SMS", Mobile Lifestreams Ltd., Berkshire, UK, Nov. 1, 2000, pp. 1-336; RE-EX016028-RE-EX016365.

"Message Transport and Routing Service (MTRS), Technical Service and Architecture Description", Special Report, SR-INS-002662, Bellcore, Issue 1, May 1993, 267 pages; RE-EX016395-RE-EX01661.

Cellular Radiotelecommunications Intersystem Operations, TIA/EIA-41-D: Telecommunications Industry Association, Dec. 1997, Chapter 4, 150 pages; RE-EX016662-RE-EX016811.

Buckingham, Simon David, "Data on SMS", Issue 1, Revision 1, Sep. 20, 1998, 208 pages; RE-EX016812-RE-EX017019.

"TSI Launches International SMS Interoperability Trial with Movilnet", TSI Telecommunication Services Inc., ISSN: 1059-117x, No. 9, vol. 6, Sep. 1, 2001, p. 10; RE-EX017020-RE-EX017020.

Longueuil, Donald, "SMS: Why Can't North American Carriers Get Along?" The Yankee Group, Report, vol. 1, No. 16, Nov. 2000, 16 pages; RE-EX017077-RE-EX017092.

"SBC Wireless Selects Logica Messaging Products to Expand Its Wireless Data Services; Enhanced SBC Wireless Services to Being Roll-Out by Fourth Quarter 2000" Business Wire, Sep. 6, 2000, 2 pages; RE-EX017093-RE-EX017094.

Cohn, Michael, "Short, Sweet Talk; Taking the gabfest of short text messaging global requires carriers to cooperate", Internet World, Mecklermedia Corporation, Jun. 15, 2001; 5 pages; RE-EX017140-RE-EX017144.

"CMG Wireless Data Solutions Announces the Inter-SMSC Router (ISR) For Interconnecting Multiple Wireless Technologies New Product Initiative Enables Interoperability of SMS Over Multiple Wireless Technologies" Canada NewsWire, Jul. 12, 2001, 2 pages; RE-EX017145-RE-EX017146.

SMPP Developers Forum, Short Message Peer to Peer Protocol Specification v3.4, Issue 1.2, Oct. 12, 1999, 169 pages; RE-EX017147-RE-EX017315.

Buckingham, Simon, "SMS Tech: A Guide to Technical Deployment", Mobile Streams Limited, Jul. 1, 2001, pp. 1-99; RE-EX017348-RE-EX017548.

Hannah, Elizabeth M., "Roaming Complexities: The Clearinghouse's Role Remains a Necessity", America's Network, Mar. 15, 1997, 1 page; RE-EX017568-RE-EX017570.

"Recommendation GSM 03.40: Technical Realization of the Short Message Service—Point-to-Point", European Telecommunications Standards Institute, Feb. 1992, Version 3.5.0, 100 pages; RE-EX017571-RE-EX017670.

O'Leary, Tim, "SMS Messaging: How is Your Text Life?", Group Mail Article, Jan. 3, 2006, 1 page; RE-EX017698-RE-EX017698.

Short Message Service, Wikipedia, Nov. 30, 2006, 11 pages; RE-EX017699-RE-EX017709.

EMI Protocol, Wikipedia, Oct. 31, 2006, 2 pages; RE-EX017710-RE-EX017711.

Packet, Wikipedia, Nov. 30, 2006, 5 pages; RE-EX017712-RE-EX017716.

Telephone Number Portability is a Regulatory Imperative in Many Countries, Phillips Business Information—Jun. 30, 2000, 6 pages; RE-EX017717-RE-EX017722.

Cohan, June, TCS v. Mobile 365—Email Correspondence to Wil Flachsbart and Dana Finberg, Nov. 22, 2006, 5 pages; RE-EX017723-RE-EX017727.

Fulton, Brady, TCS v. Mobile 365—Letter in Response to Nov. 22, 2006 email from June Cohan, Nov. 29, 2006, 2 pages; RE-EX017728-RE-EX017729.

SBC Wireless Selects Logica Messaging Products to Expand its Wireless Data Services Business Wire Sep. 2000.

Short Message Peer to Peer Protocol Specification v3.4 SMPP Developers Forum Oct. 1999 pp. 1-169.

ANSI TIA/EIA-41-D: Cellular Radiotelecommunications Intersystem Operations Dec. 1997.

Singapore takes first step towards seamless data architecture Infocom Hub Feb. 1999 pp. 1.

Wi-Fi Alliance Glossary Nov. 2006 pp. 1-2.

Bond "Cellular Carriers Use Prepaid Programs to Reach Untapped Markets" Billing World Mar. 1997 pp. 14-17.

Communication from European Patent Office pursuant to Article 96(2) in application No. 02 773 272.6—1249 dated Jun. 18, 2007.

ETSI/3Gpp 3rd Generation Partnership Project; Technical Specification Group Services and System Aspects; General Packet Radio Service (GPRS); Service description; Stage 2; (3G TS 23.060 version 3.2.1) Jan. 2000 pp. 138-142.

Kathman Brian F. Cross-Carrier Interoperability for VoiceStream SMS Messaging Oct. 2000 pp. 1-8.

The Power of Mobile Unified Messaging: Siemans and Comverse to Demonstrate WAP-Based Messaging Applications on Live GPRS System Comverse Feb. 2000.

TSI Launches International SMS Interoperability Trial with Movinet South American Telecom Sep. 2001 Nov. 9 vol. 6 pp. 10.

Newton's Telecom Dictionary, Packet, Mar. 2004, pp. 610.

SMS Text Messaging A Brief History of UK Text foolswisdom.com Nov. 2006 pp. 1-4.

Tecore Inc. "Pre-Paid Cellular" sales literature Mar. 25, 1997 pp. 1-4.

Yankee Group SMS: Why Can't North American Carriers Get Along? vol. 16 Nov. 2000.

Zimmerman Mobile Messaging & Internet Applications Jul. 2000 pp. 1-38.

Newton, Harry, "Newton's Telecom Dictionary", Flatiron Publishing. Inc., Tenth Edition, Feb. 1996, pp. 665 and 1038.

Ticknor, J., "Testing to Win", Telephony, Primedia Business Magazines and Media, Aug. 2, 1999, 3 pages.

Smale, Steve, "HP OpenMail Short Messge Service (SMS) Gateway: The Mobile Phone as an E-Mail Client-of-Choice," Hewlet Packard Limited, Proceedings of 2nd International Workshop on Mobile Multimedia Communications, XP000671022, Apr. 11, 1995, 4 pages; RE-EX017761-RE-EX017764.

* cited by examiner

| ALL MINs 302 | CARRIER NAME 304 | ID | 110 |
|---|---|---|---|
| 410 555 1212 | AT+T | 1 | ←—310 |
| 410 123 4567 | VERIZON | 2 | ←—320 |
| 212 654 3210 | SPRINT | 3 | ←—330 |
| ⋮ | ⋮ |  | ←—340 |

EXEMPLARY MIN / CARRIER DATABASE

| CARRIER NAME | CURRENT COMMUNICATION METHOD | SYNTAX OF SHORT MESSAGE | |
|---|---|---|---|
| AT+T | SMTP | @mobile.att.net | ← 488 |
| VERIZON | SMTP | @mobile.myportal.xyzwireless.net | ← 489 |
| ⋮ | ⋮ | ⋮ | |

EXEMPLARY CARRIER ROUTING TABLE

FIG. 5

INTER-CARRIER DIGITAL MESSAGE WITH USER DATA PAYLOAD SERVICE PROVIDING PHONE NUMBER ONLY EXPERIENCE

This application is a continuation of U.S. application Ser. No. 11/130,256. filed on May 17, 2005, now abandoned entitled "Inter-Carrier Digital Message with User Data Payload Service Providing Phone Number Only Experience"(as amended), which in turn claims priority from U.S. Pat. No. 6,985,748, filed Nov. 25, 2003, entitled "Inter-Carrier Short Messaging Service Providing Phone Number Only Experience," issued on Jan. 10, 2006, which in turn is a continuation of U.S. Pat. No. 6,658,260, filed Nov. 1, 2001, entitled "Inter-Carrier Short Messaging Service Providing Phone Number Only Experience," issued on Dec. 2, 2003, which in turn claims priority from U.S. Provisional Application No. 60/316,973, filed Sep. 5, 2001, entitled "Internet Protocol (IP) Based Inter-Carrier Messaging Service", the entirety of all of which are expressly incorporated herein by reference.

BACKGROUND OF THE INVENTION

1. Field of the Invention

This invention relates generally to wireless carriers, Internet service providers (ISPs), and information content delivery services/providers. More particularly, it relates to digital messaging services provided between different carriers and/or between subscribers in different air interface standards.

2. Background of Related Art

We are now in what is called the information age. More than ever, the exchange of information, and the ability to do the same, has become an important technical necessity of modern society. With the introduction and now wide usage of the Internet, and the advances in telecommunications, a variety of means for exchanging information have proliferated to bring a great number of people together through the exchange of information.

In the early 1990s, as a result of the growing popularity of digital wireless technology, a standard for digital wireless networks was introduced in Europe. That standard, now known as the global standard for mobiles (GSM), included a service called short messaging service (SMS). One way in which information is exchanged is through short messages. A short message is typically a textual message, e.g., a paging message, e-mail or a voice mail message passed to and/or from various types of communication devices, e.g., cellular telephone handsets, telephones or computers with appropriate modems.

An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bidirectional communication. Such bi-directional communication allows, for example, notification to the originating device of the success or failure of the short message delivery.

Each SMS network typically includes a Short Message Service Center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the one SMSC assigned to each intended subscriber, and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery.

In operation, an SMSC receives a short message from any source intended to be delivered to a particular subscriber. When the intended subscriber is not available because, for example, it is turned off or is outside of the service area of the SMS network, the attempt to deliver the short message at that time will fail. In this case, the short message will be retained in the SMSC assigned to that intended subscriber for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

FIG. 9 shows a general example of a short message exchange network. In particular, in FIG. 9, a text message is communicated between a first communication device (i.e., sender 806) and a second communication device (i.e., recipient 804). The sender 806 accesses a wide area network (WAN) such as the Internet or the Public Telephone Switching Network (PTSN). The short message from the sender 806 via gateway 805 is delivered to the recipient 804 via, e.g., a gateway 802 and a local area network (LAN) and/or wireless network 803.

Although the recipient 804 is shown as being a mobile phone handset, the recipient 804 may comprise, e.g., a computer device connected either through the LAN 803 or via a direct modem connection to the WAN (e.g., PTSN or the Internet) 801.

An example of a wireless short message exchange network is described in co-owned U.S. Pat. No. 6,208,870, entitled "SHORT MESSAGE SERVICE NOTIFICATION IN MULTIPLE SERVICE CENTER SHORT MESSAGE SERVICE NETWORK", the entirety of which is explicitly incorporated herein by reference.

An SMSC is a core short messaging router, which connects to the SS7 public network. An SMSC provides phone-to-phone two-way messaging within that carrier's network, either mobile originated or mobile terminated. To provide the ability for the SMSC to communicate over the web, a Wireless Internet Gateway (WIG) is added to the carrier's network. While an SMSC does have a direct Internet Protocol (IP) interface (i.e., Short Message Peer-to-Peer (SMPP)), a WIG acts as a multi-protocol router by typically adding, e.g., six or more additional carrier-class interfaces. A WIG provides an IP based door into a carrier's network.

SMPP is typically used to provide direct communications between SMSCs. Other direct communication links used between SMSCs include CDMP, which is MOTOROLA™ proprietary, and OIS, another proprietary protocol.

A suitable and appropriate WIG is shown and described in co-pending U.S. application Ser. No. 09/630,762, entitled "Wireless Internet Gateway", filed Aug. 2, 2000, the entirety of which is explicitly incorporated herein by reference.

A well known example of a system which delivers short messages is an electronic mail system, commonly referred to as e-mail. E-mail enables a sender to exchange information with a recipient from their respective communication devices, e.g., typically two remotely located computer devices.

Mobile devices such as wireless phones provide limited e-mail services. Wireless phones are designed to accept phone numbers quite easily, but are somewhat cumbersome when required to accept an alphanumeric e-mail address. When communicating between phone on different networks, subscribers must address messages to an e-mail address when communicating from phone-to-phone within the same network, only the phone number is required. Thus, text messages between wireless phones is generally limited in the United States to between subscribers within a common carrier's wireless network.

With current systems, Inter-Carrier e-mail messaging (i.e., between different carrier networks) from wireless devices requires input of a complete e-mail address. In particular, for a subscriber of a first carrier ("Carrier A") to send a message to a subscriber of another carrier ("Carrier B"), the subscriber of Carrier A must know and input a full e-mail address of the destination device.

Exemplary full e-mail addresses typically comprise a phone number, the "@" sign, and then a unique domain name used specifically for SMS messaging. An exemplary full e-mail address is 4105551234@mobile.myportal.xyzwireless.net. A phone number only experience can be provided to the subscriber of Carrier A only when sending an SMS message (e.g., e-mail) to a subscriber of the same Carrier A.

As an example, mobile terminated short messaging is currently available through web-page based services. For instance, VERIZON WIRELESS™ currently maintains a web page "msg.myvzw.com" for use only by VERIZON WIRELESS™ customers. Using this web page based approach, a user inserts a phone number of a known Verizon customer, types in a body of the desired message, and clicks on an enter key. However, this technique is available for mobile termination (not mobile originated) short messages only. Moreover, the sender must by default know to go to the Verizon web page, and thus have advance knowledge of the particular carrier servicing a particular phone number.

Mobile originated short messaging is also available, but is cumbersome to the user and does not provide a phone number only experience. In particular, to send a mobile originated short message, the sender must enter a phone number in their wireless phone, but the subscriber's network will be capable of sending an associated short message only to other subscriber's within the same carrier's network. To send the short message to a subscriber serviced by another carrier's network, the subscriber must enter a complete alphanumeric e-mail address via their mobile phone (e.g., 4105551212@mobile.att.net). As discussed, entry of a lengthy list of alphanumeric characters via an alphanumeric keypad on a mobile phone is cumbersome at best, particularly since several letters are represented on any particular key, and some letters in the alphabet are not represented at all on the alphanumeric keypad.

Unfortunately, using this mobile originated technique, a sender must know beforehand: (1) Whether or not the subscriber is in fact on another network (thereby requiring a full e-mail address instead of just a phone number for in-carrier subscribers); and (2) The exact format address syntax of a phone number on the recipient's network (e.g., "@mobile.att.net".

Most carriers in other parts of the World enjoy common technologies with adjacent carriers. For instance, most carriers in Europe have a wireless network conforming to the GSM standards. Accordingly, interconnection between SMSC's from different carriers is simple and straight forward because they all use the same air interface (i.e., GSM). Thus, native SMS Inter-Carrier messaging may be accomplished through direct carrier-to-carrier interconnections. Accordingly, there is no technical barrier to interconnectivity, and a phone number only experience may be provided to these GSM system subscribers using native SMS Inter-Carrier messaging which is accomplished through direct carrier-to-carrier interconnections.

Unfortunately, the interconnection of like air interface technologies (such as GSM) is not generally an option in the US. In the US, each major US carrier has deployed a different, competing air interface technology (e.g., CDMA, TDMA, GSM, I-DEN (a spin-off of GSM, Motorola™ proprietary), Reflex (paging networks), etc.) There are approximately ten (10) different air interface technology protocols currently in use in the United States. While this technology dispersion allows carriers to differentiate their service offers from one another, the US consumer suffers inconvenience because of the lack of standardization and/or interoperability across networks.

Not only is the variety of air interface technologies an integration challenge in the United States (many carriers espouse the superiority of their particular air interface technology over those provided by competitors), but roaming agreements for voice and SMS traffic must be reached by all potential recipients of a short message. In Europe, roaming agreements between European countries are routinely established because of the commonality of the air interface technologies (and lack of 'technical superiority' claims by competitors).

Practically speaking, most people remember or note down the mobile phone number of desired people to call. However, most people have no knowledge of the exact carrier with which those desired people to call are serviced by. Without remembering the identity of the person's carrier, a subscriber has great difficulty in determining a full e-mail address for that person. Without changing US society to remember not only phone numbers of others but also which carrier each of the others are with, e-mail messaging between subscribers of different carriers will find adoption to be slow.

There is a need for providing subscribers of wireless carriers in the United States a phone number only experience, to facilitate and ensure the adoption and popularity of SMS messaging in general, and e-mail messaging in particular, in a mobile environment.

SUMMARY OF THE INVENTION

In accordance with the principles of the present invention, in a message distribution center, a phone number only experience is provided by a database associating subscriber MIN numbers with servicing carriers, and a database associating carriers with routing syntax. An inter-carrier messaging module receives a digital message containing user data addressed with only a MIN number, performs a lookup in the database associating subscriber MIN numbers and in the database associating carriers with routing syntax, and adds routing syntax determined from the lookup to the MIN number.

A method of providing a phone number only experience to a subscriber in accordance with another aspect of the present invention comprises receiving an initial digital message containing user data addressed to a MIN only, and associating a carrier providing service to the MIN. A new digital message containing user data is formulated including a body of the initial digital message containing user data and newly addressed to the MIN with a syntax associated with the carrier providing service to the MIN. The new digital message containing user data is routed.

BRIEF DESCRIPTION OF THE DRAWINGS

Features and advantages of the present invention will become apparent to those skilled in the art from the following description with reference to the drawings, in which:

FIG. 4 shows exemplary entries in an exemplary Mobile ID Number (MIN)/Carrier Database shown in FIGS. 1 and 2.

FIG. 5 shows exemplary entries in an exemplary Carrier Routing Table shown in FIGS. 1 and 2.

DETAILED DESCRIPTION OF ILLUSTRATIVE EMBODIMENTS

Figure 1:
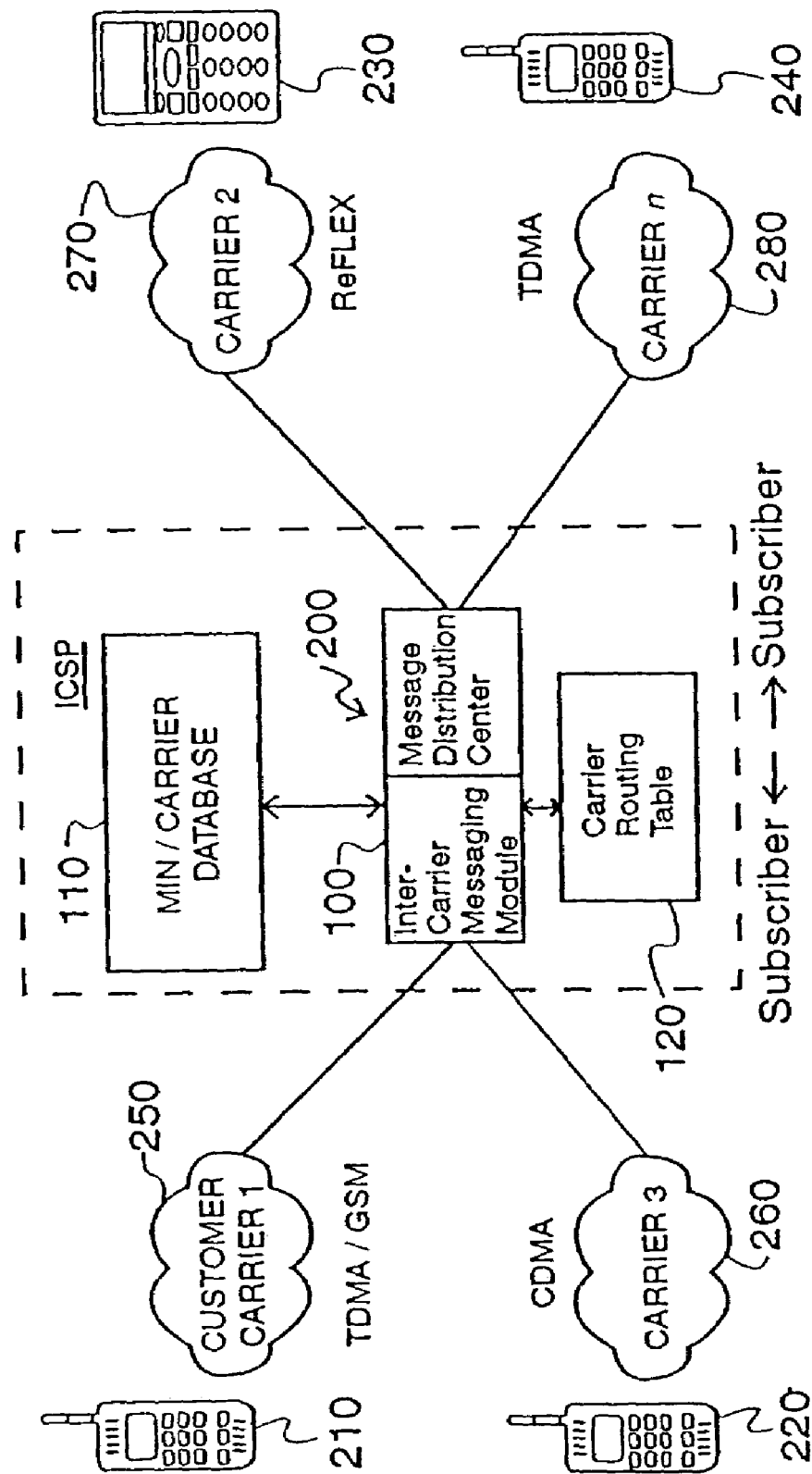
FIGS. 1 and 2 depict a Message Distribution Center (MDC) including an Inter-Carrier Messaging module including a MIN/Carrier Database and a Carrier Routing Table to provide a subscriber with "phone number only" short messaging capabilities, in accordance with the principles of the present invention.

The present invention provides a phone number only messaging experience to subscribing customers using native SMS Inter-Carrier Messaging, i.e., "phone number only" messaging, as opposed to e-mail-based messaging.

An Inter-Carrier Short Messaging System (IC-SMS) service in accordance with the principles of the present invention allows short messages to be sent between networks of different technologies using only a phone number. Subscriber to subscriber messages are routed between carrier's networks by a service bureau or similar function provided by the use of an Inter-Carrier messaging module with appropriate MIN/carrier/carrier routing look-up capabilities.

In operation, a subscriber of the service providing an Inter-Carrier messaging module may send a mobile originated (MO) short message, addressed only with a phone number, to a subscriber in another carrier's network. If in-network, the message is routed in SMSC. If not in-network, the message is sent to the ICM module. The service's Inter-Carrier messaging module determines that the destination address of the message is not a subscriber in the sender's same network. The Inter-Carrier messaging module of the Inter-Carrier service provider (ICSP) determines the appropriate carrier for the recipient, appends the appropriate syntax to the short message to allow internet protocol (IP) or other standardized communication techniques between SMSCs of the two carriers, and routes the short message to the destination carrier. Once received, the destination carrier's network delivers the message to the final destination.

Furthermore, the present invention preferably allows the recipient in the other carrier's network to reply back to the ICSP's sender back to the sender using only the subscriber's directory number. This assists in the provision of a phone number only experience by the ICSP's subscriber.

The Inter-Carrier messaging module may store an instance of the expectation of a reply from the recipient (e.g., for a given period of time) to allow phone number only reply's, but it is preferred that the Inter-carrier messaging module simply recognize the intended recipient of a reply as being within the network of the ICSP, and effectively strip off any email syntax from the telephone number before forwarding the reply short message back to the original sender.

A Message Distribution Center (MDC) including an Inter-Carrier messaging module in accordance with the principles of the present invention empowers message providers (e.g., carriers, enterprises, web developers, content providers, etc.) with a single point of entry for the transaction of SMS messaging to a wide array of wireless networks.

The MDC including the Inter-Carrier messaging module preferably includes a carrier-grade Wireless Internet Gateway (WIG) such as the one shown and described in U.S. patent application Ser. No. 09/630,762, filed Aug. 2, 2000 by Richard Smith, the entirety of which is expressly incorporated herein by reference) in a hosted environment (e.g., a service bureau).

An MDC Inter-Carrier SMS Service in accordance with the principles of the present invention provides a short message clearinghouse providing subscribers with a capability that will enhance their communications freedom through seamless, simple SMS messaging to other subscribers, regardless of the destination network.

An Inter-Carrier Messaging Service in accordance with the principles of the present invention is a value-added service of the MDC that allows carriers to offer their subscribers a "phone number only" messaging experience regardless of the destination network. The MDC Inter-Carrier Messaging Service provides protocol translation and messaging routing service for all SMS messages terminating to addresses outside the sender's network. Additionally, the service may extend preferably the phone number only experience to mobile terminated messages that are a result of a "reply" to a short message originated by a subscriber in the network, as well as short messages originating from other carriers/operators participating in the MDC Inter-Carrier Messaging Service.

Figure 2:
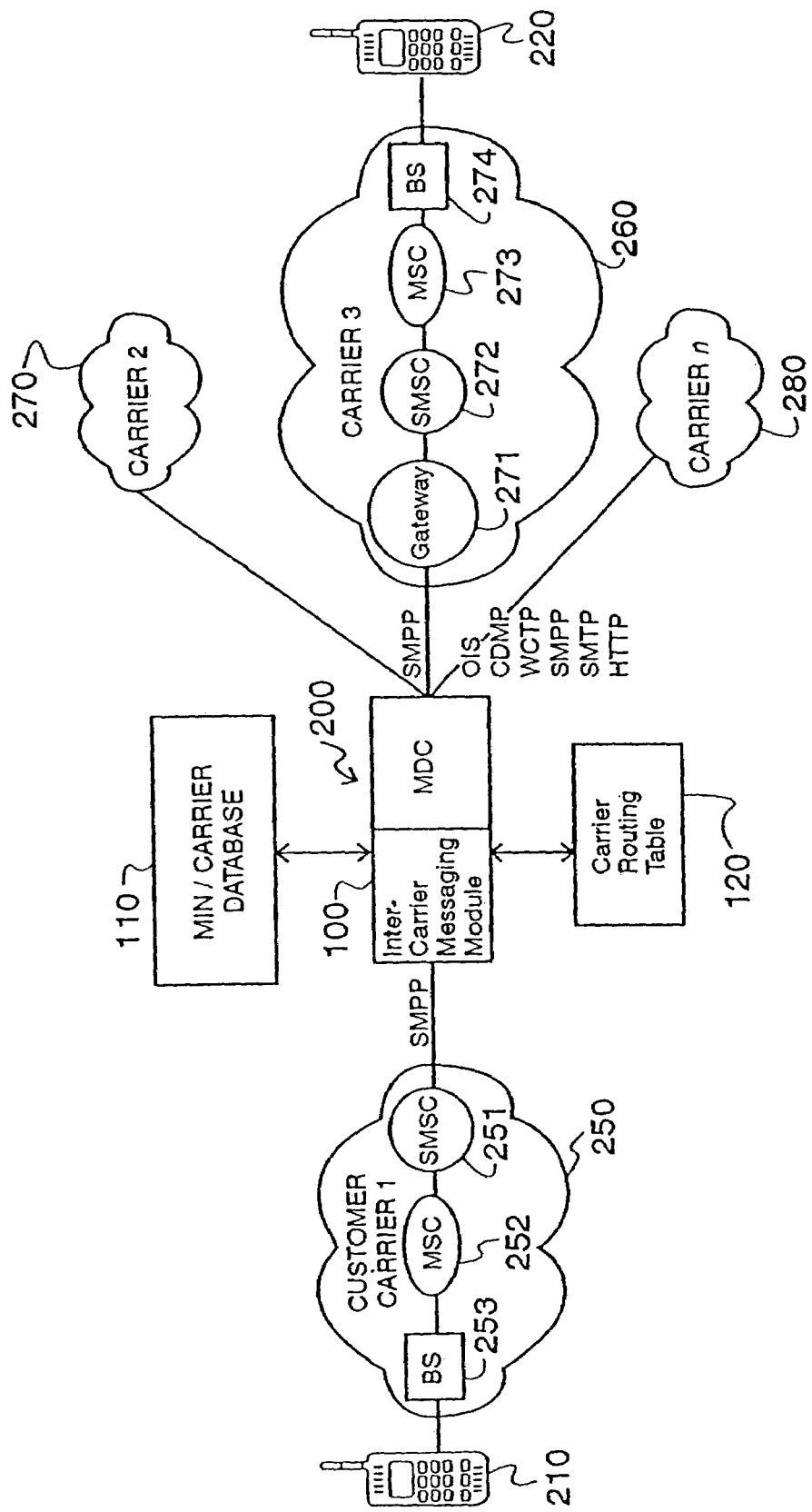

FIGS. 1 and 2 depict a Message Distribution Center (MDC) including an Inter-Carrier Messaging module including a MIN/Carrier Database and a Carrier Routing Table to provide a subscriber with "phone number only" short messaging capabilities, in accordance with the principles of the present invention.

In particular, as shown in FIGS. 1 and 2, the MDC acts as a clearinghouse for message transactions between carrier networks.

Communication between a carrier's network and the MDC may be through the Short Message Peer to Peer (SMPP) protocol. The MDC preferably fully supports SMPP 3.3 and 3.4 as well as other SMSC interface protocols such as CDMP (Motorola proprietary), OIS (Sema proprietary), SNPP (paging operators) and WCTP (paging operators).

In FIG. 1, an MDC 200 includes an Inter-Carrier messaging module 100, MIN/Carrier database 110, and Carrier Routing Table 120, in accordance with the principles of the present invention. The Inter-Carrier messaging module 100 enables phone number only short messaging between a subscriber's carrier 1 250 which subscribes to (or owns/maintains) the Inter-Carrier service provider (ICSP) providing the Inter-Carrier messaging module 100, and subscribers 220, 230, 240 of other carrier's networks 260, 270, 280, respectively.

FIG. 2 shows exemplary communication protocols between the subscriber's carrier 1 250, using e.g., SMPP, and a recipient's carrier 3 260, using e.g., SMPP, OIS, CDMP, WCTP, SMTP, and/or HTTP. The subscriber's carrier 1 250 includes an SMSC 251, MSC 252, and BS 253. Carrier 3 260 includes a Wireless Internet Gateway 271 providing access (e.g., IP protocol access) to an SMSC 272, MSC 273, and base station BS 274.

With respect to interoperability, at the heart of the Message Distribution Center 200 is the carrier-proven technology of a Wireless Internet Gateway (WIG) such as that shown and described in U.S. application Ser. No. 09/630,762.

The Wireless Internet Gateway passes text messages between the Internet (via HTTP, SMTP, and other common Internet protocols) and a carrier's Short Message Service Center (SMSC). The WIG is currently operational in many carrier networks worldwide interoperating with SMSCs that support SMPP, CDMP, and/or OIS protocols.

Figure 3:
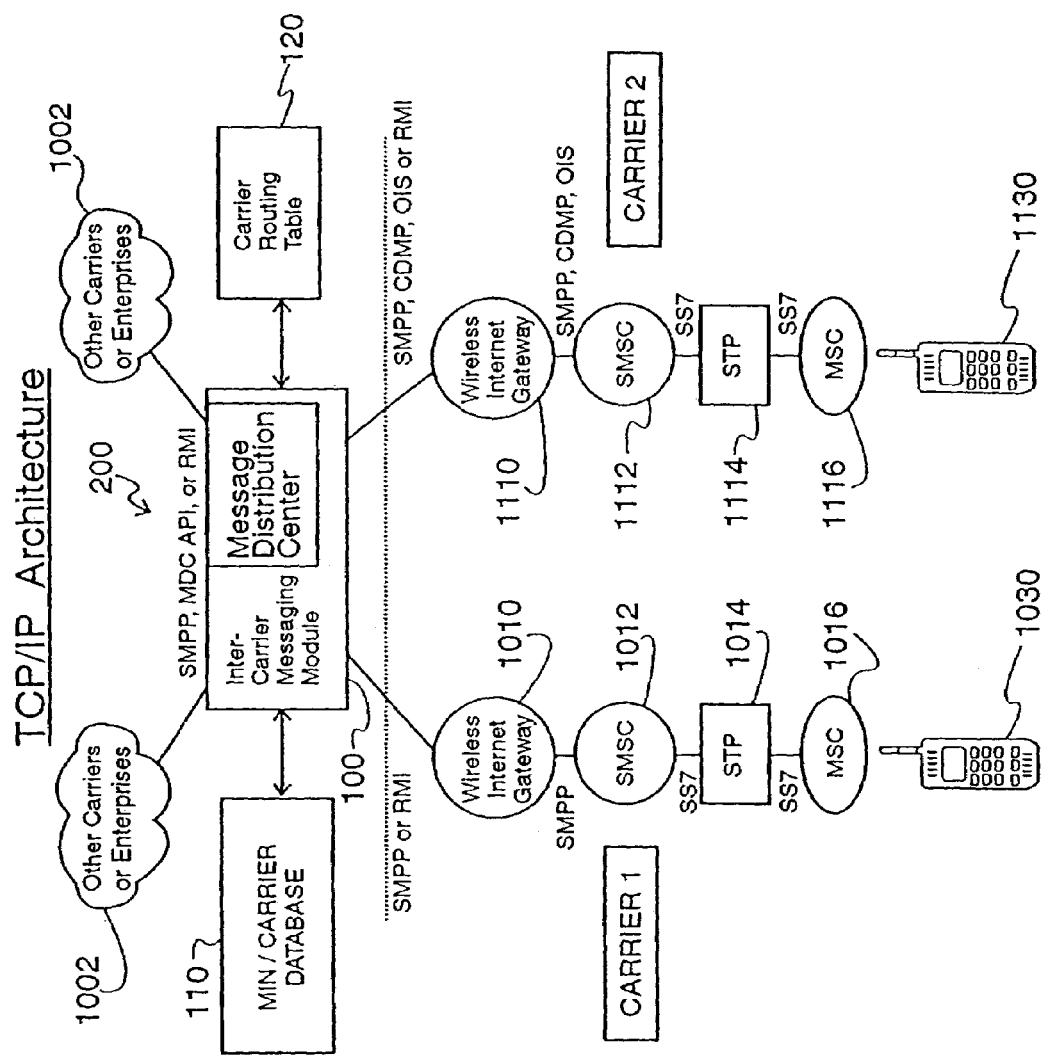
FIG. 3 shows exemplary interconnections between the MDC including an Inter-Carrier messaging module, and other carrier's networks using TCP/IP protocols, in accordance with the principles of the present invention.

FIG. 3 shows exemplary interconnections between the MDC including an Inter-Carrier messaging module, and other carrier's networks using TCP/IP protocols, in accordance with the principles of the present invention.

In particular, as shown in FIG. 3, one communication method between the MDC 200 and a carrier is via SMPP or RMI, as depicted by Carrier 1, which includes a Wireless Internet Gateway 1010, SMSC 1012, STP 1014, and MSC 1016. This communication technique does not require a carrier agreement between the sending carrier and the receiving carrier, and is very fast to market.

Alternatively, as depicted by carrier 2 in FIG. 3, an SMPP, CDMP, OIS or RMI protocol communication path may be used between the MDC 200 and the Wireless Internet Gateway 1110 of the other carrier. In such a case, the Wireless Internet Gateway 1110 would use SMPP, CDMP or OIS protocol communications with the SMSC 1112 of that carrier 2. The SMSCs 1012, 1112, STPs 1014, 1114, and MSCs 1016, 1116 utilize SS7 protocols. This second type carrier network supports 1-way SMS, is capable of providing a 2-way SMS, and no protocol conversion is required.

The Message Distribution Center 200 is a store and forward messaging platform. The disclosed MDC 200 utilizes a store and forward approach to assure message delivery, complete message tracking, and maximum billing flexibility.

Most SMS service providers currently operate using open SMTP or HTTP gateways. The MDC 200 preferably provides inside-the-network connectivity with all the major domestic carriers and as many tier 2 and 3 carriers as is feasible.

Where inside-the-network connections are unavailable, it is preferred that open SMTP and HTTP gateway connections to carriers be used.

Preferably, the MDC 200 supports message routing to Tier 2, Tier 3 and paging operators.

Custom control methods may be implemented to enable the MDC 200 to restrict incoming and outgoing messages to other carrier networks. These methods would allow the MDC 200 to turn incoming and/or outgoing messaging "off" on a carrier by carrier basis. Specific bounce rules and error messages, as well as related reporting requirements, may be defined by the operator of the MDC 200.

In addition to the above, one or more categories of "anti-spam" functionality may be defined to allow the MDC 200 to control the flow of particular unsolicited messages, either from a single source (e-mail address) or a single domain (e.g. msn.com). The MDC 200 can restrict messages based on the following criteria a) number of allowable messages sent to a MIN in a given period of time b) number of messages sent from a particular source, including e-mail address or IP number, and c) messages with a particular subject field (e.g. "I LOVE YOU").

In the disclosed embodiments, seven different interface methods are provided by which SMS messages can be transmitted to wireless and paging carriers including SMTP, HTTP, Win Socket connection, XML Remote Procedure Calls, SMPP and WCTP.

SMTP (Simple Mail Transport Protocol)

For developers interested in transmitting text messages using the SMTP e-mail protocol, this capability may be provided in an easy to use format. Simplicity is the benefit of this access method. Functionality, however, is limited. This method does not allow developers to take full advantage of the Application Programming Interface (API)'s capability to track a message's status or set expiration time. For more advanced capabilities, developers must utilize one of the other interface methods.

HTTP (Hypertext Transport Protocol)

Messages can also be distributed to wireless devices by submitting various parameters for the MIN, text message, login, password, etc. to a URL. Messages can be transmitted using Secure Socket Layer (SSL) for secure transmission to the MDC. Responses to HTTP posts can be returned in either standard Hypertext Markup Language (HTML) or Extensible Markup Language (XML) for easier data manipulation.

Win Socket Command Line

Developers may choose to interface with the MDC through a robust Win Socket Command Line interface that provides them with complete access to the full power of the MDC's API via a Telnet session.

XML-RPC (Extensible Markup Language-Remote Procedure Calls)

XML programmers will be familiar with the XML Remote Procedure Call (XML-RPC) interface to the API. The XML-RPC interface may be imbedded within an application and messages may be "posted" using the XML-RPC specifications.

SMPP-Short Message Peer-to-Peer

The Short Message Peer to Peer protocol is an open industry standard messaging protocol designed to simplify integration of data applications with wireless mobile networks. The protocol is widely deployed in the mobile telecommunications industry. Currently, the MDC supports limited SMPP functionality with complete support for SMPP 3.4 scheduled for release in Q3 2001.

SNPP-Simple Network Paging Protocol

The Simple Network Page Protocol is a paging industry standard messaging protocol designed to simplify integration of data applications with paging networks. The protocol is widely deployed within the paging industry.

WCTP-Wireless Communications Transfer Protocol

The Wireless Communications Transfer Protocol (WCTP) is specifically aimed at creating an easy means of passing alphanumeric and binary messages to and from wireline systems and two-way capable wireless devices. Although introduced through the paging industry, WCTP is directly applicable for messaging to and from most other wireless technologies including PCS, GSM, and cellular.

Preferably, the MDC supports Deliver_SM and Submit_SM operations for SMPP specification versions 3.4 and 3.3, and similar operations in future versions of SMPP, e.g., SMPP version 5.0.

The MDC's current production capacity is 80 to 100 messages/second. At the core of the MDC's architecture is a Wireless Internet Gateway (WIG). The WIG is a highly scalable and available carrier grade product. Preferably, the WIG architecture allows the addition of additional WIGs (as well as other network components) to increase capacity on an as-needed basis. Usage capacity may be monitored and additional capacity may be added on an as needed basis.

Statistics used to determine latency times for the MDC include the entire time period from when a message is first received by the MDC until the time the MDC receives an acknowledgement that the carrier has received the message. Given that assumption, the minimum latency of the disclosed MDC is under one second, and the average latency is approximately 2.5 seconds. The maximum latency of the MDC is essentially irrelevant because the longest latencies typically occur in situations where the destination carrier's gateway is unavailable for a period due to problems with the carrier network. In this situation, the MDC continues to retry sending the message until the message expires (a configurable parameter) or until the carrier's gateway becomes available.

Multiple carrier-class Network Operating Centers (NOCs) may be maintained throughout the country, connected via redundant T-1s and having mirrored applications and servers at each location.

The primary components of the MDC's application software functions include protocol stacks and other interface methods that accept messages from outside sources. Supported input protocols and access methods include SMPP, SMTP, HTTP, WCTP, XML-RPC, and a proprietary command line interface accessible via a TelNet session. Other components include message provider validation and message tracking and billing functions, MIN destination validation functions; message queuing functions, message routing to destination carriers based upon MIN ranges, and outgoing message transmission to destination carriers (including message throttling based upon destination carrier's specifications).

It is preferred that most software be written in Java language, enabling portability and reuse across numerous operating environments. The software design is also preferably modular, to take advantage of Remote Method Invocation (RMI). RMI enables various components to be distributed across servers increasing system performance by spreading processing power across different physical servers. Furthermore, it is preferred that the software be object oriented and multi-threaded. A suitable database engine may be that commercially available from ORACLE™, to provide strong performance, high availability, and scalability.

FIG. 4 shows exemplary entries in an exemplary Mobile ID Number (MIN)/Carrier Database 110 shown in FIGS. 1 and 2.

In particular, as depicted in FIG. 4, a first entry 310 includes an association between the MIN (i.e., phone number) 410-555-1212, and its carrier, AT&T™. The second entry 320 indicates that the phone number 410-123-4567 is serviced by Verizon™, and the third entry 330 indicates that a fourth MIN 212-654-3210 is serviced by Sprint™.

Preferably, the entries in the MIN/Carrier database may encompass a great majority of all MINs. For instance, in the preferred embodiment, the MIN/Carrier database 110 is filled with information from the FCC mandated Local Exchange Registry (LER) which currently includes approximately 85% of the MINs in use in the United States. Of course, those MINs may be augmented as necessary or desired with MINs not otherwise in the LER, within the principles of the present invention.

FIG. 5 shows exemplary entries in an exemplary Carrier Routing Table 120 shown in FIGS. 1 and 2.

In particular, as shown in FIG. 5, a first entry 488 indicates that communication between the Inter-Carrier service provider (ICSP) and the carrier "AT&T" is by SMTP protocol (i.e., e-mail), and that the phone number only short messages received for delivery to AT&T should be appended with the syntax "@mobile.att.net". A second entry 489 indicates that communication between the ICSP and the carrier "Verizon" is by SMTP protocol, and that short messages send with phone number only should be appended with the syntax "@mobile.myportal.xyzwireless.net".

The exemplary carrier routing table 120 shown in FIG. 5 may be extended to include a country of the carrier, allowing inclusion of necessary syntax (e.g., a country code appended to an email address), use of particular communication links, etc.

The advantages of a phone number only short messaging experience in accordance with the principles of the present invention can be readily appreciated when considering the alternatives (presuming that the sender knows the particular carrier associated with a recipient's phone number) of manual entry of the syntaxes such as "@mobile.myportal.xyzwireless.net".

Figure 6:
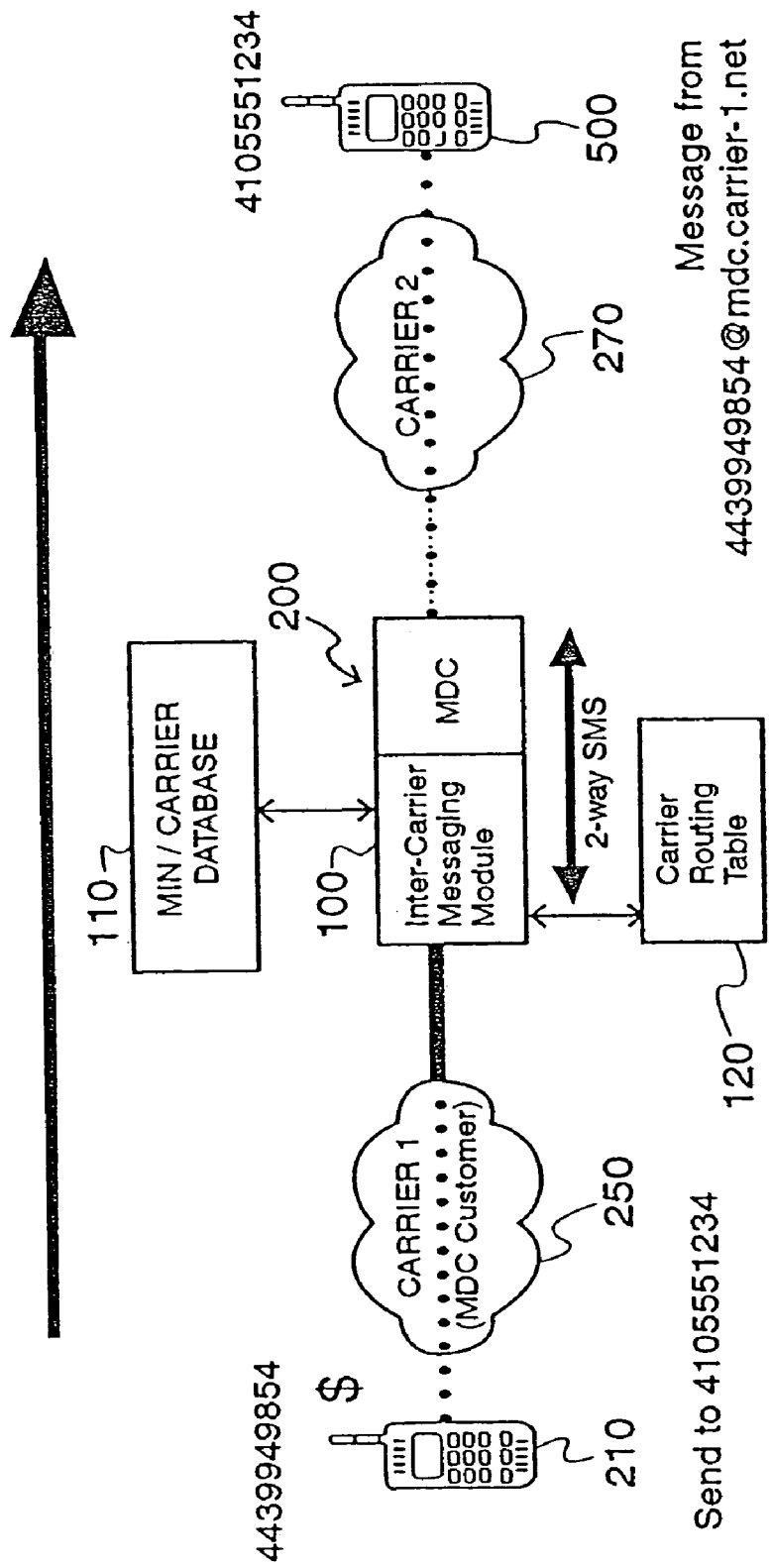
FIG. 6 depicts a phone number only experience for a subscriber of Carrier 1 to send a short message to a subscriber of another Carrier (e.g., which does not subscribe to the Service Bureau including the Inter-carrier Messaging Module), in accordance with the principles of the present invention.

FIG. 6 depicts a phone number only experience for a subscriber 210 of Carrier 1 250 to send a short message to a subscriber 500 of a different Carrier 2 270 (e.g., which does not subscribe to the ICSP (i.e., Service Bureau) including the Inter-carrier Messaging Module). In particular, as shown in FIG. 6, the subscriber 210 need only send a short message using the simple phone number 410-555-1234 of subscriber 500, with the Inter-Carrier messaging module 100 automatically determining the carrier provider servicing subscriber 500, the method of communication between the Inter-Carrier messaging module 100 of the MDC 200 and the carrier 2 270, and then adding (e.g., appending) the appropriate syntax to the phone number to actually address the short message to "410-555-1234".

In accordance with the principles of the present invention, the short message sent by subscriber 210 to subscriber 555 is preferably sent with the sender's address in phone number only form, to facilitate the reply of a phone number only short message back to the original subscriber 210. However, the present invention preferably accommodates reply short messages (and/or new short messages) to a subscriber 210 using the full, formal SMTP address such as "443-994-9854@mdc.carrier-1.net".

While the embodiments of the present invention relate to the addition of syntax to the end of a phone number (i.e., appending the syntax), the present invention relates equally to the addition of a prefix to the phone number, the insertion of syntax information within the phone number, and/or to the addition of suffix information at the end of the phone number.

Figure 7:
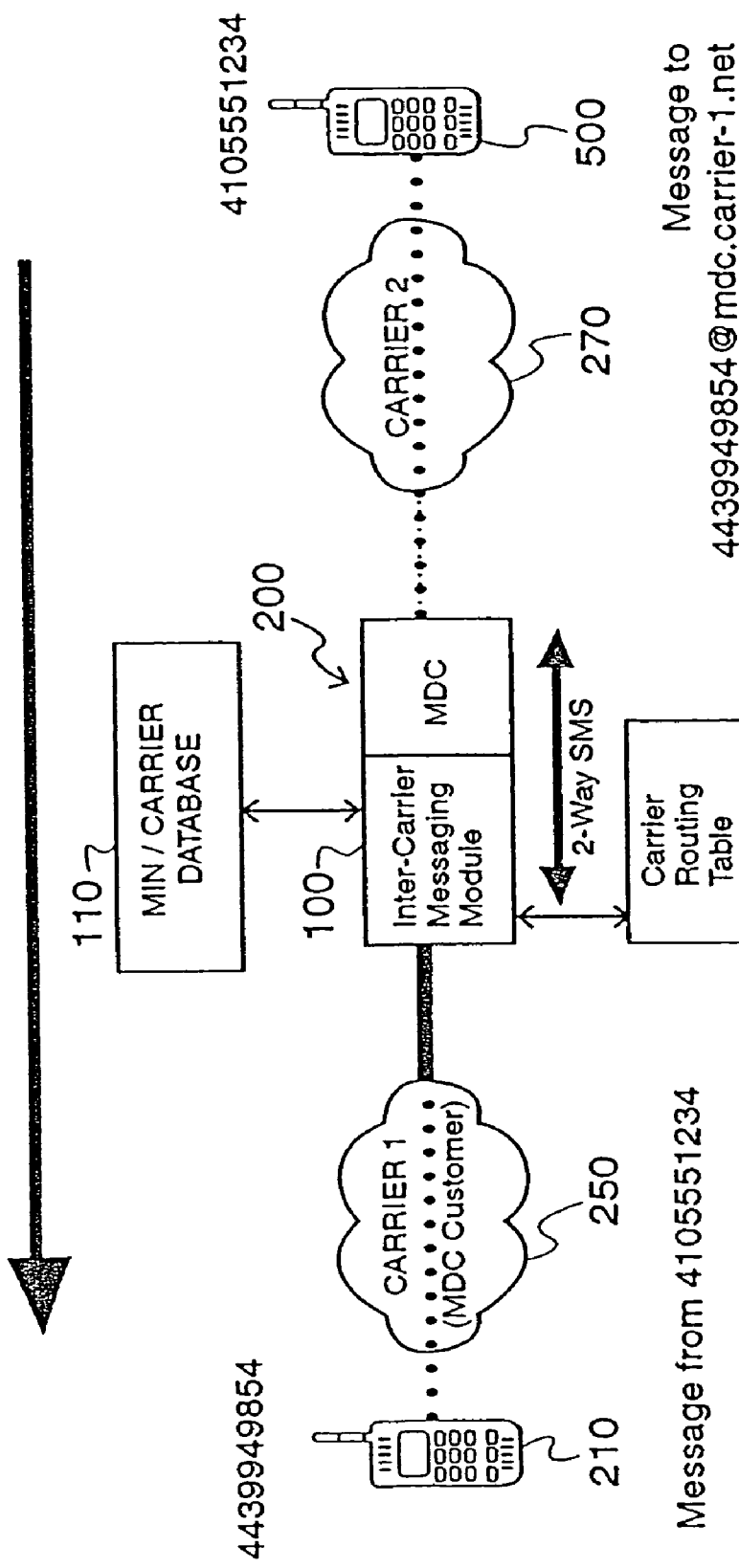
FIG. 7 depicts a phone number only experience for a subscriber of Carrier 1 to receive a short message from a subscriber of another Carrier (e.g., which does not subscribe to the Service Bureau including the Inter-carrier Messaging Module), in accordance with the principles of the present invention.

FIG. 7 depicts a phone number only experience for a subscriber 210 of Carrier 1 250 to receive a short message from a subscriber 500 of another Carrier 2 270, e.g., which does not subscribe to the ICSP or Service Bureau including the Inter-carrier Messaging Module 100 in accordance with the principles of the present invention.

In particular, subscriber 500 sends a short message addressed to 4439949854@mdc.carrier-1.net. This would conventionally arrive at the subscriber's mobile phone 210 indicating a source using more than simply a phone number, which violates the preferred embodiments of the present invention wherein a clean phone number only experience is desired.

To provide a phone number only experience in accordance with the present embodiment, the short message to subscriber 210 is routed through the Inter-Carrier messaging module 100, where the syntax in the source address of the short message is stripped down preferably to only the phone number. In this way, the subscriber 210 sees a short message which appears to them to have been sent by "4105551234".

In operation, with reference to FIG. 1, Carrier 1 250 receives a short message from a subscriber 210 with a destination address of a phone number only (i.e., MIN). The SMSC of the Carrier 250 reviews the intended destination of the short message. If the Carrier 250 does not recognize the phone number as being another subscriber of the Carrier 250, then the Carrier 250 dumps the short message with the phone number to the Inter-Carrier Messaging Module 100 of the MDC 200 over, e.g., an SMPP communication pathway.

The Inter-Carrier Messaging Module 100 accesses the MIN/Carrier database 110 to perform a MIN database lookup, which returns with the name of the carrier (e.g., Verizon) providing service to that phone number.

Thereafter, the Inter-Carrier Messaging Module 100 accesses the Carrier Routing Table 120 to determine how the MDC 200 communicates with the particular carrier returned from the MIN/Carrier database lookup (e.g., SMTP). Moreover, the Carrier Routing Table 120 also preferably returns the appropriate syntax to add to the phone number to properly route the short message (e.g., "@msg.myvzw.com")

With the appropriate syntax now in hand, the Inter-Carrier Messaging Module 100 assembles a new short message, including the phone number with syntax added (e.g., 4107033375@msg.myvzw.com), the body of the short message, the originator address, and optional parameters such as priority, expiration, etc.

Inclusion of the source address (i.e., phone number) provides the recipient with the ability to reply to the received short message. The source address could include the full address of the source, including both the phone number and the appropriate syntax, but this would result in a possible reply short message which would violate the desired phone number only experience for subscribers of certain carriers. Therefore, preferably, the source address in the originally sent short message is added such that any reply short message would be forced back through the MDC 200 including the Inter-Carrier Messaging Module, which would recognize the phone number of the new recipient, and would forward the short message with the syntax stripped off.

For instance, the source address of the original short message can be set at the phone number of the subscriber 210, together with the syntax of the MDC 200 (e.g., 4439110002@mdc.att.net). The Inter-Carrier Messaging Module 100 would copy the body of the reply short message coming from the non-subscribing carrier (i.e., with syntax included in the destination address), apply the optional parameters, perform another MIN table lookup, and routing table lookup, thus formulating a new short message, and deliver the reply short message back to the subscriber 210 of the customer carrier 250.

Figure 8:
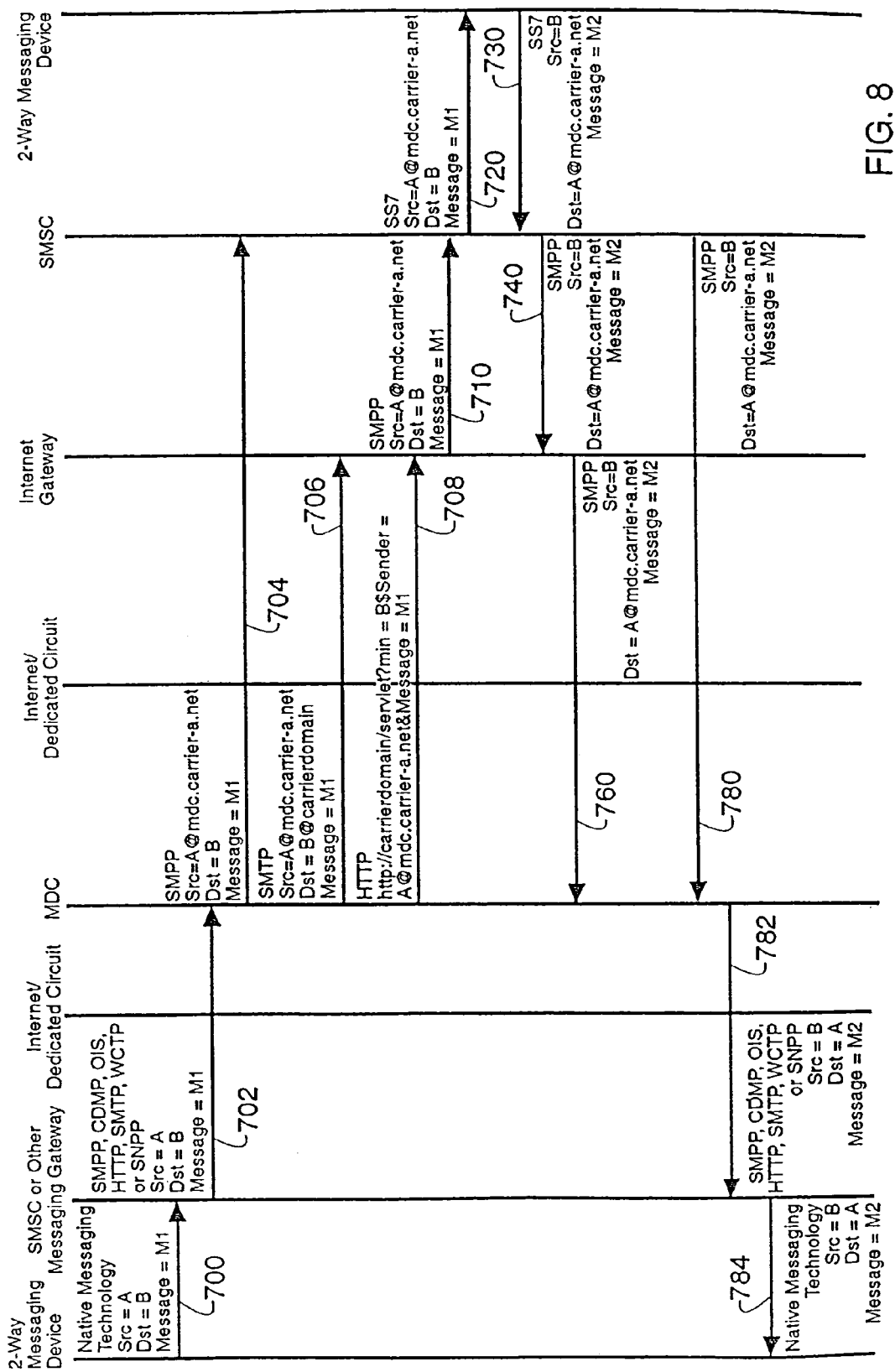
FIG. 8 is an exemplary detailed "call flow" representing an IP-based Inter-Carrier Short Message Service message transaction via a Message Distribution Center Inter-Carrier Messaging Service, in accordance with the principles of the present invention.
Figure 9:
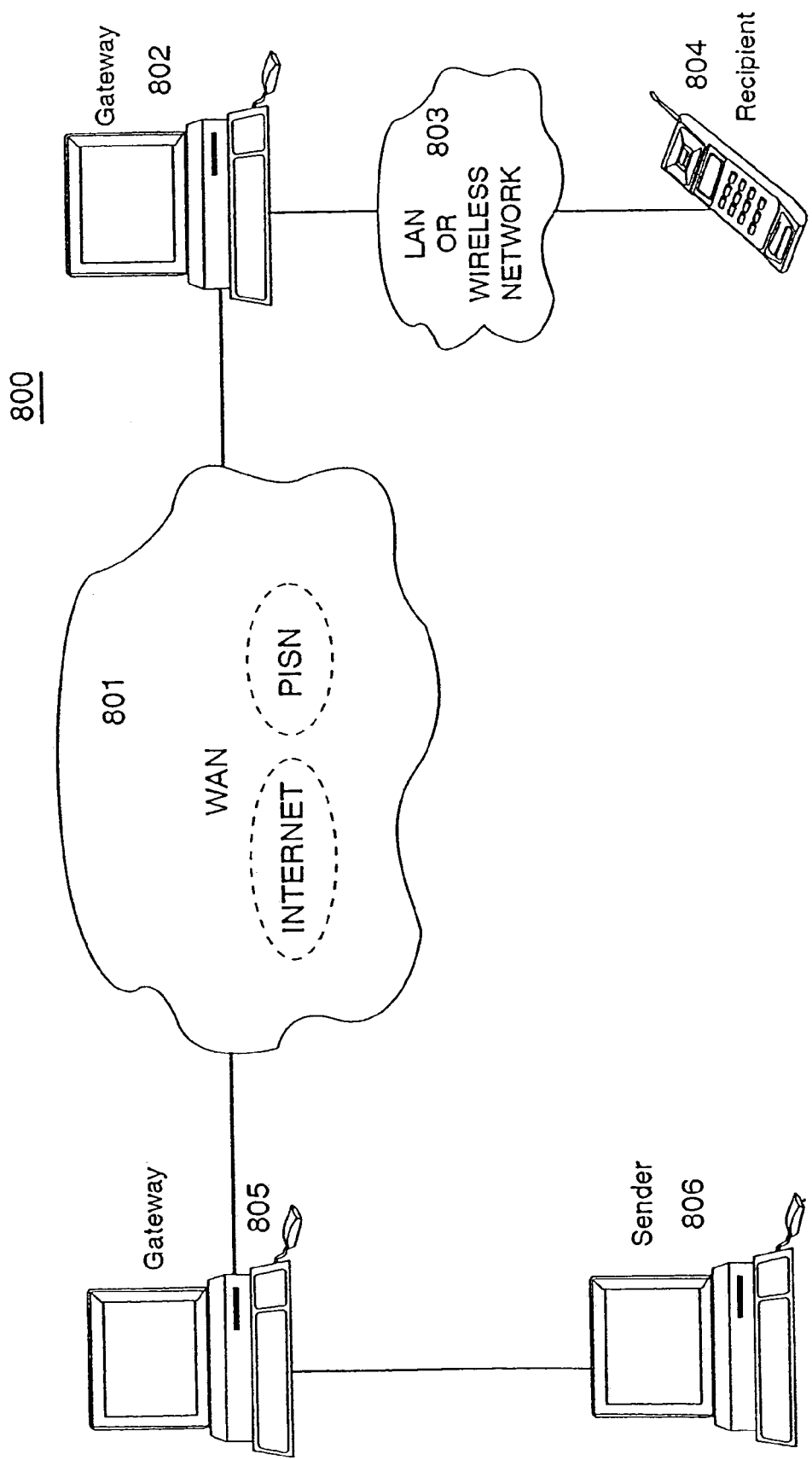
FIG. 9 shows a general example of a short message exchange network.

FIG. 8 is an exemplary detailed "call flow" representing an IP-based Inter-Carrier Short Message Service message transaction via a Message Distribution Center Inter-Carrier Messaging Service, in accordance with the principles of the present invention.

Step 700: Subscriber A originates a message to Subscriber B from their 2-way Messaging Device. The message is addressed to Subscriber B's phone number (i.e., to the subscriber's Mobile Identification Number (MIN) only.

Step 702: Carrier A's network elements identify non-Carrier A addresses and forwards them to the MDC via, e.g., SMPP, CDMP, OIS, Hypertext Transfer Protocol (HTTP) (i.e., the web), SMTP (i.e., e-mail), Wireless Communications Transport Protocol (WCTP)(i.e., paging networks), Simple Network Paging Protocol (SNPP), XML-RPC or TCP/IP socket API.

Step 704, or 706 or 708: As the MDC receives the message from Carrier A, it first determines the destination carrier (Carrier B) as well as the protocol supported by Carrier B. Then the MDC appends the MDC/Carrier A domain (mdc-.carrier-a.net in the diagram) to Subscriber A's phone number and routes the message accordingly.

Step 710: Carrier B's wireless Internet gateway routes the message to carrier B's own SMSC.

Step 720: SMSC of Carrier B delivers message to subscriber B's 2-way messaging device via appropriate air interface (e.g., over an SS7 link).

Step 730: Subscriber B replies to the message. The message is routed to Carrier B's SMSC via appropriate air interface (e.g., over an SS7 link).

Step 740, 760 and 780: Depending upon the type of relationship enjoyed with the Carrier B, messages are either transported directly from Carrier B's SMSC to the MDC using SMPP (or other protocol) OR they are directed to Carrier B's Internet gateway using SMPP (or other protocol) and then onto the MDC using SMTP or HTTP.

Step 782: The MDC receives a mobile originated message from Carrier B replying to the original message. The MDC routes the message to Carrier A's network.

Step 784: Carrier A's network receives the message and forwards it to Subscriber A's 2-Way Messaging Device.

Another function of the call flow shown in FIG. 8 is that it allows for delivery receipt notification between Carrier A's devices and Carrier B's devices which support delivery receipts.

Through the Message Linking feature, the MDC 200 determines the length of message supported by Carrier B and, if necessary, breaks lengthy messages into multiple linked messages.

The present invention allows 2-way pagers with querty keyboards to send short messages using phone number only addressing to any mobile phone (or to any other pager).

The phone number only capabilities of an Inter-Carrier Messaging Module and associated databases in accordance with the principles of the present invention has the capability to bridge non-SMS messaging devices, e.g., ReFlex and Mobitex pagers.

The present invention provides multiple benefits. For instance, simple "phone number only" SMS messaging across major carrier networks will add significantly to the continued adoption of SMS messaging particularly in the United States. Additionally, carriers can structure their pricing plans to recognize additional revenue from Inter-Carrier messages through the control and management of Inter-Carrier Messaging in accordance with the principles of the present invention.

Moreover, the present invention provides SMS traffic management and control, and a potential additional revenue stream for a carrier from international messaging.

The invention has particular use with respect to cellular and PCS carriers, and paging network operators (e.g., Verizon Wireless, AT&T Wireless, Sprint PCS, VoiceStream, SkyTel, etc.) in North America as well as other markets served by operators employing disparate air interface technologies.

While the invention has been described with reference to the exemplary embodiments thereof, those skilled in the art will be able to make various modifications to the described embodiments of the invention without departing from the true spirit and scope of the invention.

What is claimed is:

1. In a message distribution center, a system for processing a digital message with user payload addressed with a phone number only, comprising:
   a database associating subscriber MIN numbers with servicing carriers;
   a database associating carriers with routing syntax; and
   an inter-carrier messaging module to receive a digital message with user data payload addressed with only a MIN number, to perform a lookup in said database associating subscriber MIN numbers and in said database associating carriers with routing syntax, and to add routing syntax determined from said lookup to said MIN number.

2. In a message distribution center according to claim 1, wherein:
   said digital message with user data payload is an e-mail.

3. In a message distribution center according to claim 1, wherein:
   said database associating subscriber MIN numbers with servicing carriers and said database associating carriers with routing syntax are in a common database.

4. In a message distribution center according to claim 1, wherein:
   said MIN is a phone number.

5. In a message distribution center according to claim 4, wherein:
   said digital message with user data payload is an e-mail.

6. In a message distribution center according to claim 1, wherein:
   said message distribution center forms a store and forward messaging platform.

7. A method for processing a digital message with user data payload addressed with a phone number only, comprising the steps of:
   receiving from a first carrier an initial digital message containing user data addressed to a MIN only;
   associating a different carrier providing service to said MIN;
   formulating a new digital message containing said user data and newly addressed to said MIN with a syntax associated with said different carrier providing service to said MIN; and
   routing said new digital message containing said user data.

8. The method for processing a digital message with user data payload addressed with a phone number only according to claim 7, wherein:
   said initial digital message containing said user data is an e-mail.

9. The method for processing a digital message with user data payload addressed with a phone number only according to claim 7, wherein:
   said new digital message containing said user data is an e-mail.

10. The method for processing a digital message with user data payload addressed with a phone number only according to claim 9, wherein:
    said MIN is a phone number.

11. The method for processing a digital message with user data payload addressed with a phone number only according to claim 7, wherein:
    said phone number only addressed digital message containing user data is received at, and said new digital message containing user data is routed from, a service bureau.

12. The method for processing a digital message with user data payload addressed with a phone number only according to claim 7, wherein:
    said MIN is a phone number.

13. The method for processing a digital message with user data payload addressed with a phone number only according to claim 7, wherein:
    said MIN with said added syntax associated with said carrier providing service to said MIN forms a rout able address.

14. The method for processing a digital message with user data payload addressed with a phone number only according to claim 13, wherein:
    said routable address is an e-mail address.

15. Apparatus for providing a digital message with user data payload addressed with a phone number only, comprising:
    means for receiving from a first carrier an initial digital message containing user data addressed to a MIN only;
    means for associating a different carrier providing service to said MIN;
    means for formulating a new digital message containing user data including a body of said initial digital message containing user data and newly addressed to said MIN with a syntax associated with said different carrier providing service to said MIN; and
    means for routing said new digital message containing user data.

16. The apparatus for providing a digital message with user data payload addressed with a phone number only experience to a subscriber according to claim 15, wherein:
    said initial digital message containing user data is an e-mail.

17. The apparatus for providing a digital message with user data payload addressed with a phone number only according to claim 15, wherein:
    said new digital message containing user data is an e-mail.

18. The apparatus for providing a digital message with user data payload addressed with a phone number only according to claim 17, wherein:
    said MIN is a phone number.

19. The apparatus for providing a digital message with user data payload addressed with a phone number only according to claim 15, wherein:
    said phone number only addressed digital message containing user data is received at, and said new digital message containing user data is routed from, a service bureau.

20. The apparatus for providing a digital message with user data payload addressed with a phone number only according to claim 15, wherein:
    said MIN is a phone number.

21. The apparatus for providing a digital message with user data payload addressed with a phone number only according to claim 15, wherein:
    said MIN with said added syntax associated with said carrier providing service to said MIN forms a routable address.

22. The apparatus for providing a digital message with user data payload addressed with a phone number only according to claim 21, wherein:
    said rout able address is an e-mail address.

* * * * *